(12) United States Patent
Bohman et al.

(10) Patent No.: US 12,380,799 B2
(45) Date of Patent: Aug. 5, 2025

(54) ARTIFICIALLY INTELLIGENT PROVISION OF POST-VEHICULAR-COLLISION EVIDENCE

(71) Applicant: Volvo Car Corporation, Gothenburg (SE)

(72) Inventors: Mats Bohman, Gothenburg (SE); Anna Stina Ida Carlsson, Västra Frölunda (SE); Carl Anders Eric Ödblom, Öckerö (SE); Zhennan Fei, Gothenburg (SE); Pär Bertil Gottfrid Nilsson, Mölndal (SE)

(73) Assignee: Volvo Car Corporation, Gothenburg (SE)

( * ) Notice: Subject to any disclaimer, the term of this patent is extended or adjusted under 35 U.S.C. 154(b) by 273 days.

(21) Appl. No.: 18/050,548

(22) Filed: Oct. 28, 2022

(65) Prior Publication Data

US 2024/0144813 A1   May 2, 2024

(51) Int. Cl.
| | |
|---|---|
| *G08G 1/01* | (2006.01) |
| *B60R 21/00* | (2006.01) |
| *B60R 21/013* | (2006.01) |
| *G06V 10/764* | (2022.01) |
| *G06V 20/56* | (2022.01) |

(52) U.S. Cl.
CPC .......... *G08G 1/0112* (2013.01); *B60R 21/013* (2013.01); *G06V 10/764* (2022.01); *G06V 20/56* (2022.01); *B60R 2021/0027* (2013.01)

(58) Field of Classification Search
CPC ....... B60R 21/013; G06V 20/56; G06V 10/82
USPC .......................................................... 701/1
See application file for complete search history.

(56) References Cited

U.S. PATENT DOCUMENTS

| | | |
|---|---|---|
| 6,700,504 B1 | 3/2004 | Aslandogan et al. |
| 6,741,168 B2 | 5/2004 | Webb et al. |
| 9,402,060 B2 | 7/2016 | Plante |
| 9,633,318 B2 | 4/2017 | Plante |
| 10,800,278 B2 | 10/2020 | Symanow et al. |
| 11,049,186 B1 | 6/2021 | Medina et al. |
| 11,620,906 B2 | 4/2023 | Hu |

(Continued)

OTHER PUBLICATIONS

Non-Final Office Action for U.S. Appl. No. 18/050,540 dated Jul. 30, 2024, 16 pages.

(Continued)

*Primary Examiner* — Navid Z. Mehdizadeh
*Assistant Examiner* — Vincent Feng
(74) *Attorney, Agent, or Firm* — Amin, Turocy & Watson, LLP

(57) ABSTRACT

Systems/techniques that facilitate artificially intelligent provision of post-vehicular-collision evidence are provided. In various embodiments, a system can be onboard a vehicle. In various aspects, the system can capture, via one or more cameras or one or more microphones of the vehicle, vicinity data associated with a vicinity of the vehicle. In various instances, the system can determine, via execution of a deep learning neural network on the vicinity data, whether a vehicular collision not involving the vehicle has occurred in the vicinity of the vehicle. In various cases, the system can broadcast, in response to a determination that the vehicular collision has occurred and via the one or more cameras or the one or more microphones, one or more electronic notifications.

20 Claims, 41 Drawing Sheets

(56) References Cited

U.S. PATENT DOCUMENTS

| | | |
|---|---|---|
| 11,950,316 B1* | 4/2024 | Nalevanko .............. H04W 4/40 |
| 12,167,164 B2 | 12/2024 | Jo |
| 2003/0112133 A1 | 6/2003 | Webb et al. |
| 2009/0027056 A1 | 1/2009 | Huang et al. |
| 2011/0288743 A1 | 11/2011 | Smith |
| 2012/0113666 A1 | 5/2012 | Slipp |
| 2013/0221741 A1 | 8/2013 | Stanek et al. |
| 2014/0009275 A1 | 1/2014 | Bowers et al. |
| 2015/0241880 A1 | 8/2015 | Kim et al. |
| 2017/0026893 A1 | 1/2017 | Lagassey |
| 2019/0236955 A1 | 8/2019 | Hu |
| 2020/0026289 A1 | 1/2020 | Alvarez et al. |
| 2020/0027333 A1 | 1/2020 | Xu et al. |
| 2020/0098200 A1 | 3/2020 | Pohlenz |
| 2021/0039596 A1 | 2/2021 | Park |
| 2021/0094438 A1 | 4/2021 | Ciccone et al. |
| 2021/0304592 A1 | 9/2021 | Lepp et al. |
| 2021/0342613 A1 | 11/2021 | Wang et al. |
| 2021/0390858 A1 | 12/2021 | McFarland, Jr. |
| 2022/0032977 A1 | 2/2022 | Gupta |
| 2022/0277598 A1 | 9/2022 | Liu |
| 2022/0281486 A1 | 9/2022 | Sakurada et al. |
| 2022/0292974 A1 | 9/2022 | Qi |
| 2022/0312086 A1 | 9/2022 | Schmidt |
| 2023/0196489 A1 | 6/2023 | Khedekar |
| 2023/0343213 A1* | 10/2023 | Lauzière ................ G08G 1/095 |
| 2023/0386268 A1 | 11/2023 | Scarbrough et al. |
| 2024/0059323 A1* | 2/2024 | Gerrese ................ H04W 4/023 |

OTHER PUBLICATIONS

European Search Report for European Patent Application No. EP23205601 dated Apr. 2, 2024, 7 pages.
Notice of Allowance received for U.S. Appl. No. 18/050,540 dated Nov. 25, 2024, 18 pages.
Non-Final Office Action received for U.S. Appl. No. 18/050,544 dated Dec. 19, 2024, 47 pages.
Non-Final Office Action received for U.S. Appl. No. 18/050,550 dated Oct. 9, 2024, 175 pages.
Communication Pursuant to Rules 69 EPC received for EP Patent Application Serial No. 23205601.0 dated May 7, 2024, 2 pages.
Final Office Action received for U.S. Appl. No. 18/050,550 dated Mar. 21, 2025, 51 pages.
Notice of Allowance received for U.S. Appl. No. 18/050,540 dated Jan. 29, 2025, 12 pages.
Notice of Allowance received for U.S. Appl. No. 18/050,540 dated Mar. 7, 2025, 7 pages.
Notice of Allowance received for U.S. Appl. No. 18/050,544 dated Apr. 14, 2025, 47 pages.
Non-Final Office Action received for U.S. Appl. No. 18/050,537 dated Feb. 18, 2025, 51 pages.

\* cited by examiner

ARTIFICIALLY INTELLIGENT PROVISION OF POST-VEHICULAR-COLLISION EVIDENCE

TECHNICAL FIELD

The subject disclosure relates generally to artificial intelligence, and more specifically to artificially intelligent provision of post-vehicular-collision evidence.

BACKGROUND

A vehicular collision can involve one or more vehicles colliding with each other or with any suitable stationary or non-stationary objects. Unfortunately, existing techniques for addressing or responding to vehicular collisions can be unreliable.

Accordingly, systems or techniques that can address one or more of these technical problems can be desirable.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatus or computer program products that facilitate artificially intelligent provision of post-vehicular-collision evidence are described.

According to one or more embodiments, a system is provided. The system can be onboard a first vehicle, and the system can comprise a non-transitory computer-readable memory that can store computer-executable components. The system can further comprise a processor that can be operably coupled to the non-transitory computer-readable memory and that can execute the computer-executable components stored in the non-transitory computer-readable memory. In various embodiments, the computer-executable components can comprise a sensor component that can capture, via one or more first cameras or one or more first microphones of the first vehicle, vicinity data associated with a first vicinity of the first vehicle. In various aspects, the computer-executable components can comprise an inference component that can determine, via execution of a deep learning neural network on the vicinity data, whether a vehicular collision not involving the first vehicle has occurred in the first vicinity of the first vehicle. In various instances, the computer-executable components can comprise an evidence component that can record, in response to a determination that the vehicular collision has occurred and via the one or more first cameras or the one or more first microphones, first post-collision evidence associated with the first vicinity of the first vehicle.

According to one or more embodiments, a system is provided. The system can be onboard a vehicle, and the system can comprise a non-transitory computer-readable memory that can store computer-executable components. The system can further comprise a processor that can be operably coupled to the non-transitory computer-readable memory and that can execute the computer-executable components stored in the non-transitory computer-readable memory. In various embodiments, the computer-executable components can comprise a sensor component that can capture, via one or more cameras or one or more microphones of the vehicle, vicinity data associated with a vicinity of the vehicle. In various aspects, the computer-executable components can comprise an inference component that can generate, via execution of a deep learning neural network on the vicinity data, a classification label indicating whether a vehicular collision not involving the vehicle has occurred in the vicinity of the vehicle. In various instances, the computer-executable components can comprise an evidence component that can record, in response to the classification label indicating that the vehicular collision has occurred and via the one or more cameras or the one or more microphones, post-collision evidence associated with the vicinity of the vehicle. In various cases, the computer-executable components can comprise a broadcast component that can broadcast, in response to the classification label indicating that the vehicular collision has occurred, the classification label and the post-collision evidence to an emergency service computing device.

According to one or more embodiments, a system is provided. The system can be onboard a vehicle, and the system can comprise a non-transitory computer-readable memory that can store computer-executable components. The system can further comprise a processor that can be operably coupled to the non-transitory computer-readable memory and that can execute the computer-executable components stored in the non-transitory computer-readable memory. In various embodiments, the computer-executable components can comprise a sensor component that can capture, via one or more cameras or one or more microphones of the vehicle, vicinity data associated with a vicinity of the vehicle. In various aspects, the computer-executable components can comprise an inference component that can determine, via execution of a deep learning neural network on the vicinity data, whether a vehicular collision not involving the vehicle has occurred in the vicinity of the vehicle. In various instances, the computer-executable components can comprise a broadcast component that can broadcast, in response to a determination that the vehicular collision has occurred, via the one or more cameras or the one or more microphones, and to an emergency service computing device, a post-collision live stream associated with the vicinity of the vehicle.

According to one or more embodiments, a system is provided. The system can be onboard a vehicle, and the system can comprise a non-transitory computer-readable memory that can store computer-executable components. The system can further comprise a processor that can be operably coupled to the non-transitory computer-readable memory and that can execute the computer-executable components stored in the non-transitory computer-readable memory. In various embodiments, the computer-executable components can comprise a sensor component that can capture, via one or more cameras or one or more microphones of the vehicle, vicinity data associated with a vicinity of the vehicle. In various aspects, the computer-executable components can comprise an inference component that can determine, via execution of a deep learning neural network on the vicinity data, whether a vehicular collision not involving the vehicle has occurred in the vicinity of the vehicle. In various instances, the computer-executable components can comprise a broadcast component that can broadcast, in response to a determination that the vehicular collision has occurred and via the one or more cameras or the one or more microphones, one or more electronic notifications.

According to one or more embodiments, a system is provided. The system can comprise a non-transitory computer-readable memory that can store computer-executable components. The system can further comprise a processor that can be operably coupled to the non-transitory computer-readable memory and that can execute the computer-executable components stored in the non-transitory computer-readable memory. In various embodiments, the computer-executable components can comprise a receiver component that can receive one or more electronic notifications broadcasted by a vehicle. In various aspects, the computer-executable components can comprise a determination component that can determine, via parsing, whether the one or more electronic notifications indicate that a vehicular collision not involving the vehicle has occurred in a vicinity of the vehicle. In various instances, the computer-executable components can comprise an execution component that can initiate, in response to a determination that the one or more electronic notifications indicate that the vehicular collision has occurred, one or more electronic actions based on the vehicular collision.

According to one or more embodiments, the above-described systems can be implemented as computer-implemented methods or computer program products.

DETAILED DESCRIPTION

Figure 1:
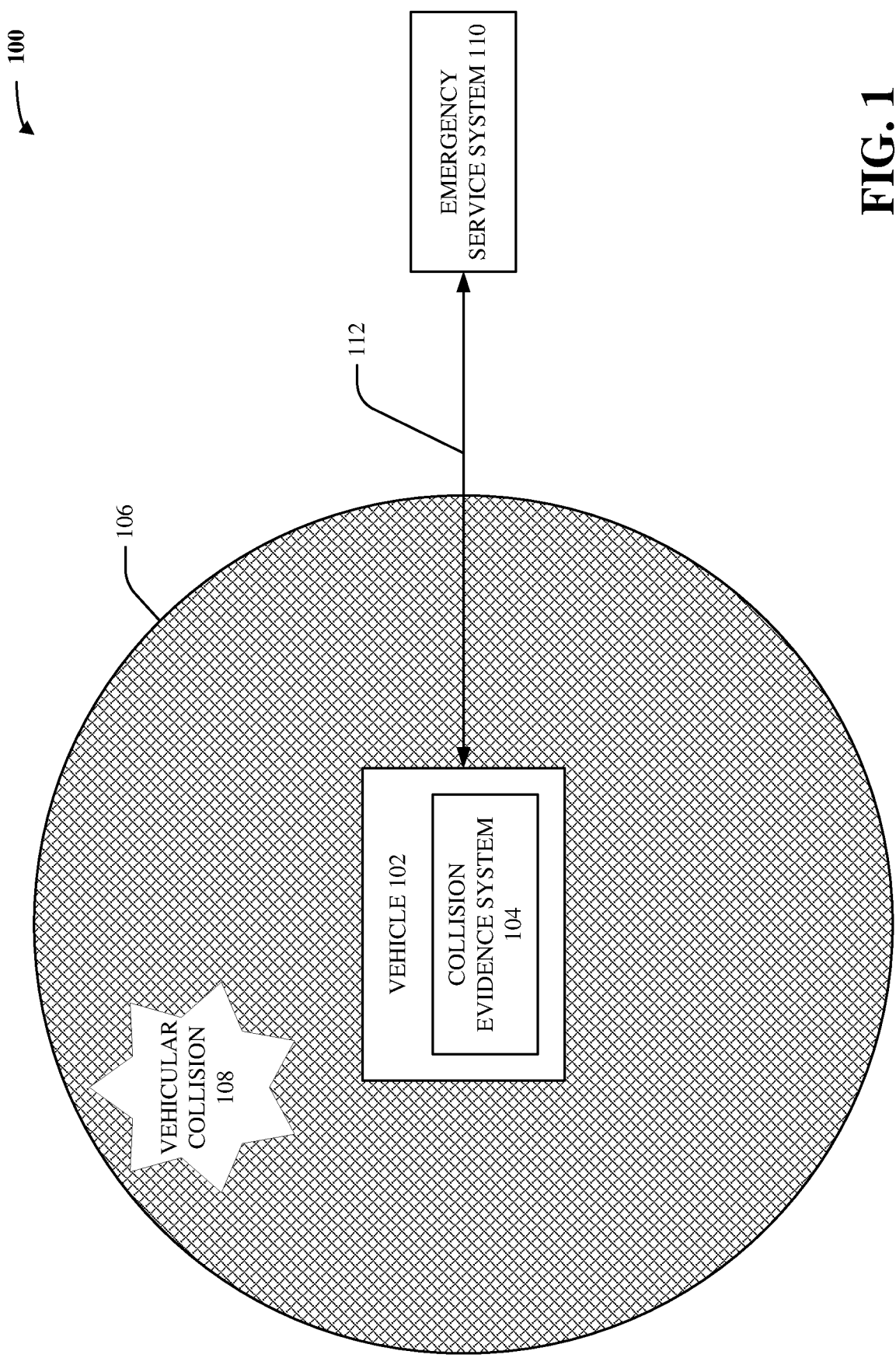
FIG. 1 illustrates an example, non-limiting block diagram showing a vehicular collision occurring within a vicinity of a vehicle, where such vehicle can facilitate artificially intelligent provision of post-vehicular-collision evidence in accordance with one or more embodiments described herein.

The following detailed description is merely illustrative and is not intended to limit embodiments or application/uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

A vehicular collision can involve one or more vehicles colliding (e.g., crashing) with each other or with any suitable stationary or non-stationary objects or entities (e.g., crashing into trees, power poles, buildings, furniture, animals, or pedestrians). A vehicular collision can cause or otherwise involve vehicle damage (e.g., crumpled bumpers, ruined fenders, broken headlights, bent frames) or bodily injury (e.g., broken bones, lacerations, whiplash). Remedying or addressing such vehicle damage or bodily injury (e.g., determining fault for insurance or legal liability purposes) can depend upon an aftermath of the vehicular collision (e.g., can depend upon who did what in the moments after the vehicular collision occurred).

Unfortunately, and as recognized by the inventors of various embodiments described herein, existing techniques for capturing such aftermath can be unreliable for various reasons.

First, the present inventors realized that existing techniques usually rely upon eyewitness reports to reconstruct the aftermath of a vehicular collision. That is, after emergency services have responded to the vehicular collision (e.g., after emergency services have supplied appropriate medical care to all injured persons), the emergency services interview people who report what they witnessed regarding the vehicular collision, and the emergency services piece together the aftermath of the vehicular collision based on such eyewitness reports. Unfortunately, such eyewitness reports are intrinsically unreliable. Indeed, because emergency services can be preoccupied with supplying medical care when they first arrive at the scene of the vehicular collision, emergency services can acquire such eyewitness reports long periods of time (e.g., many hours) after the vehicular collision occurs. Such delay or lag between the occurrence of the vehicular collision and the recordation or taking of the eyewitness reports can increase a risk of the eyewitnesses misremembering the vehicular collision. Moreover, eyewitness reports are always vulnerable to lying by biased eyewitnesses. For example, an eyewitness might have a grudge against a person involved in the vehicular collision, and thus the eyewitness might lie so as to place blame on that person. Conversely, an eyewitness might have a special relationship (e.g., familial relationship) with a person involved in the vehicular collision, and thus the eyewitness might lie so as to protect that person. Indeed, in some cases, there might not be any eyewitnesses available to provide eyewitness reports (e.g., the vehicular collision might have occurred in a sparsely populated area or on an otherwise unbusy road; in such cases, emergency services might not even become aware of the vehicular collision until a long amount of time after the vehicular collision occurs).

Second, the present inventors realized that, although some existing techniques utilize traffic cameras to capture the aftermath of a vehicular collision, such traffic cameras are not ubiquitous and are often stationary. In particular, traffic cameras are often installed at major or busy intersections. Accordingly, if a vehicular collision occurs in such a major or busy intersection, a traffic camera installed at that major or busy intersection can video-graphically record the vehicular collision or its aftermath. The video-graphic recording of such traffic camera can be considered as more reliable than an eyewitness report (e.g., the traffic camera cannot misremember or lie due to bias). However, traffic cameras are not omnipresent. Indeed, although traffic cameras are often installed at major or busy intersections, traffic cameras are often not installed at less-busy intersections or at non-intersection portions of road. Because such less-busy intersections or non-intersection portions of road can outnumber major or busy intersections, there can be many vehicular collisions that are not captured by traffic cameras. Furthermore, a traffic camera is often configured to swivel about a fixed point. Accordingly, although the traffic camera can adjust its orientation, the traffic camera cannot obtain a new vantage point for itself. Thus, when the traffic camera is recording a vehicular collision or its aftermath, some aspects or details of the vehicular collision or the aftermath can be hidden from the vantage point of the traffic camera, and the traffic camera cannot reposition itself so as to view such hidden aspects or details.

Third, the present inventors realized that, although various existing techniques utilize personal computing devices of eyewitnesses to capture the aftermath of a vehicular collision, such personal computing devices rely upon manual activation. In particular, a person who witnesses a vehicular collision can utilize their personal computing device (e.g., their smart phone) to video-graphically capture the vehicular collision or its aftermath. The video-graphic recording of such personal computing device can be considered as more reliable than an eyewitness report (e.g., the personal computing device cannot misremember or lie due to bias). Moreover, the personal computing device can be not stationarily installed to a fixed location. In other words, the eyewitness can move to different locations while recording with their personal computing device, meaning that the vantage point of the personal computing device can be changed. However, such techniques rely upon manual activation of the personal computing device. Regrettably, an eyewitness can (e.g., due to inattention or bias) forget or otherwise choose not to record the vehicular collision or its aftermath, notwithstanding having a personal computing device.

Furthermore, an extent of bodily injury caused by a vehicular collision can depend upon how long it takes for emergency services to respond to the vehicular collision. For example, the longer it takes for emergency services to arrive at the scene of the vehicular collision, the more likely it can be for an injured pedestrian, injured driver, or injured passenger to experience exacerbated injuries (e.g., to bleed out). Existing techniques often allow emergency services to respond to a vehicular collision in about eight to ten minutes. Depending upon the severity of the vehicular collision, eight to ten minutes can be too long to wait for emergency services.

Accordingly, systems or techniques that can address one or more of these technical problems can be desirable.

Various embodiments described herein can address one or more of these technical problems. One or more embodiments described herein can include systems, computer-implemented methods, apparatus, or computer program products that can facilitate artificially intelligent provision of post-vehicular-collision evidence. That is, the present inventors realized that various disadvantages associated with existing techniques for capturing the aftermath of a vehicular collision can be ameliorated by artificially intelligent provision of post-vehicular-collision evidence. More specifically, a vehicle can be outfitted with various external sensors, such as road-facing cameras or road-facing microphones. In various aspects, the vehicle can utilize such external sensors to capture vicinity data of a vicinity of the vehicle (e.g., to capture pictures of roadways, sidewalks, pedestrians, or other vehicles that are in the vicinity of the vehicle, to capture noises that occur in the vicinity of the vehicle). Furthermore, the vehicle can be outfitted with a deep learning neural network that can be trained or otherwise configured to detect vehicular collisions based on data captured by the external sensors. Thus, in various instances, the vehicle can execute the deep learning neural network on the vicinity data, which can cause the deep learning neural network to produce an outputted classification label. In various aspects, the outputted classification label can exhibit any suitable format or dimensionality. For example, in some cases, the outputted classification label can be a dichotomous variable (e.g., binary variable) that binomially indicates a presence or absence of a vehicular collision. As another example, in other cases, the outputted classification label can be a set of dichotomous or multichotomous variables that binomially or multinomially indicate various characteristics of a detected vehicular collision (e.g., if the outputted classification label indicates that a vehicular collision has been detected, then the outputted classification label can further indicate how many vehicles are involved in the vehicular collision, whether one or more pedestrians were injured in the vehicular collision, or a severity level of the vehicular collision). In various cases, when the outputted classification label indicates that a vehicular collision has occurred in the vicinity of the vehicle, the vehicle can automatically begin recording, via its external sensors, whatever is transpiring in the vicinity after the vehicular collision (e.g., in some cases, pre-collision buffering can be implemented, such that data captured by the external sensors in the moments before a vehicular collision can also be recorded). The data that is recorded by the vehicle's external sensors in such fashion (e.g., recorded video clips, recorded audio clips) can be considered as post-collision evidence. In various aspects, the vehicle can electronically transmit the post-collision evidence to any suitable emergency service computing device (e.g., to a police vehicle, to a police depot, to an ambulance, to a hospital, to a public service access point (PSAP), to a third-party service (TSP) call center, or to any other suitable electronic service whatsoever).

In various aspects, the external sensors and the deep learning neural network of the vehicle can be configured to constantly, continuously, or continually scan the vicinity of the vehicle for vehicular collisions. Whenever a vehicular collision is detected, its aftermath can be automatically recorded by the external sensors (e.g., by the road-facing cameras or road-facing microphones) of the vehicle, and such recordings can be electronically broadcasted to an emergency service computing device. In this way, various disadvantages of existing techniques can be ameliorated. More specifically, the data recorded by the external sensors of the vehicle can be more reliable than eyewitness reports (e.g., video clips or audio clips do not misremember or lie due to bias). Moreover, the constant, continuous, or continual scanning of the external sensors or of the deep learning neural network can be more reliable than the manual activation required by some existing techniques (e.g., the external sensors or the deep learning neural network cannot forget or otherwise choose not to detect a vehicular collision that is manifested in the vicinity data). Furthermore, the vehicle can detect and record the aftermath of a vehicular collision, even if the vehicular collision occurs in a location where no traffic cameras are installed. Further still, the vehicle can be not stationarily fixed to any one point, meaning that the vehicle can, in some instances, move around a detected vehicular collision while recording with its external sensors, so as to capture the vehicular collision and its aftermath from more than one vantage point.

In some cases, the emergency service computing device can even interact, vicariously through the vehicle, with the vehicular collision in real-time. In particular, when the outputted classification label indicates that a vehicular collision has occurred in the vicinity of the vehicle, the vehicle can, in various aspects, initiate a live stream to the emergency service computing device, via its external sensors. Such live stream can allow the emergency service computing device (e.g., can allow an operator or user of the emergency service computing device) to observe the vehicular collision in real-time, even before emergency services actually arrive at the scene of the vehicular collision. Moreover, the vehicle can, in some cases, be outfitted with any suitable autonomous driving capabilities (e.g., autonomously adjustable steering input, autonomously adjustable throttle input, autonomously adjustable camera angles). Accordingly, during such live stream, the vehicle can, in various instances, receive remote-control commands from the emergency service computing device (e.g., commands to adjust a camera orientation of the vehicle, to adjust a steering input of the vehicle, to adjust a throttle input of the vehicle, to play defined sound data via a speaker of the vehicle), and the vehicle can automatically obey such remote-control commands. This can allow the emergency service computing device (e.g., can allow an operator or user of the emergency service computing device) to interact with the vehicular collision in real-time, even before emergency services actually arrive at the scene of the vehicular collision. Thus, such embodiments can be considered as effectively reducing an emergency service response time.

Various embodiments described herein can be considered as a computerized tool (e.g., any suitable combination of computer-executable hardware or computer-executable software) that can facilitate artificially intelligent provision of post-vehicular-collision evidence. In various aspects, there can be a vehicle and an emergency service computing device. In various instances, the vehicle can be outfitted with a first computerized tool, and the emergency service computing device can be outfitted with a second computerized tool. In various cases, the first computerized tool can comprise a sensor component, an inferencing component, an evidence component, or a broadcast component. In various aspects, the second computerized tool can comprise a receiver component, a determination component, or an execution component.

In various embodiments, the sensor component of the first computerized tool can electronically record, measure, or otherwise capture vicinity data associated with a vicinity of the vehicle. More specifically, the sensor component can electronically access or otherwise control various sensors of the vehicle. Such sensors can include one or more cameras of the vehicle, one or more microphones of the vehicle, one or more thermometers of the vehicle, one or more hygrometers of the vehicle, or one or more proximity sensors (e.g., radar, sonar, lidar) of the vehicle. In various aspects, the sensor component can leverage such sensors to obtain the vicinity data. For example, the one or more cameras can capture one or more images of the vicinity of the vehicle (e.g., images of roadways, sidewalks, traffic lights, buildings, pedestrians, trees, or other vehicles that are within any suitable distance in front of the vehicle, behind the vehicle, or beside the vehicle). As another example, the one or more microphones can record one or more noises that occur in the vicinity of the vehicle (e.g., noises that occur within any suitable distance in front of the vehicle, behind the vehicle, or beside the vehicle). As still another example, the one or more thermometers can measure one or more temperatures associated with the vicinity (e.g., air temperatures or surface temperatures within any suitable distance in front of the vehicle, behind the vehicle, or beside the vehicle). As yet another example, the one or more hygrometers can measure one or more humidities associated with the vicinity (e.g., air moisture levels or surface moisture levels within any suitable distance in front of the vehicle, behind the vehicle, or beside the vehicle). As even another example, the one or more proximity sensors can measure one or more proximity detections associated with the vicinity (e.g., can detect tangible objects that are within any suitable distance in front of the vehicle, behind the vehicle, or beside the vehicle). In various cases, such one or more images, such one or more noises, such one or more temperatures, such one or more humidities, or such one or more proximity detections can collectively be considered as the vicinity data.

In various embodiments, the inference component of the first computerized tool can electronically store, maintain, control, or otherwise access a first deep learning neural network. In various instances, the first deep learning neural network can exhibit any suitable internal architecture. For example, the first deep learning neural network can include any suitable numbers of any suitable types of layers (e.g., input layer, one or more hidden layers, output layer, any of which can be convolutional layers, dense layers, non-linearity layers, pooling layers, batch normalization layers, or padding layers). As another example, the first deep learning neural network can include any suitable numbers of neurons in various layers (e.g., different layers can have the same or different numbers of neurons as each other). As yet another example, the first deep learning neural network can include any suitable activation functions (e.g., softmax, sigmoid, hyperbolic tangent, rectified linear unit) in various neurons (e.g., different neurons can have the same or different activation functions as each other). As still another example, the first deep learning neural network can include any suitable interneuron connections or interlayer connections (e.g., forward connections, skip connections, recurrent connections).

In any case, the first deep learning neural network can be configured to receive, as input, data captured, measured, or recorded by the various sensors of the sensor component and to detect, as output, a vehicular collision in the vicinity based on such data. Accordingly, in various aspects, the inference component can electronically execute the first deep learning neural network on the vicinity data. In various instances, such execution can cause the first deep learning neural network to generate an outputted classification label. For example, the inference component can feed the vicinity data to an input layer of the first deep learning neural network, the vicinity data can complete a forward pass through one or more hidden layers of the first deep learning neural network, and an output layer of the first deep learning neural network can compute the outputted classification label based on activations from the one or more hidden layers. In any case, the outputted classification label can be one or more scalars, one or more vectors, one or more matrices, one or more tensors, or one or more character strings that indicate whether or not a vehicular collision has occurred within the vicinity of the vehicle. In some instances, if the outputted classification label indicates that a vehicular collision has occurred in the vicinity of the vehicle, then the outputted classification label can further indicate any suitable characteristics, properties, or attributes of the vehicular collision. As a non-limiting example, the outputted classification label can include any suitable scalars, vectors, matrices, tensors, or character strings indicating how many vehicles are involved in the vehicular collision. As another non-limiting example, the outputted classification label can include any suitable scalars, vectors, matrices, tensors, or character strings indicating whether or how many injured pedestrians are involved in the vehicular collision. As yet another non-limiting example, the outputted classification label can include any suitable scalars, vectors, matrices, tensors, or character strings indicating an impact type of the vehicular collision (e.g., head-on, side-swipe, rear-end). As even another non-limiting example, the outputted classification label can include any suitable scalars, vectors, matrices, tensors, or character strings indicating whether the vehicular collision involves a rolled-over vehicle. As still another non-limiting example, the outputted classification label can include any suitable scalars, vectors, matrices, tensors, or character strings indicating whether the vehicular collision involves fire, flames, smoke, or a chance of explosion. As another non-limiting example, the outputted classification label can include any suitable scalars, vectors, matrices, tensors, or character strings indicating how severe the vehicular collision seems to be.

In any case, the first deep learning neural network can be trained or otherwise configured, as described herein, to recognize, based on the vicinity data, a vehicular collision, and the outputted classification label can be any suitable electronic data indicating a presence or other characteristics of such vehicular collision. Note that, in some cases, the outputted classification label can indicate that no vehicular collision has occurred or was detected.

To help cause the outputted classification label to be accurate, the first deep learning neural network can undergo any suitable type or paradigm of training (e.g., supervised training, unsupervised training, reinforcement learning). Accordingly, in various aspects, the first computerized tool can comprise a training component that can train the first deep learning neural network on a training dataset.

In some instances, the training dataset can be an annotated training dataset. In such cases, the training dataset can include a set of training inputs and a set of ground-truth annotations that respectively correspond to the set of training inputs. In various aspects, any given training input can have the same format, size, or dimensionality as the vicinity data discussed above. In various instances, since it can be desired to train the deep learning neural network to detect vehicular collisions, each training input can correspond to a ground-truth annotation. In various cases, a ground-truth annotation, which can have the same format, size, or dimensionality as the outputted classification label discussed above, can be considered as a correct or accurate vehicular collision classification label that is known or deemed to correspond to a respective training input. Note that, in some cases, a training input can be associated with a vehicular collision (e.g., the training input can include sensor-data captured in a situation where a vehicular collision is occurring or is about to occur), and that, in other cases, a training input can be not associated with a vehicular collision (e.g., the training input can include sensor-data captured in a situation where no vehicular collision is occurring or is about to occur).

If the training dataset is annotated, then the training component can, in various aspects, perform supervised training on the first deep learning neural network. Prior to the start of such supervised training, the internal parameters (e.g., weights, biases, convolutional kernels) of the first deep learning neural network can be randomly initialized.

In various aspects, the training component can select from the training dataset any suitable training input and any suitable ground-truth annotation corresponding to such selected training input. In various instances, the training component can feed the selected training input to the first deep learning neural network, which can cause the first deep learning neural network to produce an output. For example, the training input can be received by an input layer of the first deep learning neural network, the training input can complete a forward pass through one or more hidden layers of the first deep learning neural network, and an output layer of the first deep learning neural network can compute the output based on activations generated by the one or more hidden layers.

In various aspects, the output can be considered as a predicted or inferred vehicular collision classification label which the first deep learning neural network believes should correspond to the selected training input. In contrast, the selected ground-truth annotation can be considered as the correct or accurate vehicular collision classification label that is known or deemed to correspond to the selected training input. Note that, if the first deep learning neural network has so far undergone no or little training, then the output can be highly inaccurate (e.g., the output can be very different from the selected ground-truth annotation).

In any case, the training component can compute one or more errors or losses (e.g., mean absolute errors (MAE), mean squared errors (MSE), cross-entropies) between the output and the selected ground-truth annotation. In various aspects, the training component can update the internal parameters of the first deep learning neural network by performing backpropagation (e.g., stochastic gradient descent) driven by such computed errors or losses.

In various instances, such supervised training procedure can be repeated for each training input in the training dataset, with the result being that the internal parameters of the first deep learning neural network can become iteratively optimized to accurately detect vehicular collisions based on inputted vicinity data. In various cases, the training component can implement any suitable training batch sizes, any suitable training termination criteria, or any suitable error, loss, or objective functions.

In any case, the sensor component can obtain the vicinity data, and the inference component can execute (after training) the first deep learning neural network on the vicinity data, thereby yielding the outputted classification label.

In various embodiments, the evidence component of the first computerized tool can, in response to the outputted classification label indicating that a vehicular collision has occurred in the vicinity of the vehicle, utilize the various sensors of the vehicle to electronically record post-collision evidence associated with the vicinity. In other words, the various sensors of the vehicle (e.g., the one or more cameras, microphones, thermometers, hygrometers, or proximity sensors) can capture, for any suitable temporal duration following detection of the vehicular collision, data representing whatever transpires in the vicinity of the vehicle, and the evidence component can record, store, maintain, or otherwise preserve such data.

For example, suppose that the temporal duration is fifteen minutes. In such case, the one or more cameras of the vehicle can continually capture one or more images of the vicinity for fifteen minutes following the vehicular collision, where such images can be considered as forming a fifteen-minute video clip of the vicinity. Similarly, in such case, the one or more microphones of the vehicle can continually capture one or more noises occurring in the vicinity for fifteen minutes following the vehicular collision, where such noises can be considered as forming a fifteen-minute audio clip of the vicinity. Likewise, in such case, the one or more thermometers can continually capture one or more temperatures of the vicinity for fifteen minutes following the vehicular collision, where such temperatures can be considered as a forming a fifteen-minute temperature measurement time-series of the vicinity. Moreover, in such case, the one or more hygrometers can continually capture one or more moisture levels of the vicinity for fifteen minutes following the vehicular collision, where such moisture levels can be considered as a forming a fifteen-minute moisture measurement time-series of the vicinity. Furthermore, in such case, the one or more proximity sensors can continually capture one or more proximity detections of the vicinity for fifteen minutes following the vehicular collision, where such proximity detections can be considered as a forming a fifteen-minute proximity measurement time-series of the vicinity. In various cases, such video clip, audio clip, temperature measurement time-series, moisture measurement time-series, or proximity measurement time-series can collectively be considered as the post-collision evidence.

In various embodiments, the broadcast component of the first computerized tool can electronically broadcast, to the second computerized tool of the emergency service computing device, an electronic alert based on the post-collision evidence. In various aspects, the broadcast component can transmit the electronic alert to the second computerized tool via any suitable wireless electronic connection. For example, in some cases, such wireless electronic connection can be an Internet connection that makes use of one or more intermediary access points or intermediary routers. As another example, such wireless electronic connection can be a peer-to-peer (P2P) communication link that can operate in the absence of an intermediary access point or intermediary router. For instance, such P2P communication link can be a BLUETOOTH® P2P connection (e.g., which can have an operable range of tens or dozens of meters) or a Wireless Fidelity (Wi-Fi) P2P connection (e.g., which can have an operable range of tens, dozens, or even hundreds of meters). In any case, the broadcast component can transmit the electronic alert to the second computerized tool of the emergency service computing device.

In various aspects, the electronic alert can be any suitable electronic message that contains information pertaining to the vehicular collision detected by the first deep learning neural network. As an example, the electronic alert can, in some instances, include the post-collision evidence recorded by the evidence component. As another example, the electronic alert can, in some aspects, include the outputted classification label. As yet another example, the electronic alert can, in some cases, include the vicinity data.

In some aspects, the sensor component can comprise a geolocation sensor, such as a global positioning sensor ("GPS") or a Wi-Fi positioning sensor ("WPS"). In such cases, the geolocation sensor can capture or otherwise generate a geolocation stamp that indicates where (e.g., at which geographic location) the vicinity data was captured, measured, or recorded by the sensor component. Because the geolocation stamp can indicate where the vicinity data was captured, and because the vehicular collision can be detected based on the vicinity data, the geolocation stamp can be considered as indicating where the vehicular collision occurred. In any case, the electronic alert can, in various instances, include or otherwise specify such geolocation stamp.

In some aspects, the sensor component can comprise a time sensor, such as a digital clock. In such cases, the time sensor can capture or otherwise generate a timestamp that indicates when (e.g., at what time or date) the vicinity data was captured, measured, or recorded by the sensor component. Because the timestamp can indicate when the vicinity data was captured, and because the vehicular collision can be detected based on the vicinity data, the timestamp can be considered as indicating when the vehicular collision occurred. In any case, the electronic alert can, in various instances, include or otherwise specify such timestamp.

In various aspects, the electronic alert can further include an identifier associated with the vehicle. In various instances, the identifier can be any suitable piece of electronic data (e.g., an alphanumeric code) that indicates or otherwise represents an identity of the vehicle. For example, the identifier can be a make, model, or manufacturing year of the vehicle (e.g., such make, model, or manufacturing year can be hardcoded into the first computerized tool). As another example, the identifier can be a license plate number of the vehicle (e.g., such license plate number can be hardcoded into the first computerized tool). As yet another example, the identifier can be a vehicle identification number (VIN) of the vehicle (e.g., such VIN can be hardcoded into the first computerized tool). As still another example, the identifier can be a name or residential address of an owner of the vehicle (e.g., such name or address can be hardcoded into the first computerized tool; or the broadcast component can determine such name or address by searching any suitable database for the owner, where such database can be collated by license plate number or VIN). As even another example, the identifier can be a name or residential address of a current driver of the vehicle (e.g., the identity of the current driver can be determined via facial recognition, voice recognition, retina recognition, wearable beacon, or manual input).

In various aspects, the electronic alert can further comprise an assistance request. In various instances, the assistance request can be any suitable electronic data that can indicate a specific type of emergency service assistance that should be dispatched to handle or otherwise address the vehicular collision. In various cases, the assistance request can be based on the outputted classification label. For example, if the outputted classification label indicates that the vehicular collision involves fire or flames, then the assistance request can ask that a firetruck be dispatched to address the vehicular collision. As another example, if the outputted classification label indicates that the vehicular collision is of a high severity level or involves injured pedestrians, then the assistance request can ask that an ambulance be dispatched to address the vehicular collision. As even another example, if the outputted classification label indicates that the vehicular collision is of a low severity level, then the assistance request can indicate that dispatch of emergency services is not necessary.

In any case, the first computerized tool (e.g., onboard the vehicle) can transmit the electronic alert to the second computerized tool (e.g., integrated into the emergency service computing device).

In various embodiments, the receiver component of the second computerized tool can electronically receive or otherwise access the electronic alert. More specifically, any suitable wireless electronic connection (e.g., an Internet connection, a P2P communication link) can operatively couple the broadcast component of the first computerized tool to the receiver component of the second computerized tool. Accordingly, the broadcast component of the first computerized tool can transmit the electronic alert, and the receiver component of the second computerized tool can receive the electronic alert. In any case, the receiver component can electronically obtain or access the electronic alert, such that other components of the second computerized tool (e.g., the determination component, the execution component) can electronically interact with the electronic alert.

In various aspects, the determination component of the second computerized tool can electronically parse, via any suitable parsing technique, the electronic alert. In other words, the determination component can read the contents of the electronic alert. In various instances, the determination component can generate a determination indicator based on such contents. In various cases, the determination indicator can be any suitable binomial or binary variable whose value represents whether or not the electronic alert indicates that a vehicular collision has been detected in the vicinity of the vehicle. For example, the electronic alert can include the outputted classification label, the geolocation stamp, and the timestamp, and the determination component can identify the outputted classification label, the geolocation stamp, and the timestamp by parsing the electronic alert. If the outputted classification label indicates a vehicular collision, then the determination component can conclude that the vehicular collision occurred at a location represented by the geolocation stamp at a time represented by the timestamp, and the determination indicator can accordingly be set to an active value or an active state. On the other hand, if the outputted classification label indicates no vehicular collision, then the determination component can conclude that no vehicular collision occurred at the location represented by the geolocation stamp at the time represented by the timestamp, and the determination indicator can accordingly be set to an inactive value or an inactive state.

In various aspects, the execution component of the second computerized tool can facilitate, perform, conduct, or otherwise initiate any suitable electronic actions, in response to the determination indicator being set to the active value or the active state.

As an example, such one or more electronic actions can include adjusting, updating, or otherwise modifying an electronic navigation display of an emergency service vehicle (e.g., a police car, an ambulance, a firetruck, a tow truck). In some cases, the electronic navigation display of the emergency service vehicle can be any suitable computer screen, monitor, or visual projection that is integrated into a dashboard of the emergency service vehicle. In other cases, the electronic navigation display of the emergency service vehicle can be any suitable computer screen, monitor, or visual projection that is integrated into a central console of the emergency service vehicle. In still other cases, the electronic navigation display of the emergency service vehicle can be any suitable computer screen, monitor, or visual projection that is integrated into a heads-up-display of the emergency service vehicle. In any case, in response to the determination indicator being set to the active value or the active state, the execution component can render any suitable graphical representation of the vehicular collision on the electronic navigation display. For instance, the electronic navigation display can illustrate a first symbol representing the emergency service vehicle, can illustrate a second symbol representing a road on which the emergency service vehicle is traveling, and can illustrate a third symbol representing the presence of the vehicular collision.

As another example, the one or more electronic actions can include calculating or otherwise generating an electronic navigation route for the emergency service vehicle, where such electronic navigation route can lead from a current position of the emergency service vehicle to the vehicular collision. In various aspects, the electronic navigation display of the emergency service vehicle can illustrate or otherwise render the electronic navigation route. That is, the electronic navigation display can depict one or more graphical representations of a route (e.g., of traffic directions) which, when followed, would lead the emergency service vehicle to the vehicular collision.

As yet another example, the one or more electronic actions can include verifying whether or not the vehicular collision was properly detected by the vehicle. In particular, as mentioned above, the electronic alert can include the vicinity data captured by the various sensors of the vehicle, and the electronic alert can also include the outputted classification label generated by the first deep learning neural network of the vehicle. As explained above, the outputted classification label can indicate that the vehicular collision occurred in the vicinity of the vehicle. In other words, the first deep learning neural network can have inferred the presence of the vehicular collision, based on the vicinity data captured by the sensors of the vehicle.

In various aspects, the execution component can electronically store, maintain, control, or otherwise access a second deep learning neural network that can be configured to detect vehicular collisions based on inputted sensor data. In various instances, the second deep learning neural network can exhibit any suitable artificial intelligence architecture and can be trained in any suitable fashion, as described above with respect to the first deep learning neural network.

In any case, in response to the determination indicator being set to the active value or active state, the execution component can execute the second deep learning neural network on the vicinity data specified in the electronic alert, so as to double-check or otherwise verify the inference/conclusion of the first deep learning neural network.

More specifically, an input layer of the second deep learning neural network can receive the vicinity data captured by the vehicle, the vicinity data captured by the vehicle can complete a forward pass through one or more hidden layers of the second deep learning neural network, and an output layer of the second deep learning neural network can compute a verification label based on activations provided by the one or more hidden layers. In various aspects, the verification label can have the same format, size, or dimensionality as the outputted classification label produced by the first deep learning neural network. In other words, the verification label can indicate whether a vehicular collision occurred in the vicinity of the vehicle, and if such a vehicular collision is determined to have occurred, the verification label can indicate various characteristics, attributes, or properties of such vehicular collision.

In various aspects, the execution component can compare the verification label (produced by the second deep learning neural network) to the outputted classification label (produced by the first deep learning neural network). If the verification label matches the outputted classification label (e.g., if the verification label does not differ by more than any suitable threshold margin from the outputted classification label), then the execution component can verify the vehicular collision (e.g., can conclude that the first deep learning neural network correctly analyzed the vicinity data captured by the sensors of the vehicle). In contrast, if the verification label does not match the outputted classification label (e.g., if the verification label differs by more than any suitable threshold margin from the outputted classification label), then the execution component can fail to verify the vehicular collision (e.g., can conclude that the first deep learning neural network incorrectly analyzed the vicinity data captured by the sensors of the vehicle). In any of these cases, the second deep learning neural network of the emergency service computing device can be considered as double-checking the analytical work performed by the first deep learning neural network of the vehicle.

In some embodiments, the first computerized tool can omit the evidence component. In such cases, rather than recording the post-collision evidence, the first computerized tool can instead initiate a live stream with the emergency service computing device. In particular, the broadcast component can, in response to the outputted classification label indicating that a vehicular collision has occurred in the vicinity, electronically broadcast a live stream of the vicinity to the emergency service computing device, using the various sensors of the vehicle. For example, the broadcast component can live-stream, to the emergency service computing device, images or video frames of the vicinity that are captured in real-time by the one or more cameras of the vehicle. As another example, the broadcast component can live-stream, to the emergency service computing device, noises occurring in the vicinity that are captured in real-time by the one or more microphones of the vehicle. As yet another example, the broadcast component can live-stream, to the emergency service computing device, air temperatures or surface temperatures of the vicinity that are captured in real-time by the one or more thermometers of the vehicle. As even another example, the broadcast component can live-stream, to the emergency service computing device, air moisture contents or surface moisture contents of the vicinity that are captured in real-time by the one or more hygrometers of the vehicle. As still another example, the broadcast component can live-stream, to the emergency service computing device, proximity detections between the vehicle and objects located in the vicinity that are captured in real-time by the one or more proximity sensors of the vehicle. In various aspects, the live stream provided by the broadcast component can be considered as allowing the emergency service computing device (e.g., as allowing a user or operator of the emergency service computing device) to observe the vehicular collision or its aftermath in real-time, notwithstanding that an emergency service vehicle might not yet have physically arrived at the scene of the vehicular collision.

In various embodiments, the first computerized tool can comprise a battery component. In various aspects, the battery component can electronically monitor a remaining battery life of the vehicle, during the live stream. In particular, the battery component can continually or periodically compare the remaining battery life (e.g., remaining battery charge) of the vehicle to any suitable threshold. If the remaining battery life of the vehicle falls below the threshold, then the broadcast component can electronically transmit, during the live stream, a battery warning to the emergency service computing device. In various instances, the battery warning can be any suitable electronic message or notification that can indicate that the vehicle can no longer continue the live stream due to insufficient battery life.

In some instances, if the remaining battery life of the vehicle falls below the threshold, then the battery component can implement any suitable electricity reroute actions, so as to attempt to prolong the remaining battery life of the vehicle. In other words, the battery component can shut-down or otherwise power-down any suitable electric loads of the vehicle that are unrelated to the live stream. For example, if an air conditioner of the vehicle is running during the live stream, then the battery component can power-down the air conditioner, in response to a determination that the remaining battery life of the vehicle is below the threshold (e.g., the battery component can cease expending battery power on the air conditioner, so that more battery power is available to sustain the live stream). As another example, if a seat heater or seat cooler of the vehicle is running during the live stream, then the battery component can power-down the seat heater or seat cooler, in response to a determination that the remaining battery life of the vehicle is below the threshold (e.g., the battery component can cease expending battery power on the seat heater or seat cooler, so that more battery power is available to sustain the live stream). As yet another example, if undercarriage lighting of the vehicle is running during the live stream, then the battery component can power-down the undercarriage lighting, in response to a determination that the remaining battery life of the vehicle is below the threshold (e.g., the battery component can cease expending battery power on the undercarriage lighting, so that more battery power is available to sustain the live stream).

In various embodiments, the first computerized tool can comprise a remote-control component. In various aspects, the remote-control component can electronically control, adjust, or otherwise manipulate any suitable electronically-controllable features of the vehicle. In various instances, such electronically-controllable features can include electronically-controllable cameras of the vehicle (e.g., one or more cameras of the vehicle whose angles or zoom levels can be electronically adjusted). In various cases, such electronically-controllable features can include electronically-controllable speakers of the vehicle (e.g., one or more audio speakers of the vehicle whose volume levels or whose content-playbacks can be electronically adjusted). In various aspects, such electronically-controllable features can include electronically-controllable lighting of the vehicle (e.g., one or more lights of the vehicle whose brightness levels, colors, or angles can be electronically adjusted). In various instances, such electronically-controllable features can include electronically-controllable steering of the vehicle (e.g., one or more wheels of the vehicle whose steering angles can be electronically adjusted). In various cases, such electronically-controllable features can include electronically-controllable throttles of the vehicle (e.g., one or more wheels of the vehicle whose rotational speeds or torques can be electronically adjusted). In various aspects, such electronically-controllable features can include electronically-controllable braking of the vehicle (e.g., one or more brake pads of the vehicle whose application levels or compression levels can be electronically adjusted).

In various instances, the broadcast component can electronically transmit, during the live stream, an indication of such electronically-controllable features of the vehicle to the receiver component of the second computerized tool (e.g., of the emergency service computing device). In response to the receiver component receiving, retrieving, or otherwise accessing the indication of such electronically-controllable features, the execution component of the second computerized tool (e.g., of the emergency service computing device) can transmit any suitable remote-control commands back to the first computerized tool (e.g., back to the vehicle). In various aspects, the remote-control commands can be any suitable electronic instructions to adjust, in any suitable specified fashions, any of the electronically-controllable features of the vehicle. For example, the remote-control commands can include an instruction to adjust an angle of an electronically-controllable camera of the vehicle by a specified angular displacement. As another example, the remote-control commands can include an instruction to adjust a zoom level of an electronically-controllable camera of the vehicle by a specified percentage. As yet another example, the remote-control commands can include an instruction to adjust a steering angle of an electronically-controllable wheel of the vehicle by a specified angular displacement. As even another example, the remote-control commands can include an instruction to adjust an amount of an electronically-controllable throttle of the vehicle by a specified percentage. As still another example, the remote-control commands can include an instruction to audibly reproduce or play specified sound data or voice data via an electronically-controllable speaker of the vehicle.

In any case, the remote-control component of the first computerized tool can obey the remote-control commands transmitted by the second computerized tool. In other words, the remote-control component can adjust the electronically-controllable features of the vehicle, in accordance with or otherwise as specified by the remote-control commands. Accordingly, the emergency service computing device can be considered as controlling or otherwise acting vicariously through the vehicle. This can allow the emergency service computing device to effectively interact with the scene of the vehicular collision (e.g., to view the vehicular collision through the live-streaming cameras of the vehicle, to move the vehicle so as to view the vehicular collision from a different perspective or vantage point, to vocalize instructions or siren sounds through the speakers of the vehicle, to shine lights of the vehicle on the vehicular collision), notwithstanding that an emergency service vehicle might not yet actually be at the scene.

Various embodiments described herein can be employed to use hardware or software to solve problems that are highly technical in nature (e.g., to facilitate artificially intelligent provision of post-vehicular-collision evidence), that are not abstract and that cannot be performed as a set of mental acts by a human. Further, some of the processes performed can be performed by a specialized computer (e.g., a deep learning neural network having internal parameters such as convolutional kernels) for carrying out defined tasks related to peer-to-peer vehicular provision of artificially intelligent traffic analysis.

For example, such defined tasks can include: capturing, by a device operatively coupled to a processor, onboard a first vehicle, and via one or more first cameras or one or more first microphones of the first vehicle, vicinity data associated with a first vicinity of the first vehicle; determining, by the device and via execution of a deep learning neural network on the vicinity data, whether a vehicular collision not involving the first vehicle has occurred in the first vicinity of the first vehicle; and recording, by the device, in response to a determination that the vehicular collision has occurred, and via the one or more first cameras or the one or more first microphones, first post-collision evidence associated with the first vicinity of the first vehicle.

As another example, such defined tasks can include: capturing, by a device operatively coupled to a processor, onboard a vehicle, and via one or more cameras or one or more microphones of the vehicle, vicinity data associated with a vicinity of the vehicle; generating, by the device and via execution of a deep learning neural network on the vicinity data, a classification label indicating whether a vehicular collision not involving the vehicle has occurred in the vicinity of the vehicle; recording, by the device, in response to the classification label indicating that the vehicular collision has occurred, and via the one or more cameras or the one or more microphones, post-collision evidence associated with the vicinity of the vehicle; and broadcasting, by the device and in response to the classification label indicating that the vehicular collision has occurred, the classification label and the post-collision evidence to an emergency service computing device.

As yet another example, such defined tasks can include: capturing, by a device operatively coupled to a processor, onboard a vehicle, and via one or more cameras or one or more microphones of the vehicle, vicinity data associated with a vicinity of the vehicle; determining, by the device and via execution of a deep learning neural network on the vicinity data, whether a vehicular collision not involving the vehicle has occurred in the vicinity of the vehicle; and broadcasting, by the device, in response to a determination that the vehicular collision has occurred, via the one or more cameras or the one or more microphones, and to an emergency service computing device, a post-collision live stream associated with the vicinity of the vehicle.

As still another example, such defined tasks can include: capturing, by a device operatively coupled to a processor, onboard a vehicle, and via one or more cameras or one or more microphones of the vehicle, vicinity data associated with a vicinity of the vehicle; determining, by the device and via execution of a deep learning neural network on the vicinity data, whether a vehicular collision not involving the vehicle has occurred in the vicinity of the vehicle; and broadcasting, by the device, in response to a determination that the vehicular collision has occurred, and via the one or more cameras or the one or more microphones, one or more electronic notifications to an emergency service computing device.

As even another example, such defined tasks can include: receiving, by a device operatively coupled to a processor, one or more electronic notifications broadcasted by a vehicle; determining, by the device and via parsing, whether the one or more electronic notifications indicate that a vehicular collision not involving the vehicle has occurred in a vicinity of the vehicle; and initiating, by the device and in response to a determination that the one or more electronic notifications indicate that the vehicular collision has occurred, one or more electronic actions based on the vehicular collision.

Such defined tasks are not performed manually by humans. Indeed, neither the human mind nor a human with pen and paper can: electronically capture, measure, or otherwise record vicinity data using vehicle sensors (e.g., cameras, microphones, thermometers, hygrometers, or proximity sensors); electronically detect a vehicular collision by executing a deep learning neural network on such vicinity data; and electronically transmit or receive information pertaining to such vehicular collision. Indeed, vehicle sensors and deep learning neural networks are inherently-computerized devices that simply cannot be implemented in any way by the human mind without computers. Accordingly, a computerized tool that can control vehicle sensors and that can train or execute a deep learning neural network on data captured by such vehicle sensors is likewise inherently-computerized and cannot be implemented in any sensible, practical, or reasonable way without computers.

Moreover, various embodiments described herein can integrate into a practical application various teachings relating to artificially intelligent provision of post-vehicular-collision evidence. As explained above, some existing techniques rely upon eyewitness reports to capture the aftermath of a vehicular collision. However, such eyewitness reports can be vulnerable to misremembering or lying due to bias. As also explained above, other existing techniques rely upon traffic cameras to capture the aftermath of a vehicular collision. However, such traffic cameras are usually installed only at major intersections and cannot move to different vantage points. As also mentioned above, yet other existing techniques rely upon manual activation of personal computing devices to capture the aftermath of a vehicular collision. However, owners of such personal computing devices can forget or choose not to manually activate their personal computing devices when a vehicular collision occurs. These can be considered as various disadvantages of existing techniques.

Various embodiments described herein can address various of these disadvantages. Specifically, various embodiments described herein can include outfitting a vehicle with a computerized tool, where such computerized tool can: automatically capture vicinity data via vehicle sensors (e.g., cameras, microphones, thermometers, hygrometers, proximity detectors); automatically execute a deep learning neural network on the vicinity data, thereby detecting a vehicular collision in the vicinity of the vehicle; and automatically recording or live-streaming, via the vehicular sensors, the aftermath of the detected vehicular collision to an emergency service computing device. In various aspects, the emergency service computing device can be outfitted with a computerized tool, wherein such computerized tool can: automatically receive an electronic alert pertaining to the detected vehicular collision; automatically parse the electronic alert to identify the vehicular collision; and automatically initiate any suitable electronic actions in response to the vehicular collision, such as updating an electronic navigation display of an emergency service vehicle, computing an electronic navigation route leading the vehicular collision, or double-checking the vehicular collision via its own deep learning neural network analysis. Such embodiments can more reliably capture the aftermath of a vehicular collision, as compared to various existing techniques (e.g., which rely on eyewitness reports, traffic cameras, or manual activation of personal computing devices). In some cases, the computerized tool of the emergency service computing device can even transmit any suitable remote-control instructions back to the computerized tool of the vehicle, so as to effectively or vicariously interact with the scene of the vehicular collision even before an emergency service vehicle actually arrives at the scene. In other words, an emergency service response time can be effectively reduced by various embodiments described herein. Accordingly, various embodiments can help to ameliorate various disadvantages of existing techniques. Thus, various embodiments described herein certainly constitute a concrete and tangible technical improvement. Therefore, various embodiments described herein clearly qualify as useful and practical applications of computers.

Furthermore, various embodiments described herein can control real-world tangible devices based on the disclosed teachings. For example, various embodiments described herein can electronically control real-world vehicle sensors (e.g., real-world vehicle cameras, real-world vehicle microphones, real-world vehicle thermometers, real-world vehicle hygrometers, real-world vehicle proximity detectors), can electronically execute (or train) real-world deep learning neural networks on data captured by such real-world vehicle sensors, can electronically transmit or receive results outputted by such real-world deep learning neural networks, and can electronically render such results on real-world computer screens or monitors.

It should be appreciated that the herein figures and description provide non-limiting examples of various embodiments and are not necessarily drawn to scale.

FIG. 1 illustrates an example, non-limiting block diagram 100 showing a vehicular collision occurring within a vicinity of a vehicle, where such vehicle can facilitate artificially intelligent provision of post-vehicular-collision evidence in accordance with one or more embodiments described herein.

In various embodiments, there can be a vehicle 102. In various aspects, the vehicle 102 can be any suitable vehicle or automobile (e.g., can be a car, a truck, a van, a motorcycle). In various instances, the vehicle 102 can have or otherwise exhibit any suitable type of propulsion system (e.g., can be an electric vehicle, can be a gasoline-powered or diesel-powered vehicle, can be a hybrid vehicle). In some cases, the vehicle 102 can be driving on any suitable road, street, lane, or highway at any suitable speed. In other cases, the vehicle 102 can, while driving, be stopped at an intersection, at a traffic light, at a stop sign, at a cross-walk, or at a traffic jam. In yet other cases, the vehicle 102 can be parked rather than driving (e.g., can be parked in a parking lot, by a curb, or in a driveway).

In various aspects, there can be an emergency service system 110. In various instances, the emergency service system 110 can be any suitable computing device that is associated with any suitable emergency service provider. In some cases, the emergency service system 110 can be integrated into any suitable emergency service vehicle (not shown), such as a police vehicle, an ambulance, a firetruck, a tow truck, or a helicopter. In other cases, the emergency service system 110 can be integrated into any suitable emergency service office or emergency service depot that is responsible for dispatching emergency service vehicles (e.g., a police station, a hospital, a fire station). In various instances, the emergency service system 110 can be any suitable distance away from the vehicle 102 (e.g., can be within mere feet of the vehicle 102, or can be many miles away from the vehicle 102.

In any case, the vehicle 102 can comprise, have, or otherwise be outfitted or equipped with a collision evidence system 104. In other words, the collision evidence system 104 can be onboard the vehicle 102. In various aspects, the collision evidence system 104 can, as described herein, electronically monitor a vicinity 106 of the vehicle 102 for vehicular collisions.

In various aspects, the vicinity 106 can be any suitable physical area that encompasses the immediate or nearby surroundings of the vehicle 102. In other words, the vicinity 106 can be any suitable physical area or physical space that is within any suitable threshold distance in front of, beside, or behind the vehicle 102. In some cases, as depicted in FIG. 1, the vicinity 106 can be considered as a circular space swept by any suitable radius extending from the vehicle 102 (e.g., the vehicle 102 can be at the center of such circular space, and such circular space can be considered as moving with the vehicle 102 as the vehicle 102 moves). Although FIG. 1 depicts the vicinity 106 as being circular, this is a mere non-limiting example for ease of illustration. In various aspects, the vicinity 106 can have any suitable shape (e.g., a regular shape or an irregular shape). In any case, the vicinity 106 can be considered as encompassing whatever surroundings happen to be near the vehicle 102 at any given instant in time. Accordingly, depending upon a current location of the vehicle 102, the vicinity 106 can encompass one or more other vehicles (not shown), one or more buildings or portions of buildings (not shown), one or more street lanes (not shown), one or more street curbs (not shown), one or more highway medians (not shown), one or more sidewalks (not shown), one or more ditches or other off-road portions (not shown), one or more pedestrians (not shown), one or more animals (not shown), or any other suitable objects or fixtures (e.g., power poles, street lamps, street signs, fire hydrants, mailboxes, bus stops, benches).

In various aspects, a vehicular collision 108 can occur within the vicinity 106 at any given time. In various instances, the vehicular collision 108 can be any suitable vehicular collision, crash, or accident not involving the vehicle 102. In other words, the vehicular collision 108 can occur near the vehicle 102, such that the vehicle 102 can be considered as witnessing or spectating the vehicular collision 108.

In any case, as described herein, the collision evidence system 104 can continually or periodically scan, using vehicle sensors and deep learning, the vicinity 106 for vehicular collisions. When the vehicular collision 108 occurs in the vicinity 106, the collision evidence system 104 can, as described herein, automatically detect the vehicular collision 108. Upon such detection, the collision evidence system 104 can, as described herein, begin recording, via the vehicle sensors, an aftermath of the vehicular collision 108. Furthermore, the collision evidence system 104 can, as described herein, electronically share such recorded evidence with the emergency service system 110. In particular, the collision evidence system 104 can electronically share whatever recorded evidence it captures regarding the aftermath of the vehicular collision 108 with the emergency service system 110, via a communication link 112. In other words, the collision evidence system 104 and the emergency service system 110 can be communicatively coupled together by the communication link 112. In various instances, the communication link 112 can be any suitable wireless electronic communication channel. In some cases, the communication link 112 can be any suitable Internet connection that utilizes one or more intermediate access points or intermediate routers. In other cases, the communication link 112 can be any suitable P2P connection that can operate or otherwise function in the absence of an intermediate access point or intermediate router. Non-limiting examples of such a P2P connection can include a BLUETOOTH® P2P connection or a Wi-Fi P2P connection (e.g., such as Wi-Fi DIRECT®).

As described herein, the collision evidence system 104 can be considered as regularly monitoring the vicinity 106 for vehicular collisions. Whenever a vehicular collision (e.g., 108) is detected, the collision evidence system 104 can automatically record an aftermath of such vehicular collision, and the collision evidence system 104 can transmit such recorded evidence to the emergency service system 110. As also described herein, the emergency service system 110 can take any suitable electronic actions, based on such recorded evidence.

In some cases, because the vehicle 102 can comprise the collision evidence system 104, the vehicle 102 can be considered as a smart vehicle.

Figure 2:
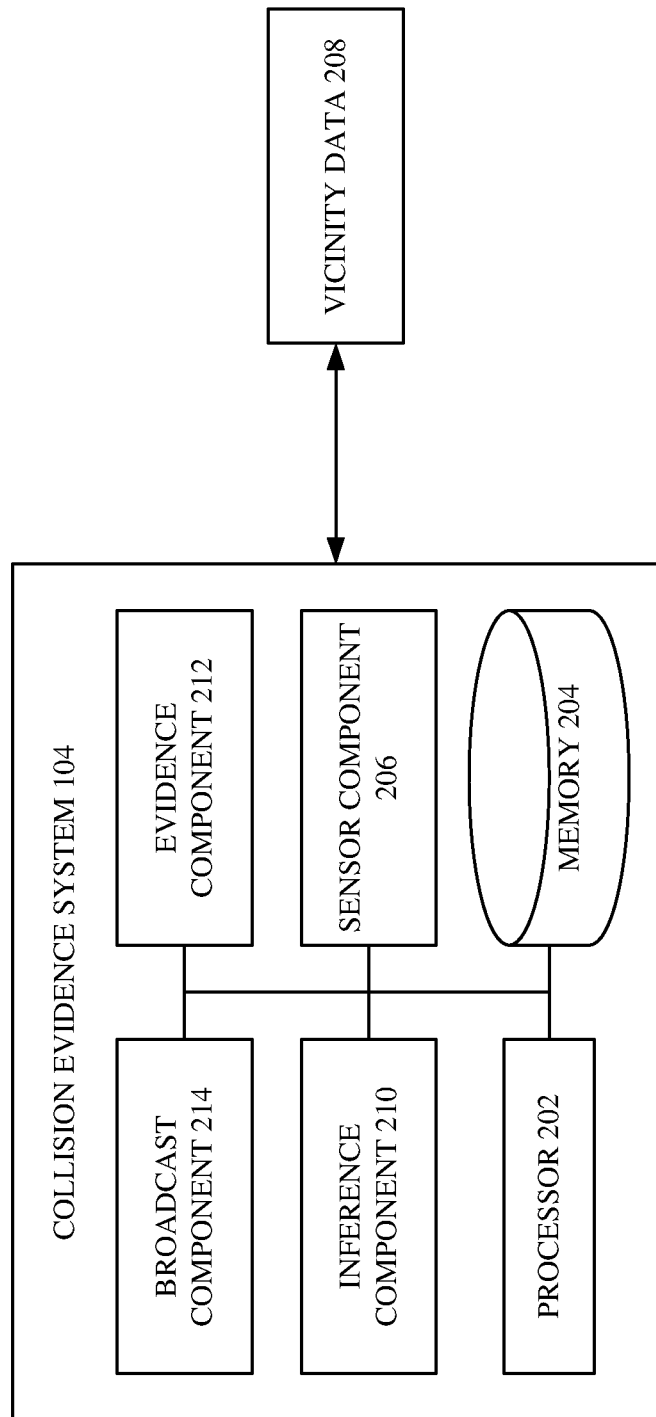
FIG. 2 illustrates a block diagram of an example, non-limiting system that facilitates a broadcast-side of artificially intelligent provision of post-vehicular-collision evidence in accordance with one or more embodiments described herein.

FIG. 2 illustrates a block diagram of an example, non-limiting system 200 that can facilitate a broadcast-side of artificially intelligent provision of post-vehicular-collision evidence in accordance with one or more embodiments described herein. In other words, FIG. 2 depicts a non-limiting example embodiment of the collision evidence system 104.

In various embodiments, the collision evidence system 104 can comprise a processor 202 (e.g., computer processing unit, microprocessor) and a non-transitory computer-readable memory 204 that is operably or operatively or communicatively connected or coupled to the processor 202. The non-transitory computer-readable memory 204 can store computer-executable instructions which, upon execution by the processor 202, can cause the processor 202 or other components of the collision evidence system 104 (e.g., sensor component 206, inference component 210, evidence component 212, broadcast component 214) to perform one or more acts. In various embodiments, the non-transitory computer-readable memory 204 can store computer-executable components (e.g., sensor component 206, inference component 210, evidence component 212, broadcast component 214), and the processor 202 can execute the computer-executable components.

In various embodiments, the collision evidence system 104 can comprise a sensor component 206. In various aspects, as described herein, the sensor component 206 can obtain, via any suitable sensors of the vehicle 102, vicinity data 208. In various cases, the vicinity data 208 can exhibit any suitable format, size, or dimensionality. For example, the vicinity data 208 can comprise one or more scalars, one or more vectors, one or more matrices, one or more tensors, one or more character strings, or any suitable combination thereof.

In various embodiments, the collision evidence system 104 can comprise an inference component 210. In various instances, as described herein, the inference component 210 can detect a vehicular collision (e.g., 108) that occurs within the vicinity 106, based on the vicinity data 208.

In various embodiments, the collision evidence system 104 can comprise an evidence component 212. In various cases, as described herein, the evidence component 212 can record post-collision evidence, in response to the inference component 210 detecting a vehicular collision in the vicinity 106.

In various embodiments, the collision evidence system 104 can comprise a broadcast component 214. In various cases, as described herein, the broadcast component 214 can inform, via the communication link 112, the emergency service system 110 of the detected vehicular collision or of the recorded post-collision evidence.

Figure 3:
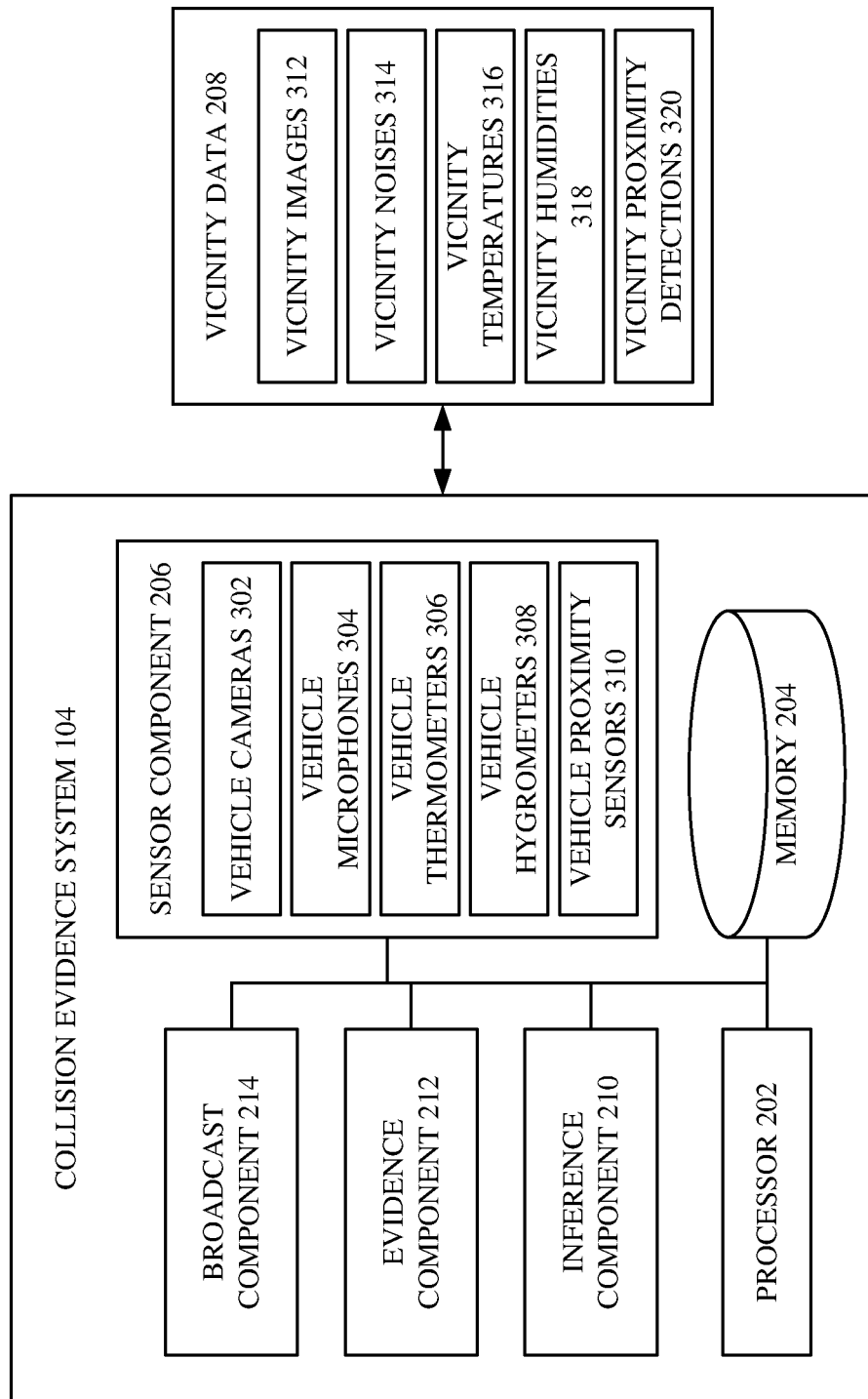
FIG. 3 illustrates a block diagram of an example, non-limiting system including various sensors that facilitates a broadcast-side of artificially intelligent provision of post-vehicular-collision evidence in accordance with one or more embodiments described herein.

FIG. 3 illustrates a block diagram of an example, non-limiting system 300 including various sensors that can facilitate a broadcast-side of artificially intelligent provision of post-vehicular-collision evidence in accordance with one or more embodiments described herein.

In various embodiments, the sensor component 206 can electronically control, electronically execute, electronically activate, or otherwise electronically access any suitable sensors of the vehicle 102. In various aspects, such sensors can be external or road-facing. In other words, such sensors can be oriented or otherwise configured to monitor the vicinity 106 (e.g., the surroundings of the vehicle 102) as the vehicle 102 drives around or is parked.

As a non-limiting example, such sensors can include a set of vehicle cameras 302. In various aspects, the set of vehicle cameras 302 can include any suitable number of any suitable types of cameras (e.g., of image-capture devices). In various instances, the set of vehicle cameras 302 can be integrated into or onto the vehicle 102. In various cases, one or more of the set of vehicle cameras 302 can be forward-facing. For example, such one or more cameras can be integrated into or onto any suitable forward-facing surfaces, whether interior or exterior, of the vehicle 102 (e.g., can be built on a dash of the vehicle 102 so as to look through a front windshield of the vehicle 102, can be built around the front windshield of the vehicle 102, can be built into a front bumper of the vehicle 102, can be built around headlights of the vehicle 102, can be built into a hood of the vehicle 102). Because such one or more cameras can be forward-facing, such one or more cameras can be configured to capture or otherwise record images or video frames of portions of the vicinity 106 that lie in front of the vehicle 102. In various aspects, one or more of the set of vehicle cameras 302 can be rearward-facing. For example, such one or more cameras can be integrated into or onto any suitable rearward-facing surfaces, whether interior or exterior, of the vehicle 102 (e.g., can be built into or on a rearview mirror of the vehicle 102, can be built into or onto sideview mirrors of the vehicle 102, can be built around a rear windshield of the vehicle 102, can be built into a rear bumper of the vehicle 102, can be built around taillights of the vehicle 102, can be built into a trunk-cover of the vehicle 102). Because such one or more cameras can be rearward-facing, such one or more cameras can be configured to capture or otherwise record images or video frames of portions of the vicinity 106 that lie behind the vehicle 102. In various instances, one or more of the set of vehicle cameras 302 can be laterally-facing. For example, such one or more cameras can be integrated into or onto any suitable lateral surfaces, whether interior or exterior, of the vehicle 102 (e.g., can be built into or around doors or door handles of the vehicle 102, can be built into or around fenders of the vehicle 102). Because such one or more cameras can be laterally-facing, such one or more cameras can be configured to capture or otherwise record images or video frames of portions of the vicinity 106 that lie beside the vehicle 102.

As another non-limiting example, such sensors can include a set of vehicle microphones 304. In various aspects, the set of vehicle microphones 304 can include any suitable number of any suitable types of microphones (e.g., of sound-capture devices). In various instances, the set of vehicle microphones 304 can be integrated into or onto the vehicle 102. In various cases, one or more of the set of vehicle microphones 304 can be forward-facing. For example, such one or more microphones can be integrated into or onto any suitable forward-facing surfaces, whether interior or exterior, of the vehicle 102, so as to capture or otherwise record sounds or noises that occur in portions of the vicinity 106 that lie in front of the vehicle 102. In various aspects, one or more of the set of vehicle microphones 304 can be rearward-facing. For example, such one or more microphones can be integrated into or onto any suitable rearward-facing surfaces, whether interior or exterior, of the vehicle 102, so as to capture or otherwise record sounds or noises that occur in portions of the vicinity 106 that lie behind the vehicle 102. In various instances, one or more of the set of vehicle microphones 304 can be laterally-facing. For example, such one or more microphones can be integrated into or onto any suitable lateral surfaces, whether interior or exterior, of the vehicle 102, so as to capture or otherwise record sounds or noises that occur in portions of the vicinity 106 that lie beside the vehicle 102.

As yet another non-limiting example, such sensors can include a set of vehicle thermometers 306. In various aspects, the set of vehicle thermometers 306 can include any suitable number of any suitable types of thermometers (e.g., of temperature sensors). In various instances, the set of vehicle thermometers 306 can be integrated into or onto the vehicle 102. In various cases, one or more of the set of vehicle thermometers 306 can be forward-facing. For example, such one or more thermometers can be integrated into or onto any suitable forward-facing surfaces, whether interior or exterior, of the vehicle 102, so as to capture or otherwise record air temperatures or road surface temperatures associated with portions of the vicinity 106 that lie in front of the vehicle 102. In various aspects, one or more of the set of vehicle thermometers 306 can be rearward-facing. For example, such one or more thermometers can be integrated into or onto any suitable rearward-facing surfaces, whether interior or exterior, of the vehicle 102, so as to capture or otherwise record air temperatures or road surface temperatures associated with portions of the vicinity 106 that lie behind the vehicle 102. In various instances, one or more of the set of vehicle thermometers 306 can be laterally-facing. For example, such one or more thermometers can be integrated into or onto any suitable lateral surfaces, whether interior or exterior, of the vehicle 102, so as to capture or otherwise record air temperatures or road surface temperatures associated with portions of the vicinity 106 that lie beside the vehicle 102.

As even another non-limiting example, such sensors can include a set of vehicle hygrometers 308. In various aspects, the set of vehicle hygrometers 308 can include any suitable number of any suitable types of hygrometers (e.g., of moisture or humidity sensors). In various instances, the set of vehicle hygrometers 308 can be integrated into or onto the vehicle 102. In various cases, one or more of the set of vehicle hygrometers 308 can be forward-facing. For example, such one or more hygrometers can be integrated into or onto any suitable forward-facing surfaces, whether interior or exterior, of the vehicle 102, so as to capture or otherwise record air humidities or road surface moisture levels associated with portions of the vicinity 106 that lie in front of the vehicle 102. In various aspects, one or more of the set of vehicle hygrometers 308 can be rearward-facing. For example, such one or more hygrometers can be integrated into or onto any suitable rearward-facing surfaces, whether interior or exterior, of the vehicle 102, so as to capture or otherwise record air humidities or road surface moisture levels associated with portions of the vicinity 106 that lie behind the vehicle 102. In various instances, one or more of the set of vehicle hygrometers 308 can be laterally-facing. For example, such one or more hygrometers can be integrated into or onto any suitable lateral surfaces, whether interior or exterior, of the vehicle 102, so as to capture or otherwise record air humidities or road surface moisture levels associated with portions of the vicinity 106 that lie beside the vehicle 102.

As still another non-limiting example, such sensors can include a set of vehicle proximity sensors 310. In various aspects, the set of vehicle proximity sensors 310 can include any suitable number of any suitable types of proximity sensors (e.g., of radar, sonar, or lidar sensors). In various instances, the set of vehicle proximity sensors 310 can be integrated into or onto the vehicle 102. In various cases, one or more of the set of vehicle proximity sensors 310 can be forward-facing. For example, such one or more proximity sensors can be integrated into or onto any suitable forward-facing surfaces, whether interior or exterior, of the vehicle 102, so as to capture or otherwise record proximities of tangible objects located in portions of the vicinity 106 that lie in front of the vehicle 102. In various aspects, one or more of the set of vehicle proximity sensors 310 can be rearward-facing. For example, such one or more proximity sensors can be integrated into or onto any suitable rearward-facing surfaces, whether interior or exterior, of the vehicle 102, so as to capture or otherwise record proximities of tangible objects located in portions of the vicinity 106 that lie behind the vehicle 102. In various instances, one or more of the set of vehicle proximity sensors 310 can be laterally-facing. For example, such one or more proximity sensors can be integrated into or onto any suitable lateral surfaces, whether interior or exterior, of the vehicle 102, so as to capture or otherwise record proximities of tangible objects located in portions of the vicinity 106 that lie beside the vehicle 102.

In any case, the sensor component 206 can utilize such sensors to capture, record, or otherwise measure the vicinity data 208.

For example, the set of vehicle cameras 302 can capture a set of vicinity images 312 while the vehicle 102 is driving or parked. In various aspects, the set of vicinity images 312 can include any suitable number of images or video frames (e.g., any suitable number of two-dimensional pixel arrays) that can depict portions of the vicinity 106 (e.g., portions of the vicinity 106 that lie in front of, behind, or beside the vehicle 102).

As another example, the set of vehicle microphones 304 can capture a set of vicinity noises 314 while the vehicle 102 is driving or parked. In various instances, the set of vicinity noises 314 can include any suitable number of audio clips that can represent noises occurring in portions of the vicinity 106 (e.g., in portions of the vicinity 106 that lie in front of, behind, or beside the vehicle 102).

As yet another example, the set of vehicle thermometers 306 can capture a set of vicinity temperatures 316 while the vehicle 102 is driving or parked. In various aspects, the set of vicinity temperatures 316 can include any suitable number of temperature measurements that can represent air temperatures or road surface temperatures associated with portions of the vicinity 106 (e.g., with portions of the vicinity 106 that lie in front of, behind, or beside the vehicle 102).

As still another example, the set of vehicle hygrometers 308 can capture a set of vicinity humidities 318 while the vehicle 102 is driving or parked. In various aspects, the set of vicinity humidities 318 can include any suitable number of humidity measurements or moisture measurements that can represent air humidity levels or road surface moisture levels associated with portions of the vicinity 106 (e.g., with portions of the vicinity 106 that lie in front of, behind, or beside the vehicle 102).

As even another example, the set of vehicle proximity sensors 310 can capture a set of vicinity proximity detections 320 while the vehicle 102 is driving or parked. In various aspects, the set of vicinity proximity detections 320 can include any suitable number of proximity detections (e.g., of radar, sonar, or lidar detections) that can represent distances between the vehicle 102 and nearby objects located in portions of the vicinity 106 (e.g., in portions of the vicinity 106 that lie in front of, behind, or beside the vehicle 102).

Although not explicitly shown in the figures, any of the set of vehicle cameras 302, any of the set of vehicle microphones 304, any of the set of vehicle thermometers 306, any of the set of vehicle hygrometers 308, or any of the set of vehicle proximity sensors 310 can be integrated into or onto a drone (e.g., an autonomous or remotely-operated drone) that can be launched by, controlled by, or otherwise associated with the vehicle 102. For example, the vehicle 102 can launch an air-based or ground-based drone, and such drone can travel along with the vehicle 102 (e.g., can travel in front of the vehicle 102, behind the vehicle 102, or beside the vehicle 102). As such drone travels along with the vehicle 102, such drone can utilize any suitable sensors (e.g., cameras, microphones, thermometers, hygrometers, proximity sensors) integrated into or onto the drone to monitor the vicinity 106. In various cases, such drone can electronically transmit (e.g., via a P2P communication link) any data captured by its sensors back to the vehicle 102, and such captured data can be considered as part of the vicinity data 208.

In any case, the set of vicinity images 312, the set of vicinity noises 314, the set of vicinity temperatures 316, the set of vicinity humidities 318, and the set of vicinity proximity detections 320 can collectively be considered as the vicinity data 208.

Figure 4:
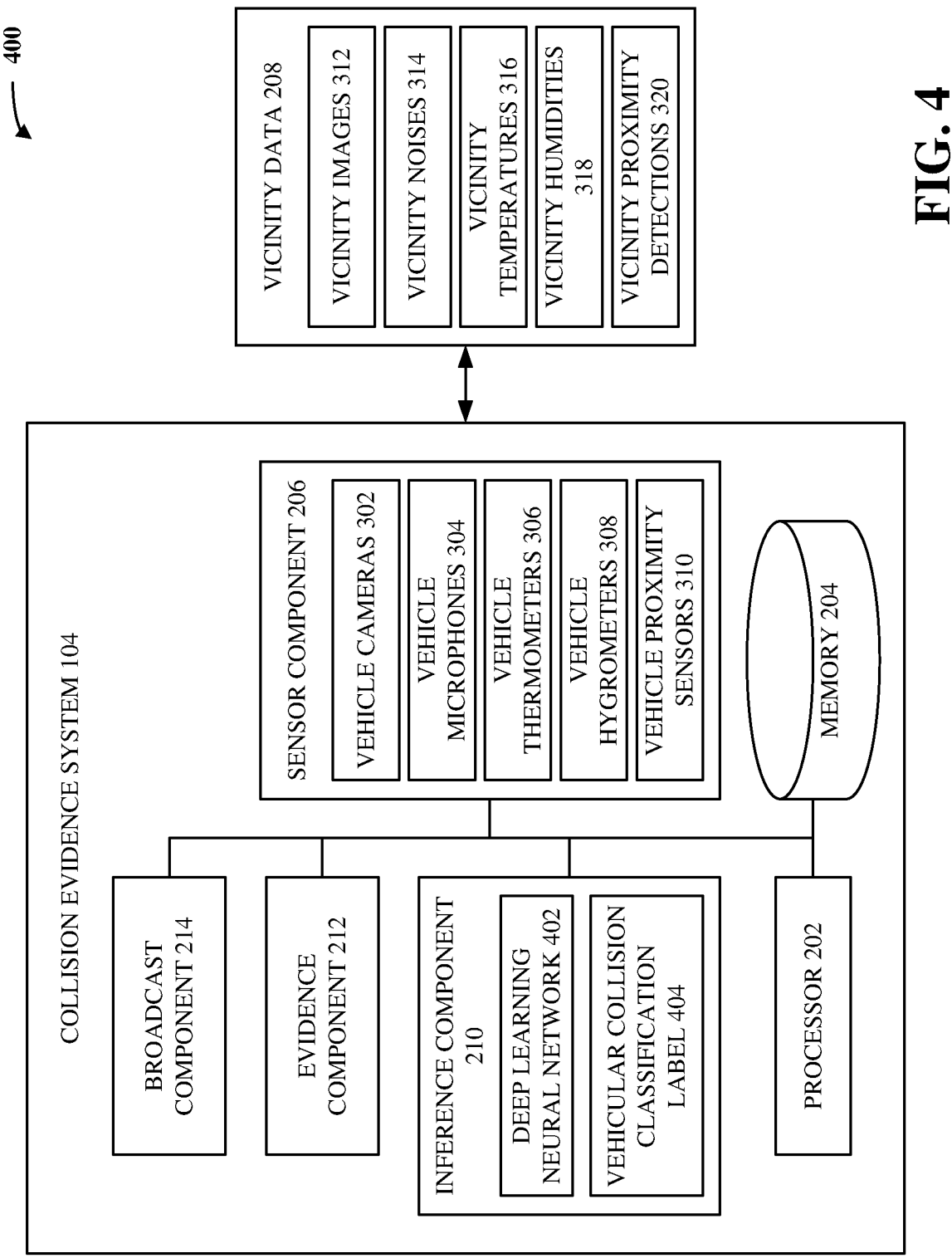
FIG. 4 illustrates a block diagram of an example, non-limiting system including a deep learning neural network and a vehicular collision classification label that facilitates a broadcast-side of artificially intelligent provision of post-vehicular-collision evidence in accordance with one or more embodiments described herein.

FIG. 4 illustrates a block diagram of an example, non-limiting system 400 including a deep learning neural network and a vehicular collision classification label that can facilitate a broadcast-side of artificially intelligent provision of post-vehicular-collision evidence in accordance with one or more embodiments described herein. As shown, the system 400 can, in some cases, comprise the same components as the system 300, and can further comprise a deep learning neural network 402 or a vehicular collision classification label 404.

In various embodiments, the inference component 210 can electronically store, electronically maintain, electronically control, or otherwise electronically access the deep learning neural network 402. In various aspects, the deep learning neural network 402 can have or otherwise exhibit any suitable internal architecture. For instance, the deep learning neural network 402 can have an input layer, one or more hidden layers, and an output layer. In various instances, any of such layers can be coupled together by any suitable interneuron connections or interlayer connections, such as forward connections, skip connections, or recurrent connections. Furthermore, in various cases, any of such layers can be any suitable types of neural network layers having any suitable learnable or trainable internal parameters. For example, any of such input layer, one or more hidden layers, or output layer can be convolutional layers, whose learnable or trainable parameters can be convolutional kernels. As another example, any of such input layer, one or more hidden layers, or output layer can be dense layers, whose learnable or trainable parameters can be weight matrices or bias values. As still another example, any of such input layer, one or more hidden layers, or output layer can be batch normalization layers, whose learnable or trainable parameters can be shift factors or scale factors. Further still, in various cases, any of such layers can be any suitable types of neural network layers having any suitable fixed or non-trainable internal parameters. For example, any of such input layer, one or more hidden layers, or output layer can be non-linearity layers, padding layers, pooling layers, or concatenation layers.

No matter the internal architecture of the deep learning neural network 402, the deep learning neural network 402 can be configured to detect vehicular collisions based on inputted vicinity data. Accordingly, the inference component 210 can electronically execute the deep learning neural network 402 on the vicinity data 208, thereby yielding the vehicular collision classification label 404. Various non-limiting aspects are described with respect to FIG. 5.

Figure 5:
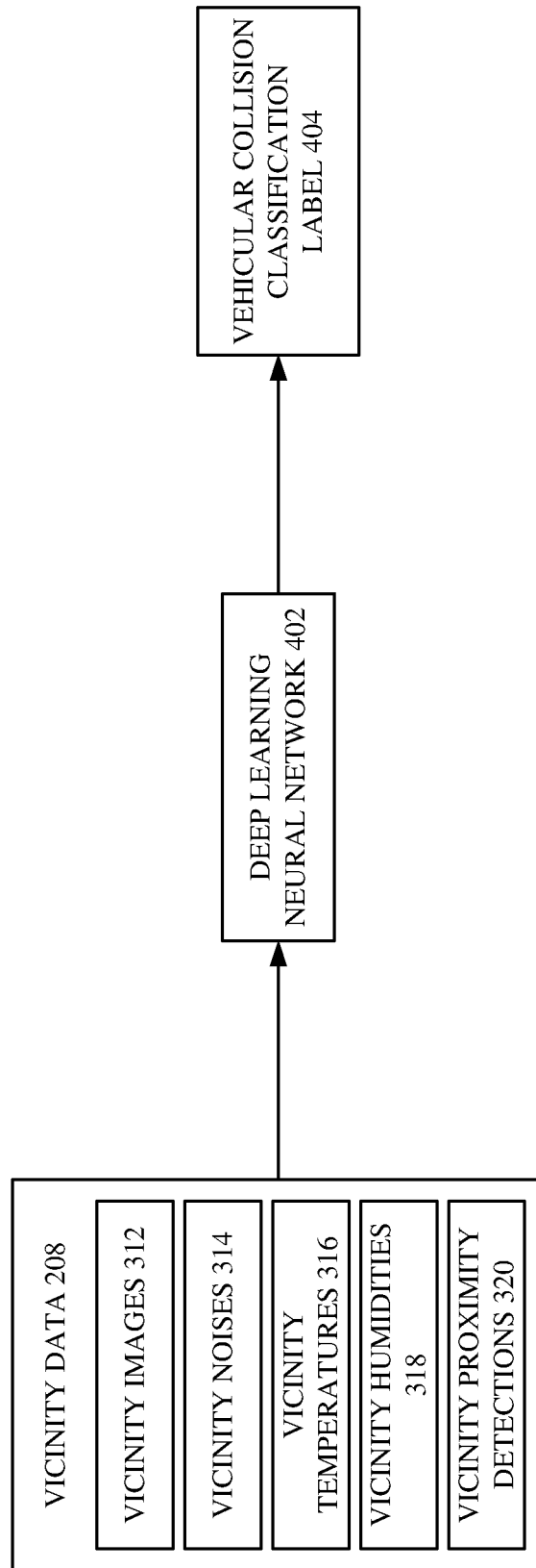
FIG. 5 illustrates an example, non-limiting block diagram showing how a deep learning neural network can generate a vehicular collision classification label based on vicinity data in accordance with one or more embodiments described herein.

FIG. 5 illustrates an example, non-limiting block diagram 500 showing how the deep learning neural network 402 can generate the vehicular collision classification label 404 based on the vicinity data 208 in accordance with one or more embodiments described herein.

As shown, the inference component 210 can, in various aspects, execute the deep learning neural network 402 on the vicinity data 208, and such execution can cause the deep learning neural network 402 to produce the vehicular collision classification label 404. More specifically, the inference component 210 can feed the vicinity data 208 (e.g., the set of vicinity images 312, the set of vicinity noises 314, the set of vicinity temperatures 316, the set of vicinity humidities 318, or the set of vicinity proximity detections 320) to an input layer of the deep learning neural network 402. In various instances, the vicinity data 208 (e.g., the set of vicinity images 312, the set of vicinity noises 314, the set of vicinity temperatures 316, the set of vicinity humidities 318, or the set of vicinity proximity detections 320) can complete a forward pass through one or more hidden layers of the deep learning neural network 402. In various cases, an output layer of the deep learning neural network 402 can compute the vehicular collision classification label 404, based on activation maps or intermediate features produced by the one or more hidden layers.

In various aspects, the vehicular collision classification label 404 can be any suitable electronic data exhibiting any suitable format, size, or dimensionality. That is, the vehicular collision classification label 404 can be one or more scalars, one or more vectors, one or more matrices, one or more tensors, one or more character strings, or any suitable combination thereof. In various instances, the sensor component 206 can capture, measure, or otherwise record the vicinity data 208 when the vehicle 102 is at any given geolocation (e.g., when the vicinity 106 is at that given geolocation), and the vehicular collision classification label 404 can indicate, specify, convey, or otherwise represent whether a vehicular collision (e.g., 108) has occurred or is occurring at such given geolocation. In some cases, if the vehicular collision classification label 404 indicates that a vehicular collision has occurred or is occurring at such given geolocation, then the vehicular collision classification label 404 can further indicate, specify, convey, or otherwise represent any suitable characteristics, attributes, or properties of such vehicular collision. Various non-limiting aspects are described with respect to FIG. 6.

Figure 6:
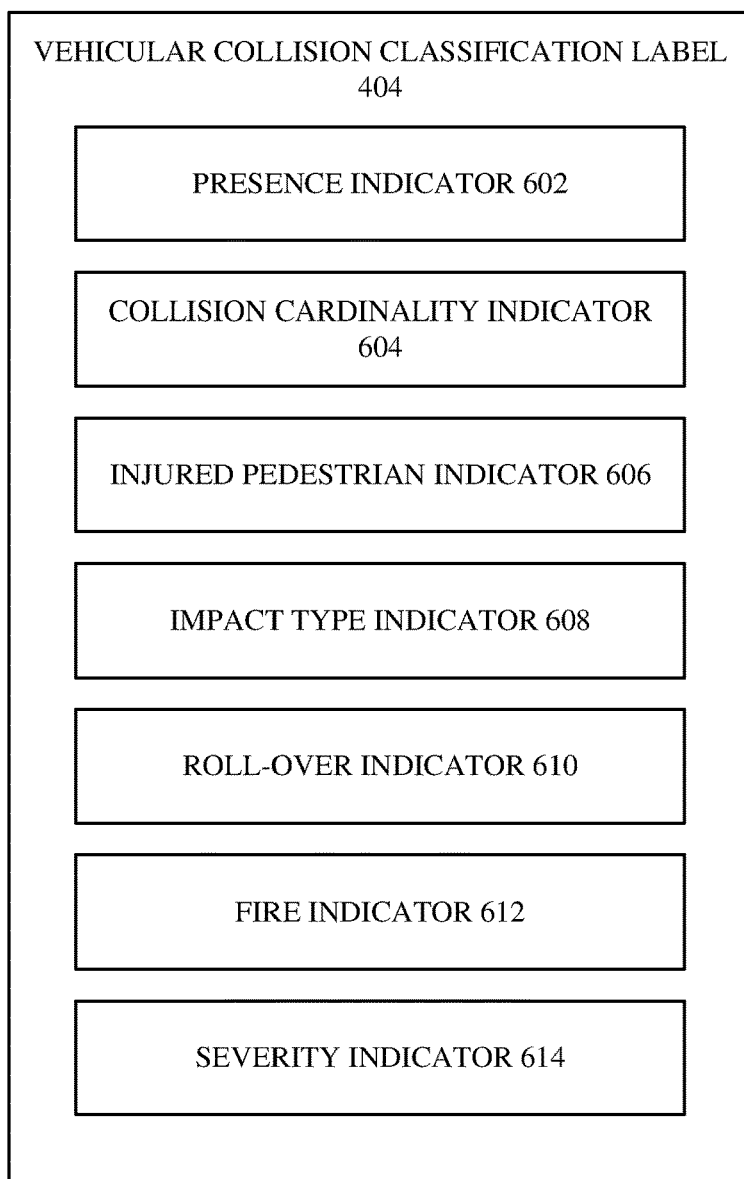
FIG. 6 illustrates an example, non-limiting block diagram of a vehicular collision classification label in accordance with one or more embodiments described herein.

FIG. 6 illustrates an example, non-limiting block diagram 600 of a vehicular collision classification label in accordance with one or more embodiments described herein. That is, FIG. 6 depicts a non-limiting example embodiment of the vehicular collision classification label 404.

In various aspects, as shown, the vehicular collision classification label 404 can comprise a presence indicator 602. In various instances, the presence indicator 602 can have any suitable format, size, or dimensionality. That is, the presence indicator 602 can be one or more scalars, one or more vectors, one or more matrices, one or more tensors, one or more character strings, or any suitable combination thereof. In any case, the presence indicator 602 can indicate, convey, or otherwise represent a presence or an absence of a vehicular collision in the vicinity 106. For instance, the sensor component 206 can capture the vicinity data 208 when the vehicle 102 is at a given geolocation, and the deep learning neural network 402 can be trained or otherwise configured, as described herein, to determine, based on the vicinity data 208, whether a vehicular collision (e.g., 108) is occurring at that given geolocation. In other words, if a vehicular collision is occurring at that given geolocation, some manifestation of such vehicular collision can be conveyed in the vicinity data 208 (e.g., the vehicular collision can be depicted in the set of vicinity images 312, distinctive sounds of the vehicular collision can be captured in the set of vicinity noises 314, the vehicular collision can cause a distinctive anomaly in the set of vicinity proximity detections 320), and the deep learning neural network 402 can recognize such manifestation of the vehicular collision. Conversely, if no vehicular collision is occurring at that given geolocation, no manifestation of such vehicular collision would be conveyed in the vicinity data 208 (e.g., no vehicular collision would be depicted in the set of vicinity images 312, no distinctive sounds of a vehicular collision would be captured in the set of vicinity noises 314, no distinctive anomalies of a vehicular collision would be in the set of vicinity proximity detections 320), and the deep learning neural network 402 can recognize such lack of manifestation of a vehicular collision. In any of these cases, the presence indicator 602 can represent the determination, inference, or conclusion generated by the deep learning neural network 402 with respect to the presence or absence of the vehicular collision.

As a non-limiting example, the presence indicator 602 can be a binary or binomial variable; that is, a variable that can take on one of two possible discrete states. In such case, one of the two possible discrete states can represent a "present" state, whereas the other of the two possible discrete states can represent an "absent" state. That is, the presence indicator 602 can take on the "present" state when the deep learning neural network 402 infers that a vehicular collision is occurring, and the presence indicator 602 can take on the "absent" state when the deep learning neural network 402 instead infers that no vehicular collision is occurring. As another non-limiting example, the presence indicator 602 can be a scalar whose magnitude (e.g., ranging continuously from 0 to 1) represents a likelihood or probability that a vehicular collision is occurring (or is not occurring).

In various aspects, as shown, the vehicular collision classification label 404 can comprise a collision cardinality indicator 604. In various instances, the collision cardinality indicator 604 can have any suitable format, size, or dimensionality. That is, the collision cardinality indicator 604 can be one or more scalars, one or more vectors, one or more matrices, one or more tensors, one or more character strings, or any suitable combination thereof. In any case, the collision cardinality indicator 604 can indicate, convey, or otherwise represent how many vehicles are involved in a vehicular collision that is occurring in the vicinity 106. For instance, the sensor component 206 can capture the vicinity data 208 when the vehicle 102 is at a given geolocation, and the deep learning neural network 402 can be trained or otherwise configured, as described herein, to determine, based on the vicinity data 208, not just that a vehicular collision (e.g., 108) is occurring at that given geolocation, but also how many vehicles are involved in such vehicular collision. In other words, if a vehicular collision is occurring at that given geolocation, some manifestation of how many vehicles are involved in such vehicular collision can be conveyed in the vicinity data 208 (e.g., the number of involved/damaged vehicles can be depicted in the set of vicinity images 312, distinctive sounds associated with the number of involved/damaged vehicles can be captured in the set of vicinity noises 314, distinctive anomalies caused by the number of involved/damaged vehicles can be in the set of vicinity proximity detections 320), and the deep learning neural network 402 can recognize such manifestation of how many vehicles are involved in the vehicular collision. In any of these cases, the collision cardinality indicator 604 can represent the determination, inference, or conclusion generated by the deep learning neural network 402 with respect to how many vehicles are involved in a detected vehicular collision.

As a non-limiting example, the collision cardinality indicator 604 can be a binary or binomial variable that can take on one of two possible discrete states. In such case, one of the two possible discrete states can represent a "single-vehicle" state, whereas the other of the two possible discrete values can represent a "multi-vehicle" state. That is, the collision cardinality indicator 604 can take on the "single-vehicle" state when the deep learning neural network 402 infers that a detected vehicular collision involves only a single vehicle, and the collision cardinality indicator 604 can take on the "multi-vehicle" state when the deep learning neural network 402 instead infers that the detected vehicular collision involves more than a single vehicle. As another non-limiting example, the collision cardinality indicator 604 can be a multinomial variable; that is, a variable that can take on one of three or more possible discrete states. In such case, the three or more possible discrete states can respectively represent any suitable vehicle cardinality labels or vehicle cardinality states (e.g., a "single-vehicle" state, a "two-vehicle" state, a "three-vehicle" state, a "four-or-more-vehicle" state). As yet another non-limiting example, the collision cardinality indicator 604 can be a scalar whose magnitude represents how many vehicles are involved in a detected vehicular collision.

In various aspects, as shown, the vehicular collision classification label 404 can comprise an injured pedestrian indicator 606. In various instances, the injured pedestrian indicator 606 can have any suitable format, size, or dimensionality. That is, the injured pedestrian indicator 606 can be one or more scalars, one or more vectors, one or more matrices, one or more tensors, one or more character strings, or any suitable combination thereof. In any case, the injured pedestrian indicator 606 can indicate, convey, or otherwise represent whether (or how many) pedestrians seem to have been injured in a vehicular collision that is occurring in the vicinity 106. For instance, the sensor component 206 can capture the vicinity data 208 when the vehicle 102 is at a given geolocation, and the deep learning neural network 402 can be trained or otherwise configured, as described herein, to determine, based on the vicinity data 208, not just that a vehicular collision (e.g., 108) is occurring at that given geolocation, but also whether (or how many) pedestrians have been injured by the vehicular collision. In other words, if pedestrians have been injured in a vehicular collision that is occurring at that given geolocation, some manifestation of those injured pedestrians can be conveyed in the vicinity data 208 (e.g., the injured pedestrians can be depicted in the set of vicinity images 312, distinctive sounds associated with the injured pedestrians can be captured in the set of vicinity noises 314, distinctive anomalies caused by the injured pedestrians can be in the set of vicinity proximity detections 320), and the deep learning neural network 402 can recognize such manifestation of injured pedestrians. Conversely, if no pedestrians have been injured in the vehicular collision, no manifestation of such injured pedestrians would be conveyed in the vicinity data 208 (e.g., no injured pedestrians would be depicted in the set of vicinity images 312, no distinctive sounds of injured pedestrians would be captured in the set of vicinity noises 314, no distinctive anomalies associated with injured pedestrians would be in the set of vicinity proximity detections 320), and the deep learning neural network 402 can recognize such lack of manifestation of injured pedestrians. In any of these cases, the injured pedestrian indicator 606 can represent the determination, inference, or conclusion generated by the deep learning neural network 402 with respect to whether (or how many) pedestrians have been injured by a detected vehicular collision.

As a non-limiting example, the injured pedestrian indicator 606 can be a binary or binomial variable that can take on one of two possible discrete states. In such case, one of the two possible discrete states can represent a "no-injured-pedestrians" state, whereas the other of the two possible discrete values can represent a "one-or-more-injured-pedestrians" state. That is, the injured pedestrian indicator 606 can take on the "no-injured-pedestrians" state when the deep learning neural network 402 infers that a detected vehicular collision involves no injured pedestrians, and the injured pedestrian indicator 606 can take on the "one-or-more-injured-pedestrians" state when the deep learning neural network 402 instead infers that the detected vehicular collision involves at least one injured pedestrian. As another non-limiting example, the injured pedestrian indicator 606 can be a multinomial variable that can take on one of three or more possible discrete states. In such case, the three or more possible discrete states can respectively represent any suitable injured pedestrian cardinality labels or injured pedestrian cardinality states (e.g., a "no-injured-pedestrians" state, a "one-injured pedestrian state" state, a "two-injured-pedestrians" state, a "three-or-more-injured-pedestrians" state). As yet another non-limiting example, the injured pedestrian indicator 606 can be a scalar whose magnitude represents how many injured pedestrians are involved in a detected vehicular collision.

In various aspects, as shown, the vehicular collision classification label 404 can comprise an impact type indicator 608. In various instances, the impact type indicator 608 can have any suitable format, size, or dimensionality. That is, the impact type indicator 608 can be one or more scalars, one or more vectors, one or more matrices, one or more tensors, one or more character strings, or any suitable combination thereof. In any case, the impact type indicator 608 can indicate, convey, or otherwise represent a type of vehicular impact involved in a vehicular collision that is occurring in the vicinity 106. For instance, the sensor component 206 can capture the vicinity data 208 when the vehicle 102 is at a given geolocation, and the deep learning neural network 402 can be trained or otherwise configured, as described herein, to determine, based on the vicinity data 208, not just that a vehicular collision (e.g., 108) is occurring at that given geolocation, but also what type of vehicular impact (e.g., head-on impact (sub-types of which can include full-overlap, offset or partial-overlap, angled, glancing, or underside), rear-end impact (sub-types of which can include full-overlap, offset or partial-overlap, angled, glancing, or underside), side-impact (sub-types of which can include offzone or L-type, non-offzone or non-L-type, left, right, near, or far), or side-swipe) seems to be involved in the vehicular collision. In other words, if a vehicular collision that is occurring at that given geolocation involves a head-on impact, some manifestation of the head-on impact can be conveyed in the vicinity data 208 (e.g., damaged front-ends can be depicted in the set of vicinity images 312, distinctive sounds associated with head-on impacts can be captured in the set of vicinity noises 314, distinctive anomalies caused by a head-on impact can be in the set of vicinity proximity detections 320), and the deep learning neural network 402 can recognize such manifestation of head-on impact. On the other hand, if the vehicular collision instead involves a side-swipe, some manifestation of the side-swipe can be conveyed in the vicinity data 208 (e.g., scraped vehicle doors can be depicted in the set of vicinity images 312, distinctive sounds associated with side-swipes can be captured in the set of vicinity noises 314, distinctive anomalies caused by a side-swipe can be in the set of vicinity proximity detections 320), and the deep learning neural network 402 can recognize such manifestation of side-swipe. In any of these cases, the impact type indicator 608 can represent the determination, inference, or conclusion generated by the deep learning neural network 402 with respect to what type of impact seems to be involved in a detected vehicular collision.

As a non-limiting example, the impact type indicator 608 can be a multinomial variable that can take on one of three or more possible discrete states. In such case, the three or more possible discrete states can respectively represent any suitable impact type labels or impact type states. For instance, the impact type indicator 608 can have a "head-on-impact" state, a "rear-end-impact" state, a "side-impact" state, or a "side-swipe" state.

In various aspects, as shown, the vehicular collision classification label 404 can comprise a roll-over indicator 610. In various instances, the roll-over indicator 610 can have any suitable format, size, or dimensionality. That is, the roll-over indicator 610 can be one or more scalars, one or more vectors, one or more matrices, one or more tensors, one or more character strings, or any suitable combination thereof. In any case, the roll-over indicator 610 can indicate, convey, or otherwise represent whether a vehicular collision that is occurring in the vicinity 106 involves a rolled-over (e.g., upside-down or sideways-up) vehicle. For instance, the sensor component 206 can capture the vicinity data 208 when the vehicle 102 is at a given geolocation, and the deep learning neural network 402 can be trained or otherwise configured, as described herein, to determine, based on the vicinity data 208, not just that a vehicular collision (e.g., 108) is occurring at that given geolocation, but also whether that vehicular collision seems to involve a rolled-over vehicle. In other words, if a vehicular collision that is occurring at that given geolocation involves a rolled-over vehicle, some manifestation of the rolled-over vehicle can be conveyed in the vicinity data 208 (e.g., the rolled-over vehicle can be depicted in the set of vicinity images 312, distinctive sounds associated with roll-over can be captured in the set of vicinity noises 314, distinctive anomalies caused by a roll-over can be in the set of vicinity proximity detections 320), and the deep learning neural network 402 can recognize such manifestation of the rolled-over vehicle. Conversely, if the vehicular collision involves no rolled-over vehicle, no manifestation of a rolled-over vehicle would be conveyed in the vicinity data 208 (e.g., no rolled-over vehicle would be depicted in the set of vicinity images 312, no distinctive sounds associated with roll-over would be captured in the set of vicinity noises 314, no distinctive anomalies caused by a roll-over would be in the set of vicinity proximity detections 320), and the deep learning neural network 402 can recognize such lack of manifestation of roll-over. In any of these cases, the roll-over indicator 610 can represent the determination, inference, or conclusion generated by the deep learning neural network 402 with respect to whether a detected vehicular collision involves a roll-over.

As a non-limiting example, the roll-over indicator 610 can be a binary or binomial variable that can take on one of two possible discrete states. In such case, one of the two possible discrete states can represent a "roll-over" state, whereas the other of the two possible discrete states can represent an "no-roll-over" state. That is, the roll-over indicator 610 can take on the "roll-over" state when the deep learning neural network 402 infers that a detected vehicular collision involves a roll-over, and the roll-over indicator 610 can take on the "no-roll-over" state when the deep learning neural network 402 instead infers that the detected vehicular collision does not involve a roll-over. As another non-limiting example, the roll-over indicator 610 can be a scalar whose magnitude (e.g., ranging continuously from 0 to 1) represents a likelihood or probability that a detected vehicular collision involves a roll-over (or does not involve a roll-over).

In various aspects, as shown, the vehicular collision classification label 404 can comprise a fire indicator 612. In various instances, the fire indicator 612 can have any suitable format, size, or dimensionality. That is, the fire indicator 612 can be one or more scalars, one or more vectors, one or more matrices, one or more tensors, one or more character strings, or any suitable combination thereof. In any case, the fire indicator 612 can indicate, convey, or otherwise represent whether a vehicular collision that is occurring in the vicinity 106 involves fire, flames, smoke, or other potentially explosive aspects. For instance, the sensor component 206 can capture the vicinity data 208 when the vehicle 102 is at a given geolocation, and the deep learning neural network 402 can be trained or otherwise configured, as described herein, to determine, based on the vicinity data 208, not just that a vehicular collision (e.g., 108) is occurring at that given geolocation, but also whether that vehicular collision seems to involve a vehicular fire. In other words, if a vehicular collision that is occurring at that given geolocation involves a vehicular fire, some manifestation of the vehicular fire can be conveyed in the vicinity data 208 (e.g., fire, flames, or smoke can be depicted in the set of vicinity images 312, distinctive sounds associated with vehicular fires can be captured in the set of vicinity noises 314, distinctive anomalies caused by vehicular fires can be in the set of vicinity temperatures 316 or the set of vicinity humidities 318), and the deep learning neural network 402 can recognize such manifestation of the vehicular fire. Conversely, if the vehicular collision involves no vehicular fire, no manifestation of a vehicular fire would be conveyed in the vicinity data 208 (e.g., no fire, flames, or smoke would be depicted in the set of vicinity images 312, no distinctive sounds associated with vehicular fires would be captured in the set of vicinity noises 314, no distinctive anomalies caused by vehicular fires would be in the set of vicinity temperatures 316 or the set of vicinity humidities 318), and the deep learning neural network 402 can recognize such lack of manifestation of vehicular fire. In any of these cases, the fire indicator 612 can represent the determination, inference, or conclusion generated by the deep learning neural network 402 with respect to whether a detected vehicular collision involves a vehicular fire.

As a non-limiting example, the fire indicator 612 can be a binary or binomial variable that can take on one of two possible discrete states. In such case, one of the two possible discrete states can represent a "fire" state, whereas the other of the two possible discrete states can represent an "no-fire" state. That is, the fire indicator 612 can take on the "fire" state when the deep learning neural network 402 infers that a detected vehicular collision involves a vehicular fire, and the fire indicator 612 can take on the "no-fire" state when the deep learning neural network 402 instead infers that the detected vehicular collision does not involve a vehicular fire. As another non-limiting example, the fire indicator 612 can be a scalar whose magnitude (e.g., ranging continuously from 0 to 1) represents a likelihood or probability that a detected vehicular collision involves a vehicular fire (or does not involve a vehicular fire).

In various aspects, as shown, the vehicular collision classification label 404 can comprise a severity indicator 614. In various instances, the severity indicator 614 can have any suitable format, size, or dimensionality. That is, the severity indicator 614 can be one or more scalars, one or more vectors, one or more matrices, one or more tensors, one or more character strings, or any suitable combination thereof. In any case, the severity indicator 614 can indicate, convey, or otherwise represent how severe a vehicular collision that is occurring in the vicinity 106 seems to be. For instance, the sensor component 206 can capture the vicinity data 208 when the vehicle 102 is at a given geolocation, and the deep learning neural network 402 can be trained or otherwise configured, as described herein, to determine, based on the vicinity data 208, not just that a vehicular collision (e.g., 108) is occurring at that given geolocation, but also a severity level of such vehicular collision. In other words, if a highly-severe vehicular collision is occurring at that given geolocation, some manifestation of such high severity can be conveyed in the vicinity data 208 (e.g., highly crumpled or significantly destroyed vehicles can be depicted in the set of vicinity images 312, very loud crashing sounds associated with highly-severe vehicular collisions can be captured in the set of vicinity noises 314), and the deep learning neural network 402 can recognize such manifestation of high severity. Conversely, if a non-severe vehicular collision is occurring at that given geolocation, some manifestation of such low severity can be conveyed in the vicinity data 208 (e.g., very little vehicle damage can be depicted in the set of vicinity images 312, relatively non-loud crashing sounds associated with non-severe vehicular collisions can be captured in the set of vicinity noises 314), and the deep learning neural network 402 can recognize such manifestation of low severity. In any of these cases, the severity indicator 614 can represent the determination, inference, or conclusion generated by the deep learning neural network 402 with respect to how severe a detected vehicular collision is.

As a non-limiting example, the severity indicator 614 can be a binary or binomial variable that can take on one of two possible discrete states. In such case, one of the two possible discrete states can represent a "severe" state, whereas the other of the two possible discrete values can represent a "not-severe" state. As another non-limiting example, the severity indicator 614 can be a multinomial variable that can take on one of three or more possible discrete states. In such case, the three or more possible discrete states can respectively represent any suitable severity labels or severity states (e.g., a "not-severe" state, a "slightly-severe" state, a "moderately-severe" state, a "highly-severe" state). As yet another non-limiting example, the severity indicator 614 can be a scalar whose magnitude represents how severe a detected vehicular collision is.

Although not explicitly shown in FIG. 6, the vehicular collision classification label 404 can comprise any other suitable indicators. As a non-limiting example, the vehicular collision classification label 404 can comprise an airborne indicator (not shown), which can exhibit any suitable size, format, or dimensionality, and which can binomially, multinomially, discretely, or continuously indicate whether a vehicular collision that is occurring in the vicinity 106 involves a vehicle that has become airborne (e.g., that has lost physical contact with the ground for at least a moment). As another non-limiting example, the vehicular collision classification label 404 can comprise a terrain indicator (not shown), which can exhibit any suitable size, format, or dimensionality, and which can binomially, multinomially, discretely, or continuously indicate a type of terrain (e.g., pavement, dirt, mud, sand, rocks, grass, ditch) associated with a vehicular collision that is occurring in the vicinity 106. As still another non-limiting example, the vehicular collision classification label 404 can comprise a final resting orientation indicator (not shown), which can exhibit any suitable size, format, or dimensionality, and which can binomially, multinomially, discretely, or continuously indicate a final resting orientation (e.g., on wheels, on left side, on right side, on roof) of a vehicle involved in a vehicular collision that is occurring in the vicinity 106. As even another non-limiting example, the vehicular collision classification label 404 can comprise a pedestrian cardinality indicator (not shown), which can exhibit any suitable size, format, or dimensionality, and which can binomially, multinomially, discretely, or continuously indicate how many total pedestrians or other vulnerable road users there are (e.g., that are standing, walking, running, or lying down, whether injured or uninjured) at the scene of a vehicular collision that is occurring in the vicinity 106.

In any case, the inference component 210 can execute the deep learning neural network 402 on the vicinity data 208, thereby yielding the vehicular collision classification label 404.

Figure 7:
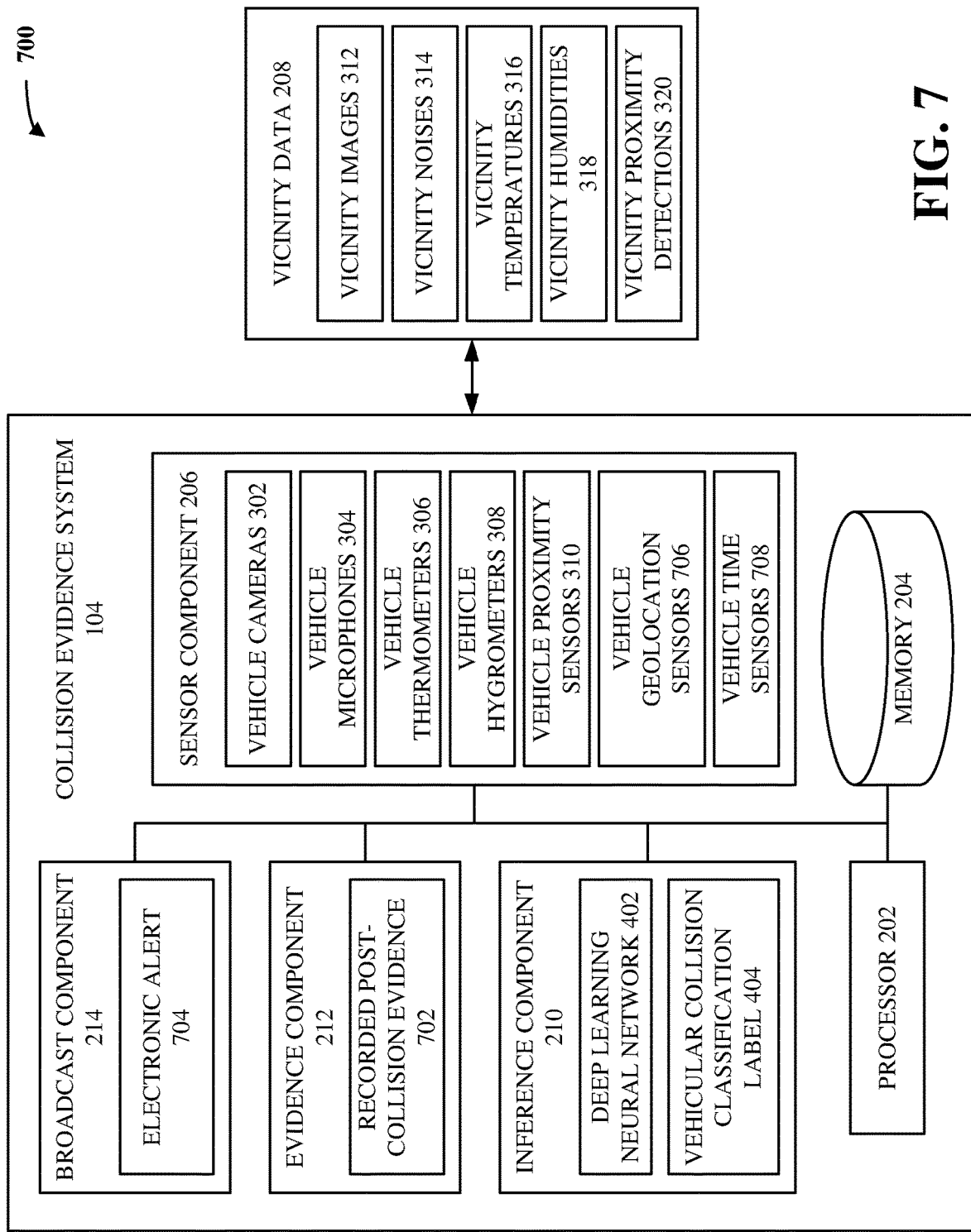
FIG. 7 illustrates a block diagram of an example, non-limiting system including recorded post-collision evidence and an electronic alert that facilitates a broadcast-side of artificially intelligent provision of post-vehicular-collision evidence in accordance with one or more embodiments described herein.

FIG. 7 illustrates a block diagram of an example, non-limiting system 700 including recorded post-collision evidence and an electronic alert that can facilitate a broadcast-side of artificially intelligent provision of post-vehicular-collision evidence in accordance with one or more embodiments described herein. As shown, the system 700 can, in some cases, comprise the same components as the system 400, and can further comprise recorded post-collision evidence 702, an electronic alert 704, a set of vehicle geolocation sensors 706, or a set of vehicle time sensors 708.

In various embodiments, the evidence component 212 can electronically generate the recorded post-collision evidence 702, based on the vehicular collision classification label 404. More specifically, in response to the vehicular collision classification label 404 indicating that a vehicular collision (e.g., 108) is occurring in the vicinity 106, the evidence component 212 can cause the various sensors of the vehicle 102 to record whatever transpires within the vicinity 106 for any suitable temporal duration that follows detection of the vehicular collision, and such data can be considered as the recorded post-collision evidence 702. Accordingly, the broadcast component 214 can electronically generate the electronic alert 704, based on the recorded post-collision evidence 702 or based on the vehicular collision classification label 404, and the broadcast component 214 can transmit, via the communication link 112, the electronic alert 704 to the emergency service system 110. In this way, the vehicle 102 can be considered as informing or notifying the emergency service system 110 of the vehicular collision detected by the deep learning neural network 402 and of the recorded/captured aftermath of such vehicular collision. Various non-limiting details are described with respect to FIG. 8.

Figure 8:
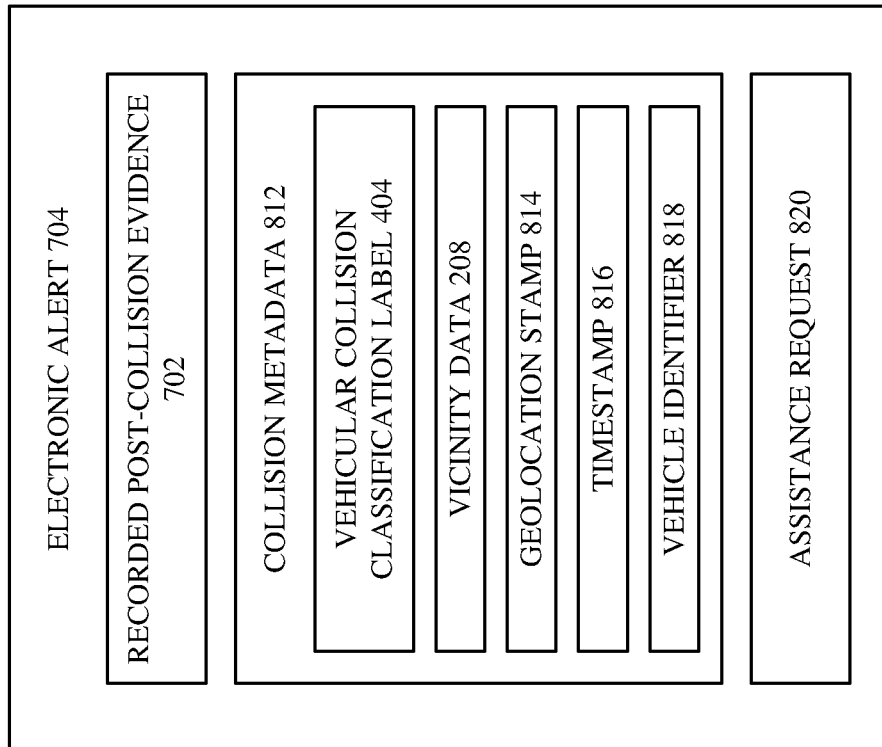
FIG. 8 illustrates an example, non-limiting block diagram showing recorded post-collision evidence and an electronic alert in accordance with one or more embodiments described herein.
Figure 8:
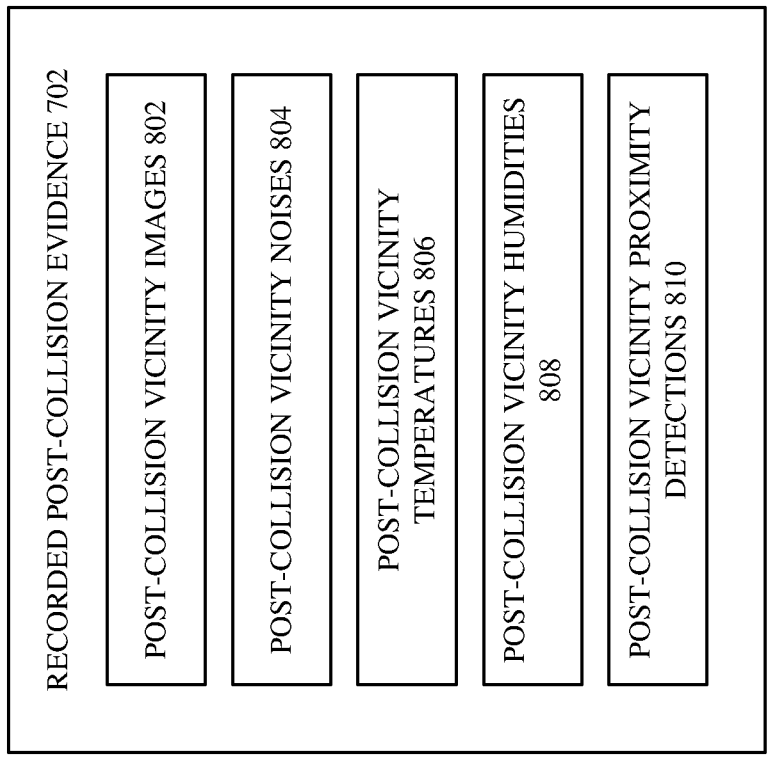

FIG. 8 illustrates an example, non-limiting block diagram 800 showing recorded post-collision evidence and an electronic alert in accordance with one or more embodiments described herein. That is, FIG. 8 depicts a non-limiting example embodiment of the recorded post-collision evidence 702 and a non-limiting example embodiment of the electronic alert 704.

In various embodiments, as shown, the recorded post-collision evidence 702 can comprise a set of post-collision vicinity images 802. In various aspects, the evidence component 212 can, in response to the vehicular collision classification label 404 indicating that a vehicular collision (e.g., 108) is occurring or has occurred in the vicinity 106, cause the set of vehicle cameras 302 to capture or otherwise record the set of post-collision vicinity images 802. In various instances, the set of post-collision vicinity images 802 can include any suitable number of images or video frames (e.g., any suitable number of two-dimensional pixel arrays) that can depict portions of the vicinity 106 (e.g., portions of the vicinity 106 that lie in front of, behind, or beside the vehicle 102) and that span any suitable temporal window or temporal duration following detection of the vehicular collision. For example, suppose that the temporal window or temporal duration is m seconds, for any suitable positive integer m. In such case, the evidence component 212 can cause the set of vehicle cameras 302 to begin recording the vicinity 106 whenever the deep learning neural network 402 detects the vehicular collision, and the evidence component 212 can cause the set of vehicle cameras 302 to cease recording the vicinity 106 after m seconds have elapsed. Accordingly, the set of post-collision vicinity images 802 can be considered as whatever data was recorded by the set of vehicle cameras 302 in the first m seconds after detection of the vehicular collision. In some cases, the set of post-collision vicinity images 802 can be considered as collectively forming an m-second-long video clip that depicts whatever transpired in the vicinity 106 during the first m seconds after the vehicular collision occurred or was detected.

In various aspects, as shown, the recorded post-collision evidence 702 can comprise a set of post-collision vicinity noises 804. In various instances, the evidence component 212 can, in response to the vehicular collision classification label 404 indicating that a vehicular collision (e.g., 108) is occurring or has occurred in the vicinity 106, cause the set of vehicle microphones 304 to capture or otherwise record the set of post-collision vicinity noises 804. In various cases, the set of post-collision vicinity noises 804 can include any suitable number of sound bites that can represent noises occurring in portions of the vicinity 106 (e.g., portions of the vicinity 106 that lie in front of, behind, or beside the vehicle 102) and that span any suitable temporal window or temporal duration following detection of the vehicular collision. For example, suppose again that the temporal window or temporal duration is m seconds, for any suitable positive integer m. In such case, the evidence component 212 can cause the set of vehicle microphones 304 to begin recording the vicinity 106 whenever the deep learning neural network 402 detects the vehicular collision, and the evidence component 212 can cause the set of vehicle microphones 304 to cease recording the vicinity 106 after m seconds have elapsed. Accordingly, the set of post-collision vicinity noises 804 can be considered as whatever data was recorded by the set of vehicle microphones 304 in the first m seconds after detection of the vehicular collision. In some cases, the set of post-collision vicinity noises 804 can be considered as collectively forming an m-second-long audio clip that contains whatever noises transpired in the vicinity 106 during the first m seconds after the vehicular collision occurred.

In various aspects, as shown, the recorded post-collision evidence 702 can comprise a set of post-collision vicinity temperatures 806. In various instances, the evidence component 212 can, in response to the vehicular collision classification label 404 indicating that a vehicular collision (e.g., 108) is occurring or has occurred in the vicinity 106, cause the set of vehicle thermometers 306 to capture or otherwise record the set of post-collision vicinity temperatures 806. In various cases, the set of post-collision vicinity temperatures 806 can include any suitable number of temperature measurements that can represent air temperatures or road surface temperatures associated with portions of the vicinity 106 (e.g., portions of the vicinity 106 that lie in front of, behind, or beside the vehicle 102) and that span any suitable temporal window or temporal duration following detection of the vehicular collision. For example, suppose again that the temporal window or temporal duration is m seconds, for any suitable positive integer m. In such case, the evidence component 212 can cause the set of vehicle thermometers 306 to begin recording the vicinity 106 whenever the deep learning neural network 402 detects the vehicular collision, and the evidence component 212 can cause the set of vehicle thermometers 306 to cease recording the vicinity 106 after m seconds have elapsed. Accordingly, the set of post-collision vicinity temperatures 806 can be considered as whatever data was recorded by the set of vehicle thermometers 306 in the first m seconds after detection of the vehicular collision. In some cases, the set of post-collision vicinity temperatures 806 can be considered as collectively forming an m-second-long temperature measurement time-series that contains whatever temperatures were measured in the vicinity 106 during the first m seconds after the vehicular collision occurred.

In various aspects, as shown, the recorded post-collision evidence 702 can comprise a set of post-collision vicinity humidities 808. In various instances, the evidence component 212 can, in response to the vehicular collision classification label 404 indicating that a vehicular collision (e.g., 108) is occurring or has occurred in the vicinity 106, cause the set of vehicle hygrometers 308 to capture or otherwise record the set of post-collision vicinity humidities 808. In various cases, the set of post-collision vicinity humidities 808 can include any suitable number of humidity measurements that can represent air moisture levels or road surface moisture levels associated with portions of the vicinity 106 (e.g., portions of the vicinity 106 that lie in front of, behind, or beside the vehicle 102) and that span any suitable temporal window or temporal duration following detection of the vehicular collision. For example, suppose again that the temporal window or temporal duration is m seconds, for any suitable positive integer m. In such case, the evidence component 212 can cause the set of vehicle hygrometers 308 to begin recording the vicinity 106 whenever the deep learning neural network 402 detects the vehicular collision, and the evidence component 212 can cause the set of vehicle hygrometers 308 to cease recording the vicinity 106 after m seconds have elapsed. Accordingly, the set of post-collision vicinity humidities 808 can be considered as whatever data was recorded by the set of vehicle hygrometers 308 in the first m seconds after detection of the vehicular collision. In some cases, the set of post-collision vicinity humidities 808 can be considered as collectively forming an m-second-long humidity measurement time-series that contains whatever humidities were measured in the vicinity 106 during the first m seconds after the vehicular collision occurred.

In various aspects, as shown, the recorded post-collision evidence 702 can comprise a set of post-collision vicinity proximity detections 810. In various instances, the evidence component 212 can, in response to the vehicular collision classification label 404 indicating that a vehicular collision (e.g., 108) is occurring or has occurred in the vicinity 106, cause the set of vehicle proximity sensors 310 to capture or otherwise record the set of post-collision vicinity proximity detections 810. In various cases, the set of post-collision vicinity proximity detections 810 can include any suitable number of radar, sonar, or lidar proximity measurements that can represent distances between the vehicle 102 and nearby objects located in portions of the vicinity 106 (e.g., portions of the vicinity 106 that lie in front of, behind, or beside the vehicle 102) and that span any suitable temporal window or temporal duration following detection of the vehicular collision. For example, suppose again that the temporal window or temporal duration is m seconds, for any suitable positive integer m. In such case, the evidence component 212 can cause the set of vehicle proximity sensors 310 to begin recording the vicinity 106 whenever the deep learning neural network 402 detects the vehicular collision, and the evidence component 212 can cause the set of vehicle proximity sensors 310 to cease recording the vicinity 106 after m seconds have elapsed. Accordingly, the set of post-collision vicinity proximity detections 810 can be considered as whatever data was recorded by the set of vehicle proximity sensors 310 in the first m seconds after detection of the vehicular collision. In some cases, the set of post-collision vicinity proximity detections 810 can be considered as collectively forming an m-second-long proximity measurement time-series that contains whatever proximity detections were measured in the vicinity 106 during the first m seconds after the vehicular collision occurred.

In various embodiments, the electronic alert 704 can comprise any suitable electronic data pertaining to the vehicular collision (e.g., 108) detected by the deep learning neural network 402. As a non-limiting example, the electronic alert 704 can comprise the recorded post-collision evidence 702. That is, the electronic alert 704 can include whatever data was recorded by the various sensors of the vehicle 102 in the moments after the vehicular collision was detected by the deep learning neural network 402.

As another non-limiting example, the electronic alert 704 can comprise the vehicular collision classification label 404. That is, the electronic alert 704 can contain whatever data is outputted by the deep learning neural network 402.

As yet another non-limiting example, the electronic alert 704 can comprise the vicinity data 208 (or any suitable portion thereof). That is, the electronic alert 704 can contain whatever raw data was recorded, measured, or otherwise captured by the sensor component 206 and on the basis of which the deep learning neural network 402 detected a vehicular collision (e.g., the electronic alert 704 can contain the set of vicinity images 312, the set of vicinity noises 314, the set of vicinity temperatures 316, the set of vicinity humidities 318, or the set of vicinity proximity detections 320).

As even another non-limiting example, the electronic alert 704 can comprise a geolocation stamp 814. In various aspects, as shown in FIG. 7, the sensor component 206 can comprise the set of vehicle geolocation sensors 706. In various instances, the set of vehicle geolocation sensors 706 can include any suitable number of geolocation sensors that can be integrated into or onto the vehicle 102. In various cases, a geolocation sensor can be any suitable sensor that can measure or determine a geographical position of the vehicle 102 at any given instant in time. As a non-limiting example, a geolocation sensor can be a global positioning sensor (GPS). As another non-limiting example, a geolocation sensor can be a Wi-Fi positioning sensor (WPS). In any case, the set of vehicle geolocation sensors 706 can electronically determine or otherwise generate the geolocation stamp 814.

In various aspects, the geolocation stamp 814 can be any suitable electronic data (e.g., can be one or more scalars, one or more vectors, one or more matrices, one or more tensors, one or more character strings, or any suitable combination thereof) that can indicate a geolocation at which the vicinity data 208 was captured, measured, or otherwise recorded. In various instances, the geolocation stamp 814 can recite such geolocation at any suitable level of granularity (e.g., can specify continent, country, state, province, city, address, latitude, longitude, or elevation at which the vicinity data 208 was captured). For example, the geolocation stamp 814 can specify a name or identifier of a road on which the vehicle 102 is traveling or is parked, and the geolocation stamp 814 can specify a mile-marker along that road, at which mile-marker the vicinity data 208 was captured by the sensor component 206. In any case, because the geolocation stamp 814 can indicate the geolocation at which the vicinity data 208 was captured, and because the vehicular collision (e.g., 108) can be detected based on the vicinity data 208, the geolocation stamp 814 can be considered as indicating the geolocation at which the vehicular collision occurred or was detected (e.g., the geolocation at which the vehicular collision is present or is inferred to be present).

As even another non-limiting example, the electronic alert 704 can comprise a timestamp 816. In various aspects, as shown in FIG. 7, the sensor component 206 can comprise the set of vehicle time sensors 708. In various instances, the set of vehicle time sensors 708 can include any suitable number of time sensors that can be integrated into or onto the vehicle 102. In various cases, a time sensor can be any suitable sensor that can measure or determine a time at which the vehicle 102 performs any given action. As a non-limiting example, a time sensor can be a digital clock. In any case, the set of vehicle time sensors 708 can electronically determine or otherwise generate the timestamp 816.

In various aspects, the timestamp 816 can be any suitable electronic data (e.g., can be one or more scalars, one or more vectors, one or more matrices, one or more tensors, one or more character strings, or any suitable combination thereof) that can indicate a time or date at which the vicinity data 208 was captured, measured, or otherwise recorded. In various instances, the timestamp 816 can recite such time or date at any suitable level of granularity (e.g., can specify year, season, month, week, day, hour, minute, second, or fraction of a second at which the vicinity data 208 was captured). In any case, because the timestamp 816 can indicate when the vicinity data 208 was captured, and because the vehicular collision (e.g., 108) can be detected based on the vicinity data 208, the timestamp 816 can be considered as indicating when the vehicular collision was detected (e.g., indicating a time at which the vehicular collision is present or is inferred to be present).

As still another non-limiting example, the electronic alert 704 can comprise a vehicle identifier 818. In various aspects, the vehicle identifier 818 can be any suitable electronic data (e.g., can be one or more scalars, one or more vectors, one or more matrices, one or more tensors, one or more character strings, or any suitable combination thereof) that can uniquely represent or otherwise uniquely correspond to the vehicle 102. For example, the vehicle identifier 818 can comprise a VIN of the vehicle 102. As another example, the vehicle identifier 818 can comprise a license plate number of the vehicle 102. As yet another example, the vehicle identifier 818 can comprise make or model of the vehicle 102. As even another example, the vehicle identifier 818 can comprise any suitable identification information of an owner of the vehicle 102, such as name, age, gender, or residential address. In various cases, any of such information can be hard-coded into the collision evidence system 104.

In some aspects, the vehicle identifier 818 can comprise any suitable identification information (e.g., name, residential address, phone number, email address) pertaining to a driver of the vehicle 102. In some cases, the driver of the vehicle 102 can be the owner of the vehicle 102. However, in other cases, the driver of the vehicle 102 can be different from the owner of the vehicle 102. In various aspects, although not explicitly shown in the figures, the sensor component 206 can comprise any suitable biometric sensors that can be integrated into or onto the vehicle 102. In various instances, such biometric sensors can be implemented to identify the current driver of the vehicle 102. For example, such biometric sensors can include: a facial recognition sensor (e.g., an interior camera of the vehicle 102 can capture an image of a face of whomever is driving the vehicle 102); a fingerprint sensor (e.g., a steering wheel of the vehicle 102 can be embedded with fingerprint sensors that can scan fingerprints of whomever is driving the vehicle 102); a voice recognition sensor (e.g., an interior microphone of the vehicle 102 can capture an audio clip of a voice of whomever is driving the vehicle 102); or a weight sensor (e.g., a weight scale can be embedded into a driver seat of the vehicle 102, so as to capture a body weight of whomever is driving the vehicle 102). In other instances, although not explicitly shown in the figures, the sensor component 206 can comprise any suitable beacon-detector that can detect when a defined electronic beacon has entered a cabin of the vehicle. In such case, the beacon-detector can detect an electronic beacon emitted by any suitable electronic device of whomever is driving the vehicle 102 (e.g., emitted by a smart phone of the driver, emitted by a smart watch of the driver), where such electronic beacon can uniquely correspond to an identity of the current driver.

Note that, because electronic alert 704 can comprise the vehicle identifier 818, the electronic alert 704 can be considered as a non-anonymous or deanonymized electronic alert.

In various aspects, as shown, the vehicular collision classification label 404, the vicinity data 208, the geolocation stamp 814, the timestamp 816, and the vehicle identifier 818 can collectively be referred to as collision metadata 812.

In various embodiments, as shown, the electronic alert 704 can comprise an assistance request 820. In various aspects, the assistance request 820 can be any suitable electronic data (e.g., can be one or more scalars, one or more vectors, one or more matrices, one or more tensors, or one or more character strings) that can indicate, represent, or otherwise convey that emergency service assistance should be dispatched to the geolocation indicated by the geolocation stamp 814, so as to handle or otherwise address the vehicular collision (e.g., 108) detected by the deep learning neural network 402. In some cases, the assistance request 820 can identify a specific type of emergency service that should be dispatched, based on the vehicular collision classification label 404.

For example, if the injured pedestrian indicator 606 of the vehicular collision classification label 404 indicates that at least one pedestrian has been injured in the detected vehicular collision, then the assistance request 820 can indicate that an ambulance should be dispatched to the geolocation indicated by the geolocation stamp 814. In some cases, if the injured pedestrian indicator 606 of the vehicular collision classification label 404 indicates that more than one pedestrian has been injured in the detected vehicular collision, then the assistance request 820 can indicate that more than one ambulance should be dispatched to the geolocation indicated by the geolocation stamp 814. Conversely, if the injured pedestrian indicator 606 of the vehicular collision classification label 404 indicates that no pedestrian has been injured in the detected vehicular collision, then the assistance request 820 can indicate that no ambulance should be dispatched to the geolocation indicated by the geolocation stamp 814.

As another example, if the fire indicator 612 of the vehicular collision classification label 404 indicates that the detected vehicular collision involves fire, flames, or smoke, then the assistance request 820 can indicate that a firetruck should be dispatched to the geolocation indicated by the geolocation stamp 814. On the other hand, if the fire indicator 612 of the vehicular collision classification label 404 indicates that the detected vehicular collision does not involve fire, flames, or smoke, then the assistance request 820 can indicate that no firetruck should be dispatched to the geolocation indicated by the geolocation stamp 814.

As even another example, if the roll-over indicator 610 of the vehicular collision classification label 404 indicates that the detected vehicular collision involves a rolled-over vehicle, then the assistance request 820 can indicate that heavy-equipment (e.g., a tow truck, a crane) should be dispatched to the geolocation indicated by the geolocation stamp 814. On the other hand, if the roll-over indicator 610 of the vehicular collision classification label 404 indicates that the detected vehicular collision does not involve a rolled-over vehicle, then the assistance request 820 can indicate that no heavy-equipment should be dispatched to the geolocation indicated by the geolocation stamp 814.

Although not explicitly shown in the figures, the electronic alert 704 can be written or otherwise organized according to any suitable protocol or syntax (e.g., can have any suitable header, can have any suitable body).

In any case, the broadcast component 214 can generate the electronic alert 704, and the broadcast component 214 can transmit the electronic alert 704 to the emergency service system 110 via the communication link 112.

As explained above, the evidence component 212 and the broadcast component 214 can respectively generate the recorded post-collision evidence 702 and the electronic alert 704, in response to the vehicular collision classification label 404 indicating that a vehicular collision (e.g., 108) has occurred or is occurring in the vicinity 106. In contrast, the evidence component 212 and the broadcast component 214 can respectively refrain from generating the recorded post-collision evidence 702 and the electronic alert 704, in response to the vehicular collision classification label 404 indicating that no vehicular collision has occurred or is occurring in the vicinity 106. Indeed, in such case, the vicinity data 208 can be deleted or discarded, the sensor component 206 can capture new vicinity data (e.g., a new instance of 208), and the inference component 210, the evidence component 212, and the broadcast component 214 can perform their respective functionalities with respect to the new vicinity data. Accordingly, the collision evidence system 104 can be considered as repeatedly recording and discarding vicinity data, until a vehicular collision (e.g., 108) is detected. Upon such detection, the recorded post-collision evidence 702 can be generated and the most recently captured vicinity data can be preserved, stored, or otherwise maintained for use in the electronic alert 704.

To help ensure that the vehicular collision classification label 404 is accurate, the deep learning neural network 402 can first undergo training. Various non-limiting aspects of such training are described with respect to FIGS. 9-11.

Figure 9:
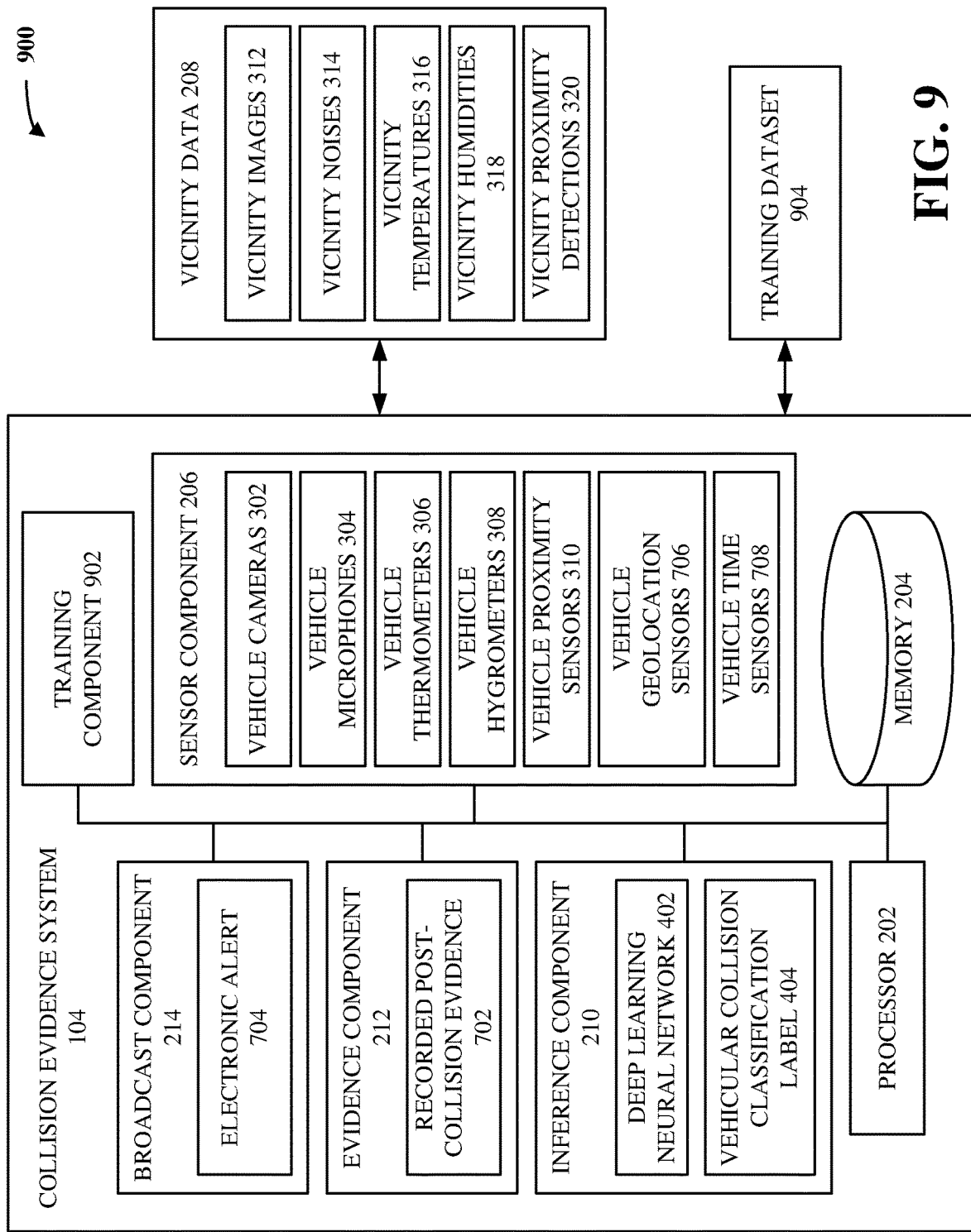
FIG. 9 illustrates a block diagram of an example, non-limiting system including a training component and a training dataset that facilitates a broadcast-side of artificially intelligent provision of post-vehicular-collision evidence in accordance with one or more embodiments described herein.

FIG. 9 illustrates a block diagram of an example, non-limiting system 900 including a training component and a training dataset that can facilitate a broadcast-side of artificially intelligent provision of post-vehicular-collision evidence in accordance with one or more embodiments described herein. As shown, the system 900 can, in some cases, comprise the same components as the system 700, and can further comprise a training component 902 or a training dataset 904.

In various aspects, the training component 902 can electronically receive, retrieve, obtain, or otherwise access, from any suitable source, the training dataset 904. In various aspects, the training component 902 can train the deep learning neural network 402 based on the training dataset 904. Various non-limiting aspects are described with respect to FIGS. 10-11.

Figure 10:
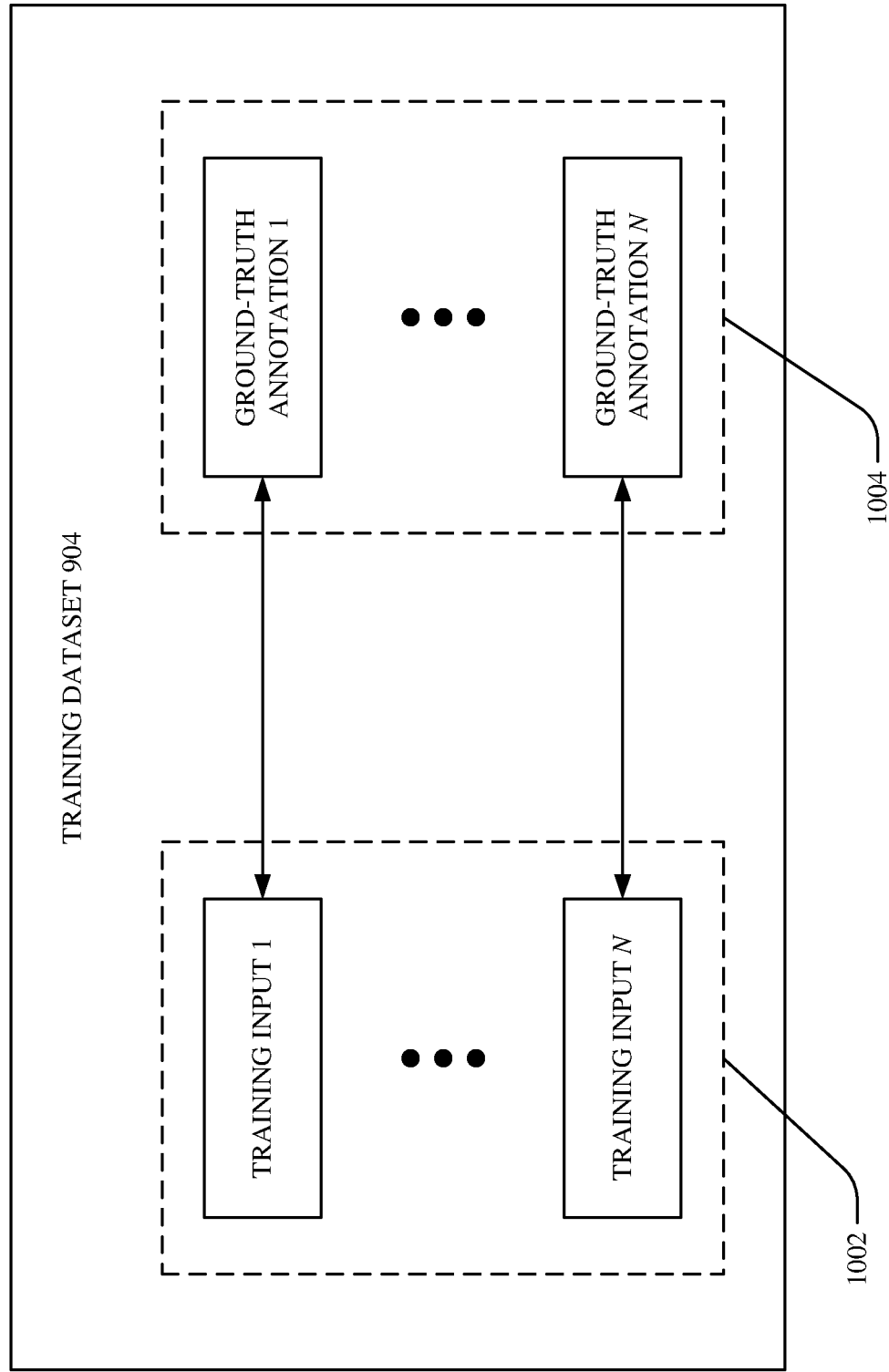
FIG. 10 illustrates an example, non-limiting block diagram of a training dataset in accordance with one or more embodiments described herein.

FIG. 10 illustrates an example, non-limiting block diagram 1000 of the training dataset 904 in accordance with one or more embodiments described herein. As shown, the training dataset 904 can, in various aspects, comprise a set of training inputs 1002 and a set of ground-truth annotations 1004.

In various aspects, the set of training inputs 1002 can include n inputs for any suitable positive integer n: a training input 1 to a training input n. In various instances, a training input can be any suitable electronic data having the same format, size, or dimensionality as the vicinity data 208. In other words, each training input can be raw data captured by sensors of a vehicle that were monitoring a respective vehicle vicinity. For example, the training input 1 can include a first set of training vicinity images depicting portions of a first vehicle vicinity, a first set of training vicinity noises that occurred in those portions of the first vehicle vicinity, a first set of training vicinity temperatures associated with those portions of the first vehicle vicinity, a first set of training vicinity humidities associated with those portions of the first vehicle vicinity, or a first set of training vicinity proximity detections associated with those portions of the first vehicle vicinity. Likewise, as another example, the training input n can include an n-th set of training vicinity images depicting portions of an n-th vehicle vicinity, an n-th set of training vicinity noises that occurred in those portions of the n-th vehicle vicinity, an n-th set of training vicinity temperatures associated with those portions of the n-th vehicle vicinity, an n-th set of training vicinity humidities associated with those portions of the n-th vehicle vicinity, or an n-th set of training vicinity proximity detections associated with those portions of the n-th vehicle vicinity.

In various aspects, the set of ground-truth annotations 1004 can respectively correspond (e.g., in one-to-one fashion) to the set of training inputs 1002. Thus, since the set of training inputs 1002 can have n inputs, the set of ground-truth annotations 1004 can have n annotations: a ground-truth annotation 1 to a ground-truth annotation n. In various instances, each of the set of ground-truth annotations 1004 can have the same format, size, or dimensionality as the vehicular collision classification label 404. That is, each ground-truth annotation can be any suitable electronic data that indicates or represents a presence or other attributes (e.g., collision cardinality, injured pedestrians, impact type, roll-over, fire, severity) of a vehicular collision that is known or deemed to be manifested in a respect training input. For example, the ground-truth annotation 1 can correspond to the training input 1. Accordingly, the ground-truth annotation 1 can be considered as the correct or accurate classification label that indicates the presence or other attributes of whatever vehicular collision is known or deemed to be manifested in the training input 1. As another example, the ground-truth annotation n can correspond to the training input n. Accordingly, the ground-truth annotation n can be considered as the correct or accurate classification label that indicates the presence or other attributes of whatever vehicular collision is known or deemed to be manifested in the training input n.

Figure 11:
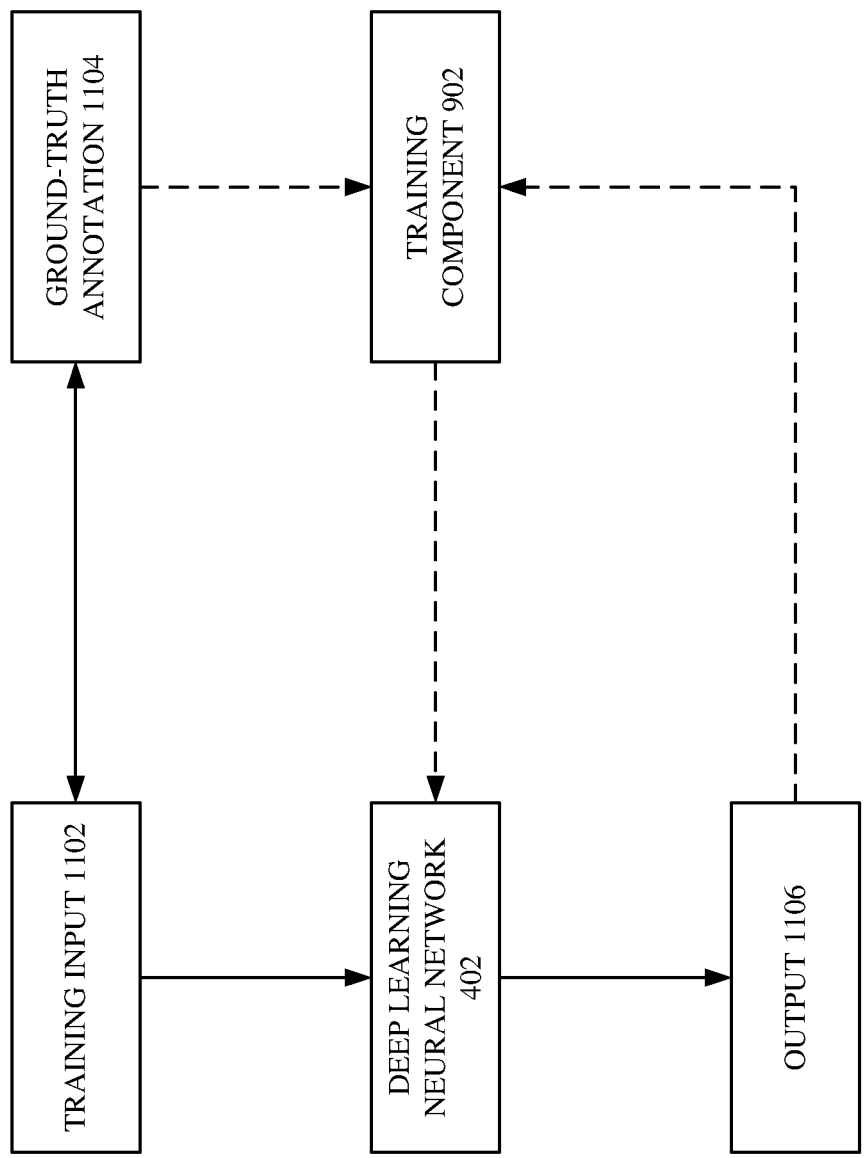
FIG. 11 illustrates an example, non-limiting block diagram showing how a deep learning neural network can be trained in accordance with one or more embodiments described herein.

Now, consider FIG. 11. FIG. 11 illustrates an example, non-limiting block diagram 1100 showing how the deep learning neural network 402 can be trained in accordance with one or more embodiments described herein.

In various aspects, the training component 902 can, prior to beginning training, initialize in any suitable fashion (e.g., random initialization) the trainable internal parameters (e.g., convolutional kernels, weight matrices, bias values) of the deep learning neural network 402.

In various aspects, the training component 902 can select, from the training dataset 904, a training input 1102 and a ground-truth annotation 1104 corresponding to the training input 1102. In various instances, the training component 902 can execute the deep learning neural network 402 on the training input 1102, thereby causing the deep learning neural network 402 to produce an output 1106. More specifically, in some cases, an input layer of the deep learning neural network 402 can receive the training input 1102, the training input 1102 can complete a forward pass through one or more hidden layers of the deep learning neural network 402, and an output layer of the deep learning neural network 402 can compute the output 1106 based on activation maps or intermediate features provided by the one or more hidden layers.

In various aspects, the output 1106 can be considered as the predicted or inferred vehicular collision classification label (e.g., as the predicted/inferred presence indicator, the predicted/inferred collision cardinality indicator, the predicted/inferred injured pedestrian indicator, the predicted/inferred impact type indicator, the predicted/inferred roll-over indicator, the predicted/inferred fire indicator, the predicted/inferred severity indicator) that the deep learning neural network 402 believes should correspond to the training input 1102. In contrast, the ground-truth annotation 1104 can be considered as the correct/accurate vehicular collision classification label (e.g., as the correct/accurate presence indicator, the correct/accurate collision cardinality indicator, the correct/accurate injured pedestrian indicator, the correct/accurate impact type indicator, the correct/accurate roll-over indicator, the correct/accurate fire indicator, the correct/accurate severity indicator) that is known or deemed to correspond to the training input 1102. Note that, if the deep learning neural network 402 has so far undergone no or little training, then the output 1106 can be highly inaccurate. In other words, the output 1106 can be very different from the ground-truth annotation 1104.

In various aspects, the training component 902 can compute one or more errors or losses (e.g., MAE, MSE, cross-entropy) between the output 1106 and the ground-truth annotation 1104. In various instances, the training component 902 can incrementally update, via backpropagation, the trainable internal parameters of the deep learning neural network 402, based on such one or more errors or losses.

In various cases, the training component 902 can repeat such execution-and-update procedure for each training input in the training dataset 904. This can ultimately cause the trainable internal parameters of the deep learning neural network 402 to become iteratively optimized for accurately detecting vehicular collisions in inputted vicinity data. In various aspects, the training component 902 can implement any suitable training batch sizes, any suitable error/loss functions, or any suitable training termination criteria.

Figure 12:
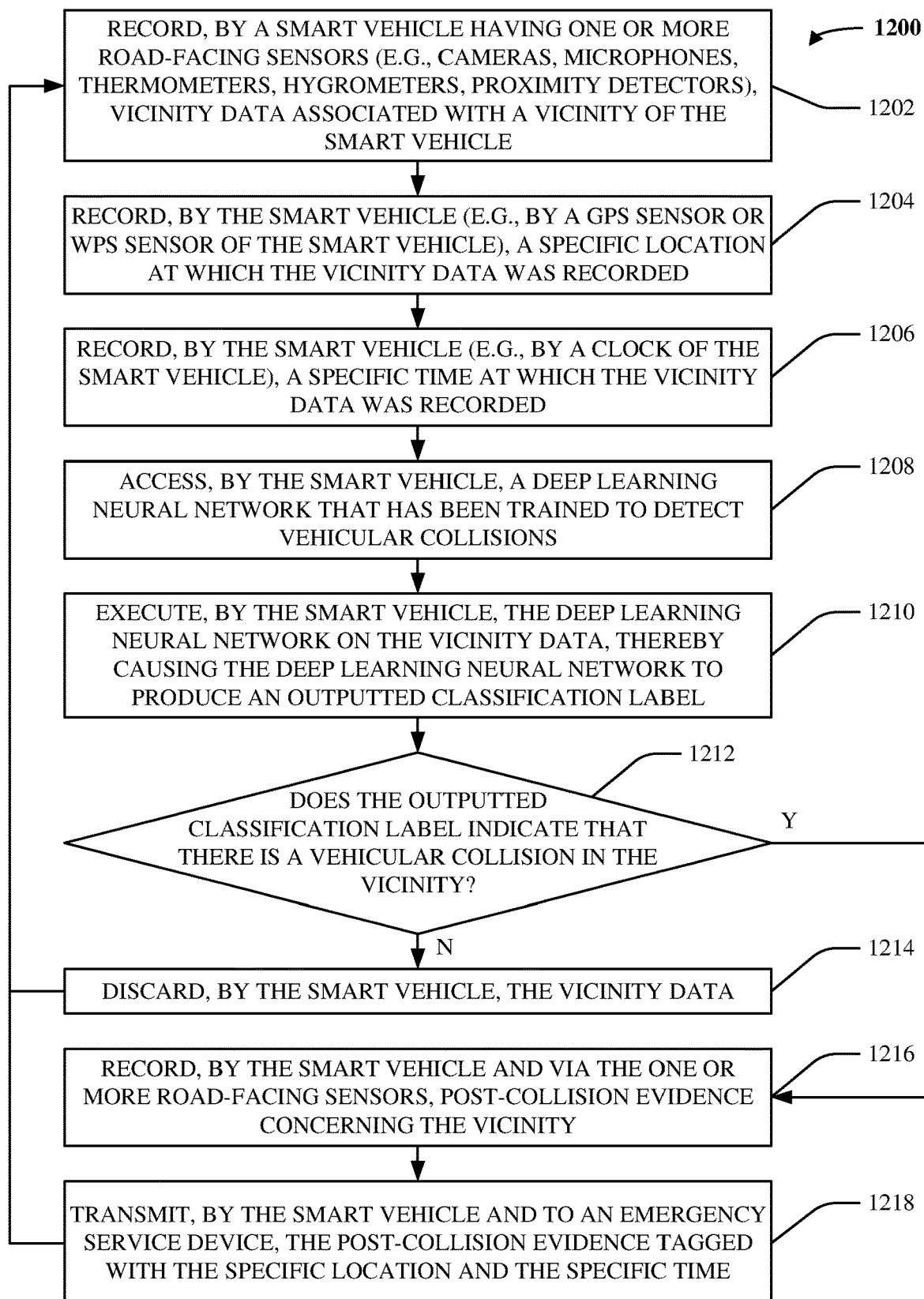
FIG. 12 illustrates a flow diagram of an example, non-limiting computer-implemented method that facilitates a broadcast-side of artificially intelligent provision of post-vehicular-collision evidence in accordance with one or more embodiments described herein.

FIG. 12 illustrates a flow diagram of an example, non-limiting computer-implemented method 1200 that can facilitate a broadcast-side of artificially intelligent provision of post-vehicular-collision evidence in accordance with one or more embodiments described herein. In various cases, the collision evidence system 104 can facilitate the computer-implemented method 1200.

In various embodiments, act 1202 can include recording, by a smart vehicle (e.g., 102) having one or more road-facing sensors (e.g., 206) vicinity data (e.g., 208) associated with a vicinity (e.g., 106) of the smart vehicle. In some cases, the one or more road-facing sensors can include cameras (e.g., 302), microphones (e.g., 304), thermometers (e.g., 306), hygrometers (e.g., 308), or proximity detectors (e.g., 310).

In various aspects, act 1204 can include recording, by the smart vehicle, a specific location (e.g., 814) at which the vicinity data was recorded. In various cases, such recording can be facilitated by a GPS sensor or a WPS sensor (e.g., 706) of the smart vehicle.

In various instances, act 1206 can include recording, by the smart vehicle, a specific time (e.g., 816) at which the vicinity data was recorded. In various cases, such recording can be facilitated by a clock (e.g., 708) of the smart vehicle.

In various aspects, act 1208 can include accessing, by the smart vehicle (e.g., via 210), a deep learning neural network (e.g., 402) that has been trained to detect vehicular collisions.

In various instances, act 1210 can include executing, by the smart vehicle (e.g., via 210), the deep learning neural network on the vicinity data. This can cause the deep learning neural network to produce an outputted classification label (e.g., 404).

In various cases, act 1212 can include determining, by the smart vehicle (e.g., via 210), whether the outputted classification label indicates that there is vehicular collision (e.g. 108) in the vicinity. If not (e.g., if the outputted classification label indicates that there is no vehicular collision), the computer-implemented method 1200 can proceed to act 1214. If so (e.g., if the outputted classification label instead indicates that there is a vehicular collision), the computer-implemented method 1200 can proceed to act 1216.

In various aspects, act 1214 can include discarding, by the smart vehicle (e.g., via 212) the vicinity data. In various cases, the computer-implemented method 1200 can proceed back to act 1202.

In various instances, act 1216 can include recording, by the smart vehicle (e.g., via 212) and via the one or more road-facing sensors, post-collision evidence (e.g., 702) concerning the vicinity.

In various cases, act 1218 can include transmitting, by the smart vehicle (e.g., via 214) and to an emergency service device (e.g., 110), the post-collision evidence. In various aspects, the post-collision evidence can be tagged with the specific location and the specific time. In various instances, as shown, the computer-implemented method 1200 can proceed back to act 1202.

Figure 13:
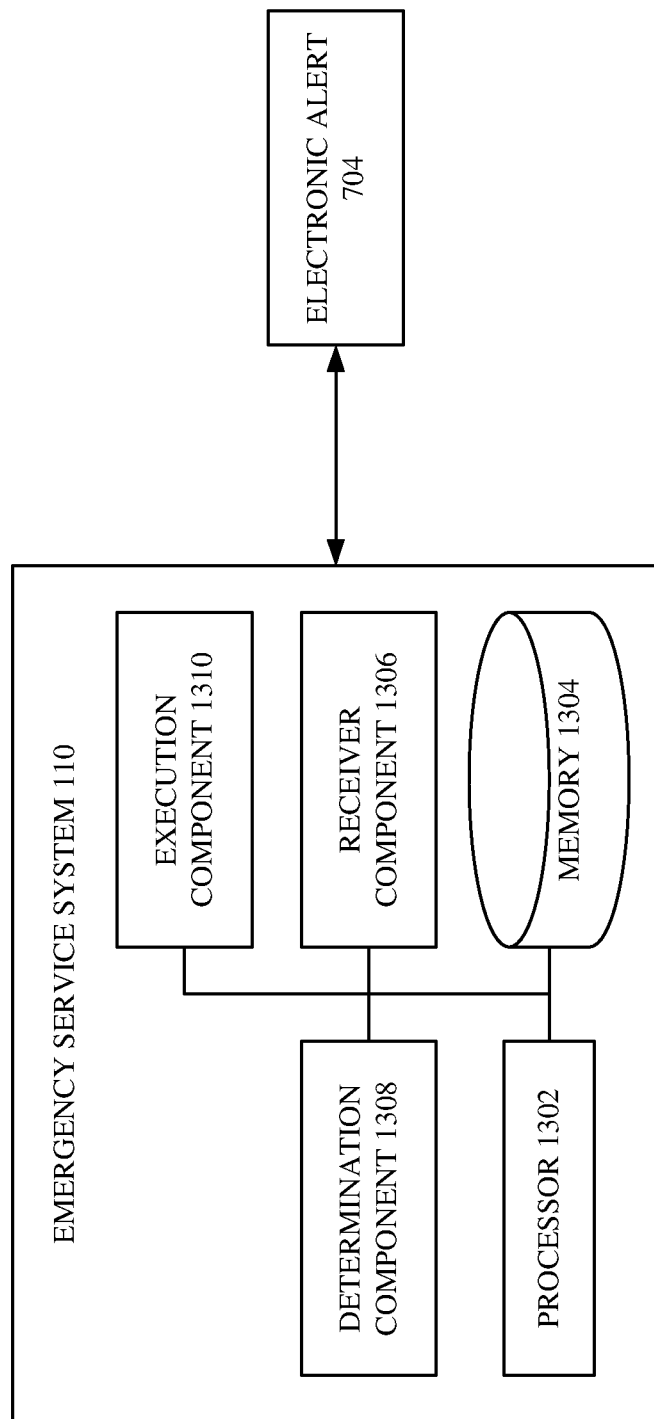
FIG. 13 illustrates a block diagram of an example, non-limiting system that facilitates a receipt-side of artificially intelligent provision of post-vehicular-collision evidence in accordance with one or more embodiments described herein.

FIG. 13 illustrates a block diagram of an example, non-limiting system 1300 that can facilitate a receipt-side of artificially intelligent provision of post-vehicular-collision evidence in accordance with one or more embodiments described herein. In other words, FIG. 13 depicts a non-limiting example embodiment of the emergency service system 110.

In various embodiments, the emergency service system 110 can comprise a processor 1302 (e.g., computer processing unit, microprocessor) and a non-transitory computer-readable memory 1304 that is operably or operatively or communicatively connected or coupled to the processor 1302. The non-transitory computer-readable memory 1304 can store computer-executable instructions which, upon execution by the processor 1302, can cause the processor 1302 or other components of the emergency service system 110 (e.g., receiver component 1306, determination component 1308, execution component 1310) to perform one or more acts. In various embodiments, the non-transitory computer-readable memory 1304 can store computer-executable components (e.g., receiver component 1306, determination component 1308, execution component 1310), and the processor 1302 can execute the computer-executable components.

In various embodiments, the emergency service system 110 can comprise a receiver component 1306. In various aspects, the receiver component 1306 can electronically receive, electronically retrieve, electronically obtain, or otherwise electronically access the electronic alert 704. In particular, the receiver component 1306 can be operatively or operably coupled or connected to the broadcast component 214 via the communication link 112. Accordingly, the receiver component 1306 can receive the electronic alert 704 from the broadcast component 214. Thus, other components of the emergency service system 110 can electronically interact with (e.g., read, write, edit, copy, manipulate) the electronic alert 704.

In various embodiments, the emergency service system 110 can comprise a determination component 1308. In various aspects, the determination component 1308 can, as described herein, determine whether or not the electronic alert 704 indicates that a vehicular collision has occurred or is occurring in the vicinity 106.

In various embodiments, the emergency service system 110 can comprise an execution component 1310. In various instances, the execution component 1310 can, as described herein, initiate or otherwise perform any suitable electronic actions, in response to the determination component 1308 determining that the electronic alert 704 indicates that a vehicular collision (e.g., 108) has occurred or is occurring in the vicinity 106.

Figure 14:
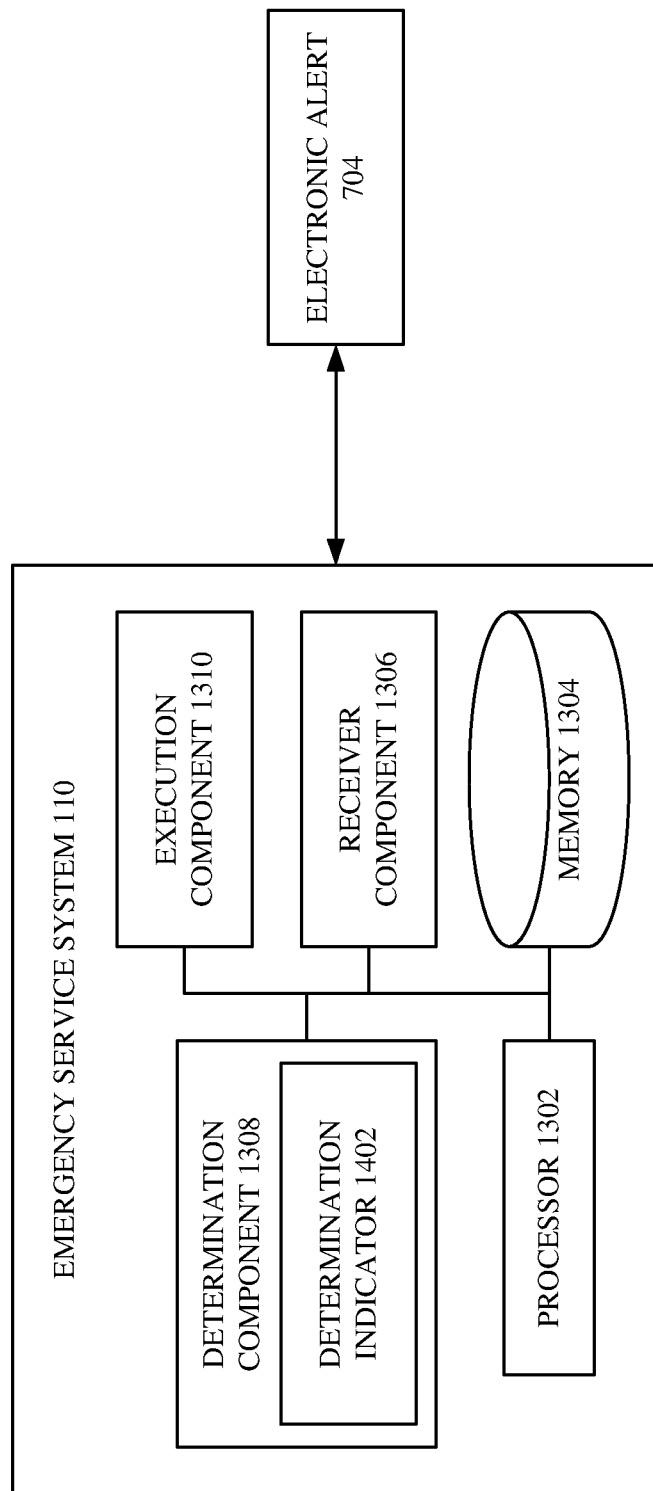
FIG. 14 illustrates a block diagram of an example, non-limiting system including a determination indicator that facilitates a receipt-side of artificially intelligent provision of post-vehicular-collision evidence in accordance with one or more embodiments described herein.

FIG. 14 illustrates a block diagram of an example, non-limiting system 1400 including a determination indicator that can facilitate a receipt-side of artificially intelligent provision of post-vehicular-collision evidence in accordance with one or more embodiments described herein. As shown, the system 1400 can, in some cases, comprise the same components as the system 1300, and can further comprise a determination indicator 1402.

In various embodiments, the determination component 1308 can electronically generate the determination indicator 1402, based on the electronic alert 704. More specifically, the determination component 1308 can, in various aspects, electronically read, via any suitable parsing techniques, the contents of the electronic alert 704. Accordingly, the determination component 1308 can identify, via such parsing techniques, the recorded post-collision evidence 702, the collision metadata 812, or the assistance request 820. In various cases, the determination component 1308 can generate the determination indicator 1402, based on the vehicular collision classification label 404, which can be specified in the collision metadata 812. In particular, the determination indicator 1402 can be any suitable binary or binomial variable that can take on one of two discrete states. In various aspects, if the vehicular collision classification label 404 indicates that a vehicular collision (e.g., 108) has been detected in the vicinity 106, then the determination indicator 1402 can be set or otherwise configured to an active state. On the other hand, if the vehicular collision classification label 404 indicates that a vehicular collision has not (yet) been detected in the vicinity 106, then the determination indicator 1402 can be set or otherwise configured to an inactive state.

In various embodiments, the execution component 1310 can conduct, initiate, facilitate, or otherwise perform any suitable electronic actions, in response to the determination indicator 1402 being in the active state (e.g., in response to a determination that the electronic alert 704 indicates that a vehicular collision has been detected in the vicinity 106). In contrast, the execution component 1310 can, in various instances, refrain from conducting, initiating, facilitating, or otherwise performing such electronic actions, in response to the determination indicator 1402 being in the inactive state (e.g., in response to a determination that the electronic alert 704 indicates that no vehicular collision has been detected yet in the vicinity 106). Various non-limiting examples of such electronic actions are described with respect to FIGS. 15-23.

Figure 15:
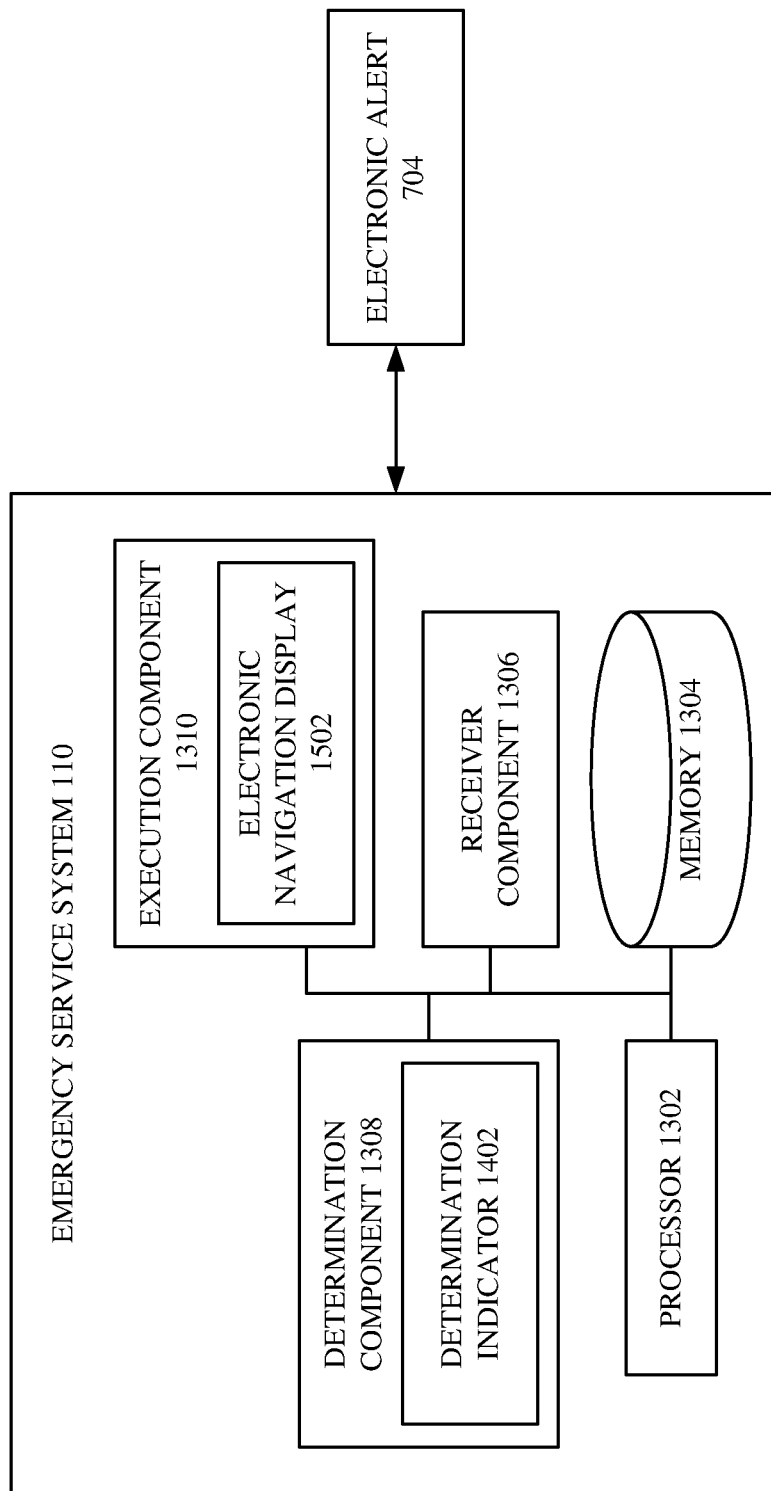
FIG. 15 illustrates a block diagram of an example, non-limiting system including an electronic navigation display that facilitates a receipt-side of artificially intelligent provision of post-vehicular-collision evidence in accordance with one or more embodiments described herein.

FIG. 15 illustrates a block diagram of an example, non-limiting system 1500 including an electronic navigation display that can facilitate a receipt-side of artificially intelligent provision of post-vehicular-collision evidence in accordance with one or more embodiments described herein. As shown, the system 1500 can, in some cases, comprise the same components as the system 1400, and can further comprise an electronic navigation display 1502.

In various embodiments, the emergency service system 110 can be associated with any suitable emergency service vehicle. For example, in some cases, the emergency service system 110 can be integrated or otherwise built into the emergency service vehicle. In other cases, the emergency service system 110 can be not integrated into the emergency service vehicle but can nevertheless have dispatch-authority over the emergency service vehicle.

In any case, that emergency service vehicle can be outfitted with the electronic navigation display 1502. In various aspects, the electronic navigation display 1502 can be any suitable computer monitor, computer screen, or visual projection that can visually render or otherwise illustrate navigation information (e.g., route data, traffic data) to a driver of the emergency service vehicle. In some cases, the electronic navigation display 1502 can be built into a dashboard of the emergency service vehicle. In other cases, the electronic navigation display 1502 can be built into a center console of the emergency service vehicle. In still other cases, the electronic navigation display 1502 can be a heads-up display that is projected onto a portion of a front windshield of the emergency service vehicle.

In any case, in response to the determination indicator 1402 being in the active state (e.g., in response to the electronic alert 704 indicating that a vehicular collision has been detected in the vicinity 106), the execution component 1310 can electronically render any suitable graphical representations of the vehicular collision on the electronic navigation display 1502. Such graphical representations can be visible to a driver of the emergency service vehicle, so that the driver of the emergency service vehicle can be notified of the vehicular collision. Various non-limiting details are described with respect to FIGS. 16-17.

Figure 16:
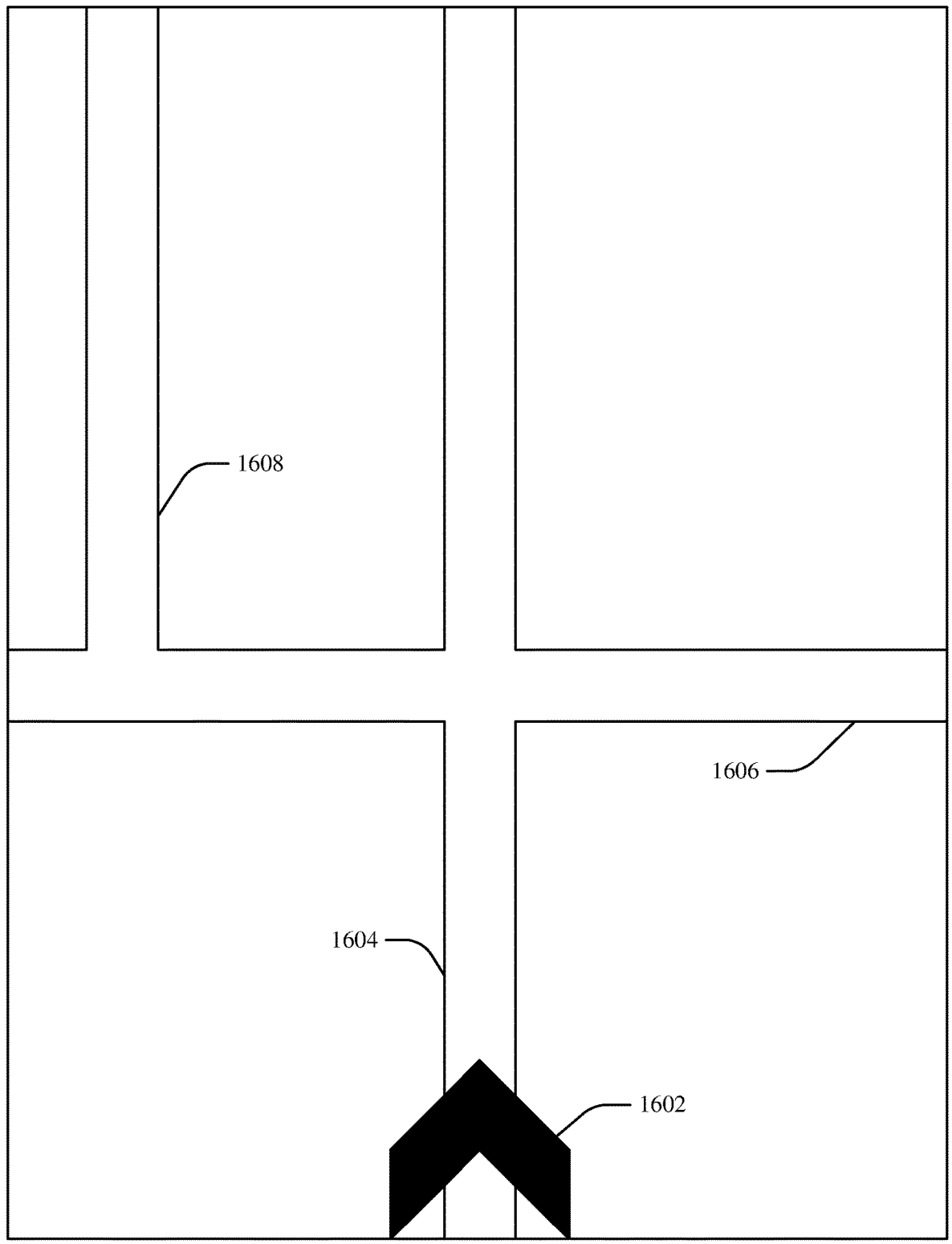
FIGS. 16-17 illustrate example, non-limiting block diagrams showing how an electronic navigation display can be adjusted in accordance with one or more embodiments described herein.
Figure 17:
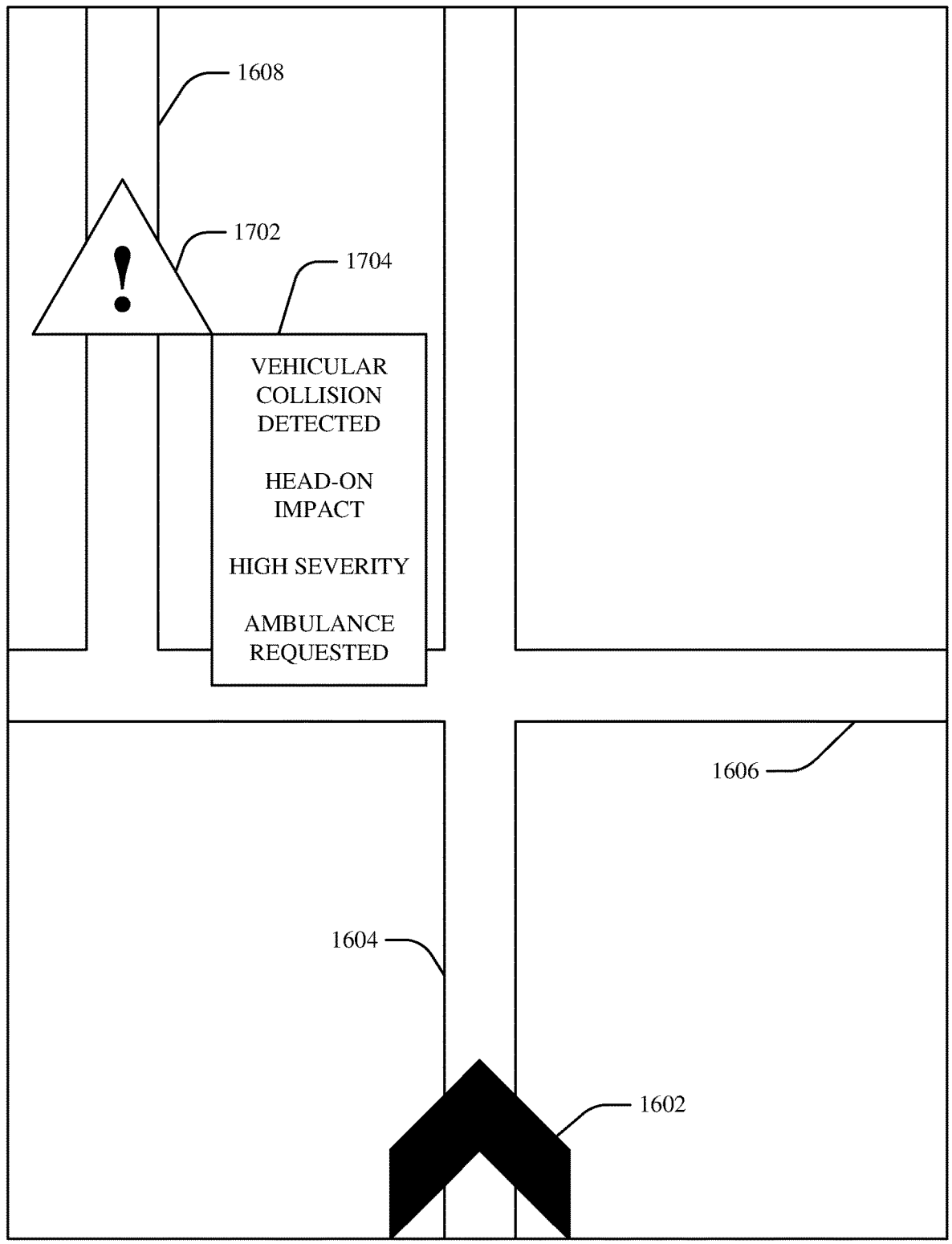

FIGS. 16-17 illustrate example, non-limiting block diagrams 1600 and 1700 showing how an electronic navigation display can be adjusted in accordance with one or more embodiments described herein.

First, consider FIG. 16. In various aspects, FIG. 16 depicts an example, non-limiting view that can be rendered on the electronic navigation display 1502 prior to receipt or parsing of the electronic alert 704 (e.g., prior to determining that the electronic alert 704 indicates that the vehicular collision 108 has been detected in the vicinity 106).

In various aspects, the emergency service vehicle corresponding to the emergency service system 110 can be traveling on any given road. Accordingly, as shown in FIG. 16, the electronic navigation display 1502 can depict a graphical representation 1602 of the emergency service vehicle and a graphical representation 1604 of the road on which the emergency service vehicle is currently traveling. As shown, the graphical representation 1602 can be superimposed on top of the graphical representation 1604, so as to indicate that the emergency service vehicle is traveling on the given road. Although FIG. 16 depicts the graphical representation 1602 as being a chevron shape (e.g., so as to indicate a direction of travel of the emergency service vehicle), this is a mere non-limiting example. Indeed, the graphical representation 1602 or the graphical representation 1604 can be rendered via any suitable colors, shapes, symbols, or artistic styles.

Suppose that a second road perpendicularly intersects with the given road on which the emergency service vehicle is traveling, some distance ahead of the emergency service vehicle. In various aspects, as shown, the electronic navigation display 1502 can depict a graphical representation 1606 corresponding to that second road. Furthermore, suppose that a third road branches off perpendicularly from that second road, some distance to the left of the given road. In various instances, as shown, the electronic navigation display 1502 can depict a graphical representation 1608 of such third road.

Now, suppose that the electronic alert 704 indicates that a vehicular collision (e.g., 108) has been detected in the vicinity 106. Accordingly, the determination indicator 1402 can be set to the active state. In response to the determination indicator 1402 being set to the active state, the execution component 1310 can render on the electronic navigation display 1502 a graphical representation of the vehicular collision. In various aspects, such graphical representation can be rendered at an intra-screen location on the electronic navigation display 1502 that corresponds to whatever geolocation is indicated in the geolocation stamp 814. A non-limiting example of this is shown in FIG. 17.

Suppose that the geolocation stamp 814 indicates that the vehicular collision was detected (e.g., by the deep learning neural network 402 of the vehicle 102) at a geolocation that is on the third road (e.g., on the road represented by the graphical representation 1608). In such case, the execution component 1310 can render, as shown in FIG. 17, a graphical representation 1702 of the vehicular collision, such that the graphical representation 1702 is superimposed on top of the graphical representation 1608 (e.g., to indicate that the vehicular collision occurred on the third road). Although FIG. 17 depicts the graphical representation 1702 as being a triangular shape with an exclamation mark to indicate emphasis or importance, this is a mere non-limiting example. In various aspects, the graphical representation 1702 can be visually rendered via any suitable colors, shapes, symbols, or artistic styles.

In some cases, the graphical representation 1702 can exhibit unique visual properties (e.g., unique colors, unique shapes, unique sizes, unique symbols) based on the vehicular collision classification label 404. For example, if the vehicular collision (e.g., 108) involves a first attribute (e.g., vehicular fire), then the graphical representation 1702 can have visual properties correlated with such first attribute (e.g., the graphical representation 1702 can be a flame symbol to represent the vehicular fire). As another example, if the vehicular collision (e.g., 108) involves a second attribute (e.g., vehicular roll-over), then the graphical representation 1702 can have visual properties correlated with such second attribute (e.g., the graphical representation 1702 can be a circular arrow symbol to represent the vehicular roll-over). As yet another example, if the vehicular collision (e.g., 108) involves a third attribute (e.g., injured pedestrians), then the graphical representation 1702 can have visual properties correlated with such third attribute (e.g., the graphical representation 1702 can be a red-cross symbol to represent the injured pedestrians).

In various aspects, as shown, the execution component 1310 can also render on the electronic navigation display a textual description 1704 corresponding to the vehicular collision. In the non-limiting example shown in FIG. 17, the vehicular collision classification label 404 can indicate that a highly severe head-on impact occurred at the geolocation indicated by the geolocation stamp 814. Accordingly, the textual description 1704 can specify or otherwise convey such information (e.g., "vehicular collision detected", "head-on impact", "high severity"). In various instances, the textual description 1704 can include or otherwise be based on the assistance request 820. Returning to the non-limiting example of FIG. 17, the assistance request 820 can indicate that an ambulance should be dispatched to the geolocation indicated by the geolocation stamp 814, due to the high severity of the detected vehicular collision. Accordingly, the textual description 1704 can, in various cases, specify or otherwise convey such information (e.g., "ambulance requested").

In any case, in response to the determination indicator 1402 being set to the active state, the execution component 1310 can visually render the graphical representation 1702, can visually render the textual description 1704, or can otherwise adjust the electronic navigation display 1502, so as to notify a driver of whatever emergency service vehicle corresponds to the emergency service system 110 that the vehicular collision (e.g., 108) has been detected in the vicinity 106.

Figure 18:
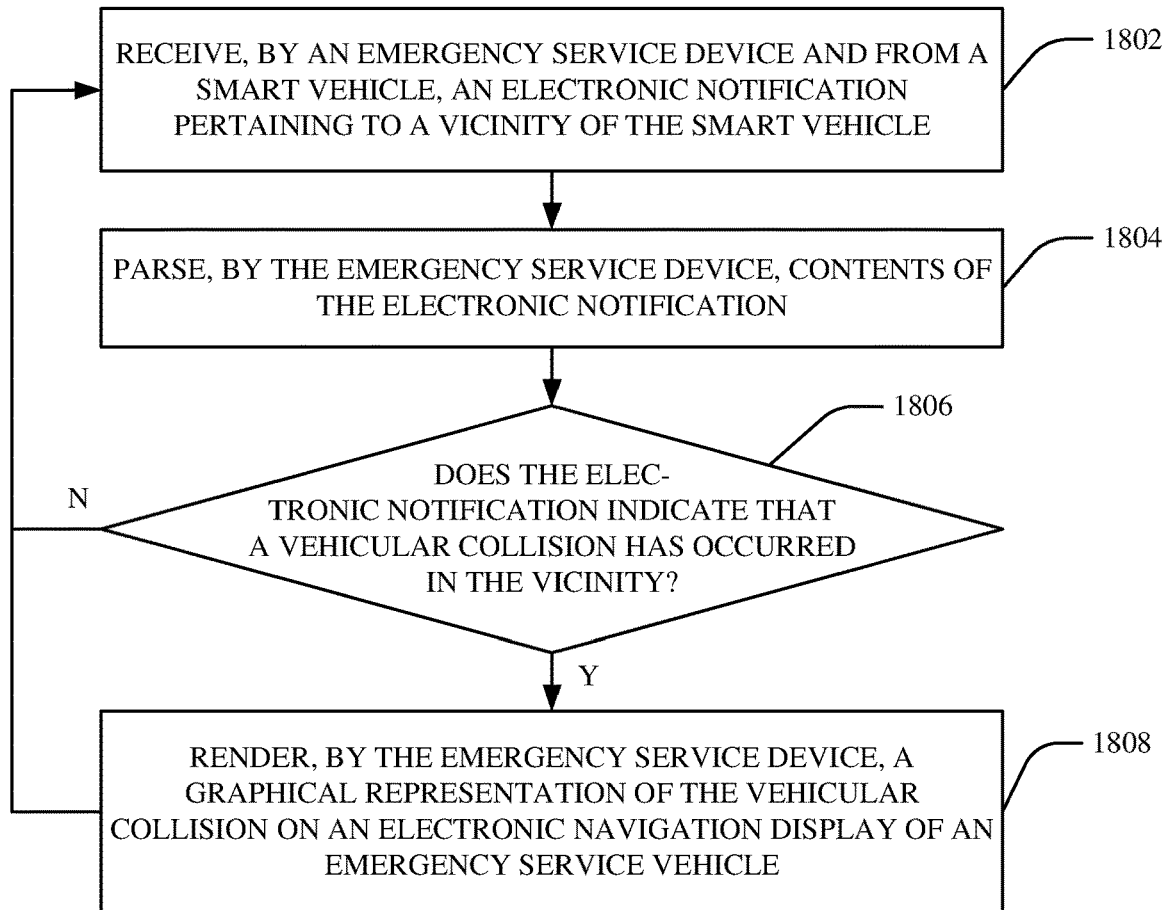
FIG. 18 illustrates a flow diagram of an example, non-limiting computer-implemented method that facilitates adjusting an electronic navigation display in accordance with one or more embodiments described herein.

FIG. 18 illustrates a flow diagram of an example, non-limiting computer-implemented method 1800 that can facilitate adjusting an electronic navigation display in accordance with one or more embodiments described herein. In various cases, the emergency service system 110 can facilitate the computer-implemented method 1800.

In various embodiments, act 1802 can include receiving (e.g., via 1306), by an emergency service device (e.g., 110) and from a smart vehicle (e.g., 102), an electronic notification (e.g., 704) pertaining to a vicinity (e.g., 106) of the smart vehicle.

In various aspects, act 1804 can include parsing, by the emergency service device (e.g., via 1308), contents of the electronic notification.

In various instances, act 1806 can include determining, by the emergency service device (e.g., via 1308), whether the electronic notification indicates that a vehicular collision (e.g., 108) has occurred or is occurring in the vicinity. If not (e.g., if the electronic notification indicates that no vehicular collision has yet been detected in the vicinity), then the computer-implemented method 1800 can proceed back to act 1802. If so (e.g., if the electronic notification indicates that a vehicular collision has been detected in the vicinity), then the computer-implemented method 1800 can proceed to act 1808.

In various cases, act 1808 can include rendering, by the emergency service device (e.g., via 1310), a graphical representation (e.g., 1702 or 1704) of the vehicular collision on an electronic navigation display (e.g., 1502) of an emergency service vehicle. As shown, the computer-implemented method 1800 can proceed back to act 1802.

In various embodiments, in response to the determination indicator 1402 being in the active state, the execution component 1310 can compute an electronic navigation route for whatever emergency service vehicle corresponds to the emergency service system 110. Various non-limiting examples are described with respect to FIG. 19.

Figure 19:
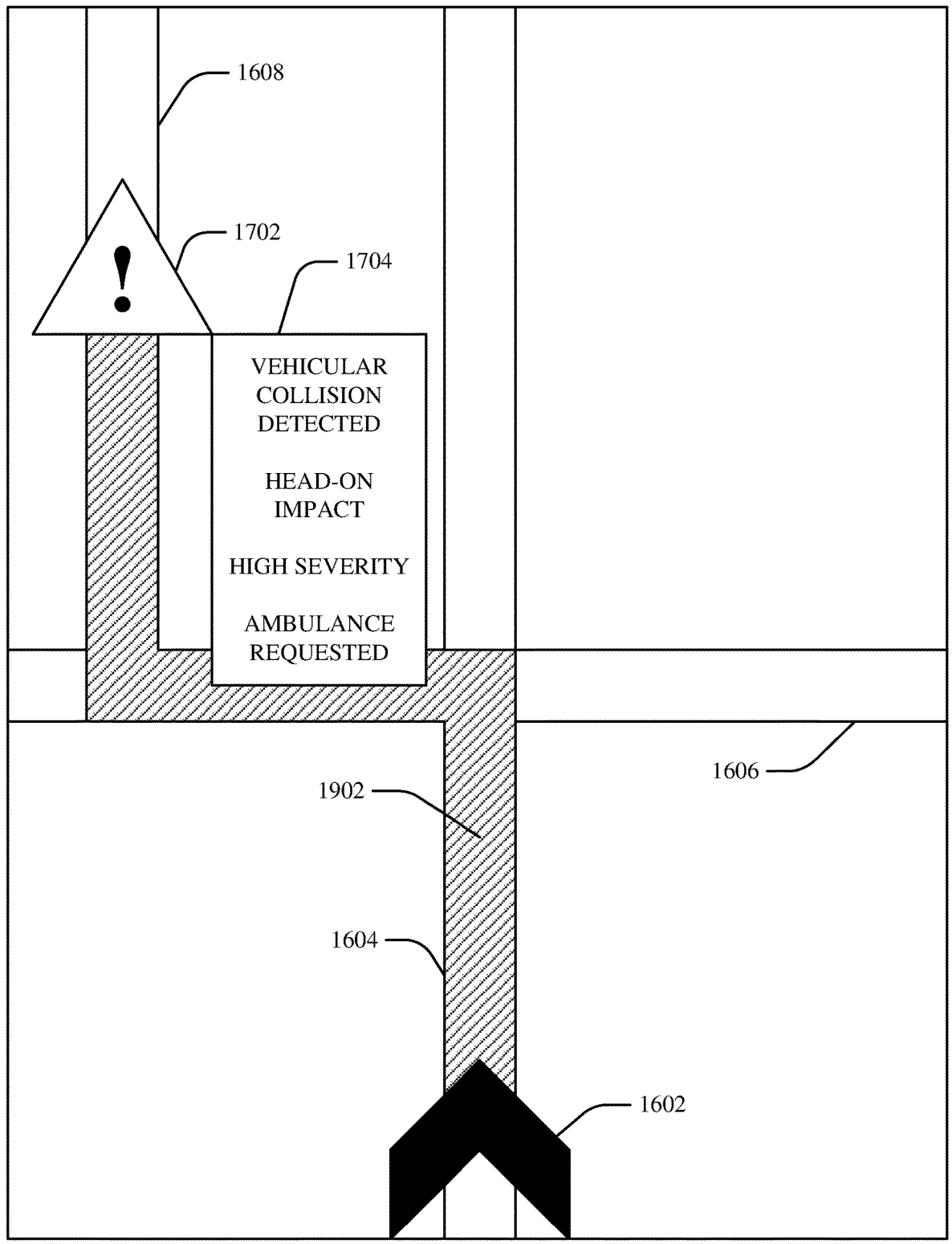
FIG. 19 illustrates an example, non-limiting block diagram showing how an electronic navigation route can be computed and rendered in accordance with one or more embodiments described herein.

FIG. 19 illustrates an example, non-limiting block diagram 1900 showing how an electronic navigation route can be computed and rendered in accordance with one or more embodiments described herein.

As shown, FIG. 19 illustrates an example, non-limiting view of the electronic navigation display 1502. As described above, the electronic navigation display 1502 can depict the graphical representation 1602 of the emergency service vehicle that corresponds to the emergency service system 110, the graphical representation 1604 of the road on which the emergency service vehicle is currently driving, the graphical representation 1606 of a second road that perpendicularly intersects the road on which the emergency service vehicle is currently driving, the graphical representation 1608 of a third road that perpendicularly branches off from the second road, the graphical representation 1702 of the vehicular collision detected by the deep learning neural network 402, or the textual description 1704 of the vehicular collision.

In various aspects, the execution component 1310 can compute, calculate, or otherwise determine, via any suitable geographic mapping or routing techniques, an electronic navigation route for the emergency service vehicle to follow. In particular, like the vehicle 102, the emergency service vehicle can be outfitted with any suitable geolocation sensors. Accordingly, the execution component 1310 can utilize such geolocation sensors to determine a current geolocation of the emergency service vehicle at any given instant in time. In various cases, as mentioned above, the electronic alert 704 can include the geolocation stamp 814, which can indicate a geolocation of the vehicular collision (e.g., 108) detected by the deep learning neural network 402. That is, the execution component 1310 can, in various aspects, know both the current geolocation of the emergency service vehicle and the geolocation of the vehicular collision. Thus, the execution component 1310 can calculate or otherwise compute, via any suitable geographic mapping or routing techniques, an electronic navigation route (e.g., a sequence of traffic directions) that leads from the current geolocation of the emergency service vehicle to the geolocation of the vehicular collision. In various instances, the execution component 1310 can render a graphical representation 1902 of such electronic navigation route on the electronic navigation display 1502. Therefore, the electronic navigation route can be visible to a driver of the emergency service vehicle, so that the driver can know how to get to the scene of the vehicular collision. In various aspects, rendition of the graphical representation 1902 can be considered as dispatching the emergency service vehicle to the scene of the vehicular collision (e.g., as ordering the emergency service vehicular to handle the vehicular collision).

Figure 20:
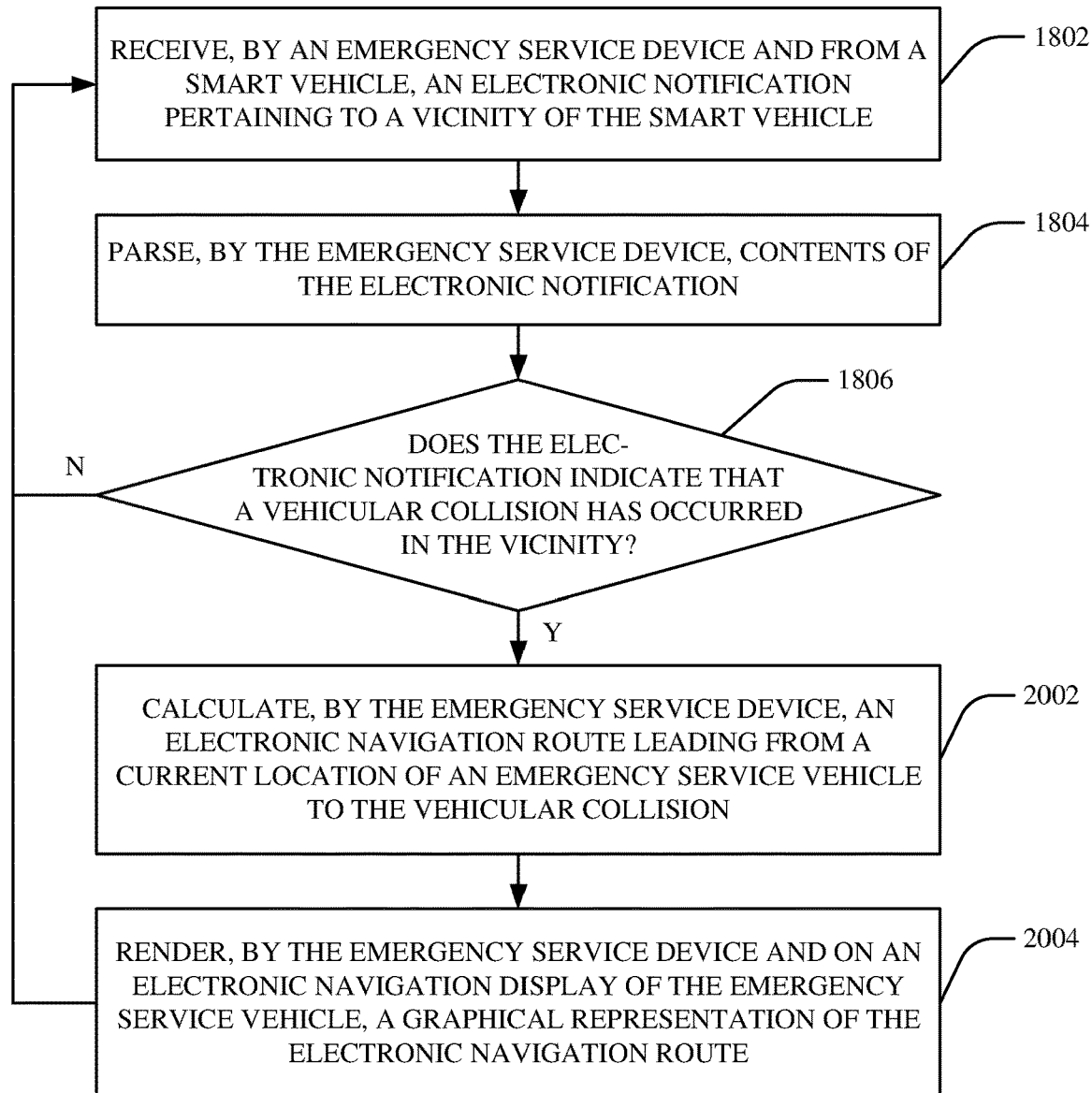
FIG. 20 illustrates a flow diagram of an example, non-limiting computer-implemented method that facilitates generating an electronic navigation route in accordance with one or more embodiments described herein.

FIG. 20 illustrates a flow diagram of an example, non-limiting computer-implemented method 2000 that can facilitate generating an electronic navigation route in accordance with one or more embodiments described herein. In various cases, the emergency service system 110 can facilitate the computer-implemented method 2000.

In various embodiments, the computer-implemented method 2000 can include acts 1802, 1804, and 1806, as described above. In various aspects, if it is determined at act 1806 that the electronic notification indicates that a vehicular collision (e.g., 108) has occurred or is occurring in the vicinity (e.g., 106) of the smart vehicle (e.g., 102), then the computer-implemented method 2000 can proceed to act 2002.

In various embodiments, act 2002 can include calculating, by the emergency service device (e.g., via 1310), an electronic navigation route that can lead from a current location of an emergency service vehicle to the vehicular collision.

In various aspects, act 2004 can include rendering, by the emergency service device (e.g., via 1310) and on an electronic navigation display (e.g., 1502) of the emergency service vehicle, a graphical representation (e.g., 1902) of the electronic navigation route. In various cases, the computer-implemented method 2000 can proceed back to act 1802.

Figure 21:
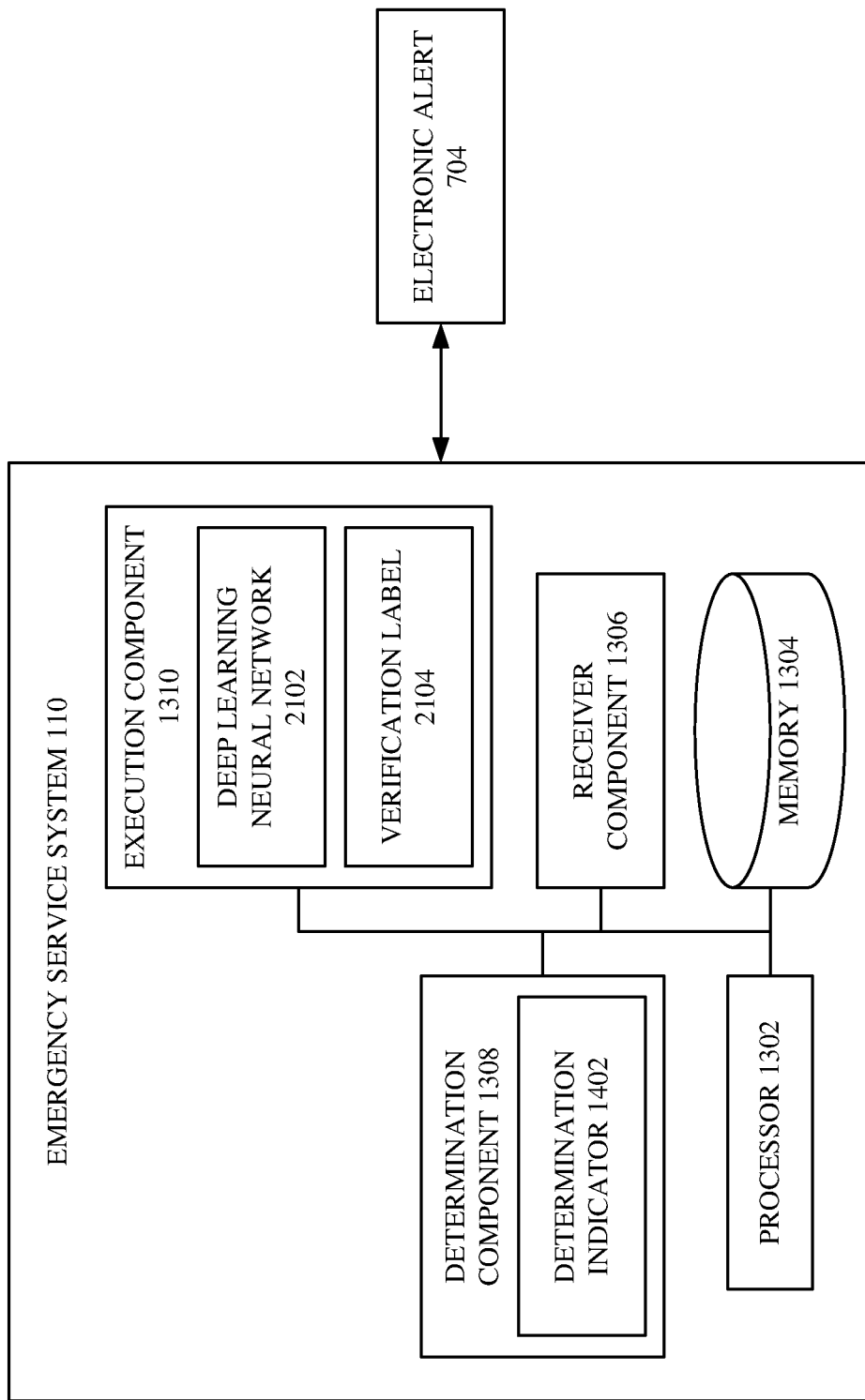
FIG. 21 illustrates a block diagram of an example, non-limiting system including a deep learning neural network and a verification label that facilitates a receipt-side of artificially intelligent provision of post-vehicular-collision evidence in accordance with one or more embodiments described herein.

FIG. 21 illustrates a block diagram of an example, non-limiting system 2100 including a deep learning neural network and a verification label that can facilitate a receipt-side of artificially intelligent provision of post-vehicular-collision evidence in accordance with one or more embodiments described herein. As shown, the system 2100 can, in some cases, comprise the same components as the system 1500, and can further comprise a deep learning neural network 2102 or a verification label 2104.

In various embodiments, the execution component 1310 can electronically store, electronically maintain, electronically control, or otherwise electronically access the deep learning neural network 2102. In various aspects, the deep learning neural network 2102 can have or otherwise exhibit any suitable internal architecture. For instance, the deep learning neural network 2102 can have an input layer, one or more hidden layers, and an output layer. In various instances, any of such layers can be coupled together by any suitable interneuron connections or interlayer connections, such as forward connections, skip connections, or recurrent connections. Furthermore, in various cases, any of such layers can be any suitable types of neural network layers having any suitable trainable or non-trainable internal parameters. For example, any of such input layer, one or more hidden layers, or output layer can be convolutional layers, dense layers, batch normalization layers, non-linearity layers, padding layers, pooling layers, or concatenation layers. In various cases, the deep learning neural network 2102 can have the same or different internal architecture as the deep learning neural network 402.

In any case, the deep learning neural network 2102 can be configured to detect vehicular collisions based on inputted vicinity data, just like the deep learning neural network 402. Accordingly, the deep learning neural network 2102 can undergo any suitable type of training, just like the deep learning neural network 402 (e.g., as described with respect to FIGS. 9-11). In some cases, the deep learning neural network 2102 can be trained on the same or different training dataset as the deep learning neural network 402.

In various aspects, the execution component 1310 can use the deep learning neural network 2102 to double-check the analysis outputted by the deep learning neural network 402. In particular, as mentioned above, the electronic alert 704 can include the vicinity data 208. As also mentioned above, the deep learning neural network 402 can have detected the vehicular collision (e.g., 108) based on the vicinity data 208. Accordingly, in various aspects, the execution component 1310 can double-check this detection of the deep learning neural network 402, by executing the deep learning neural network 2102 on the vicinity data 208, thereby yielding the verification label 2104. Various non-limiting aspects are explained with respect to FIG. 22.

Figure 22:
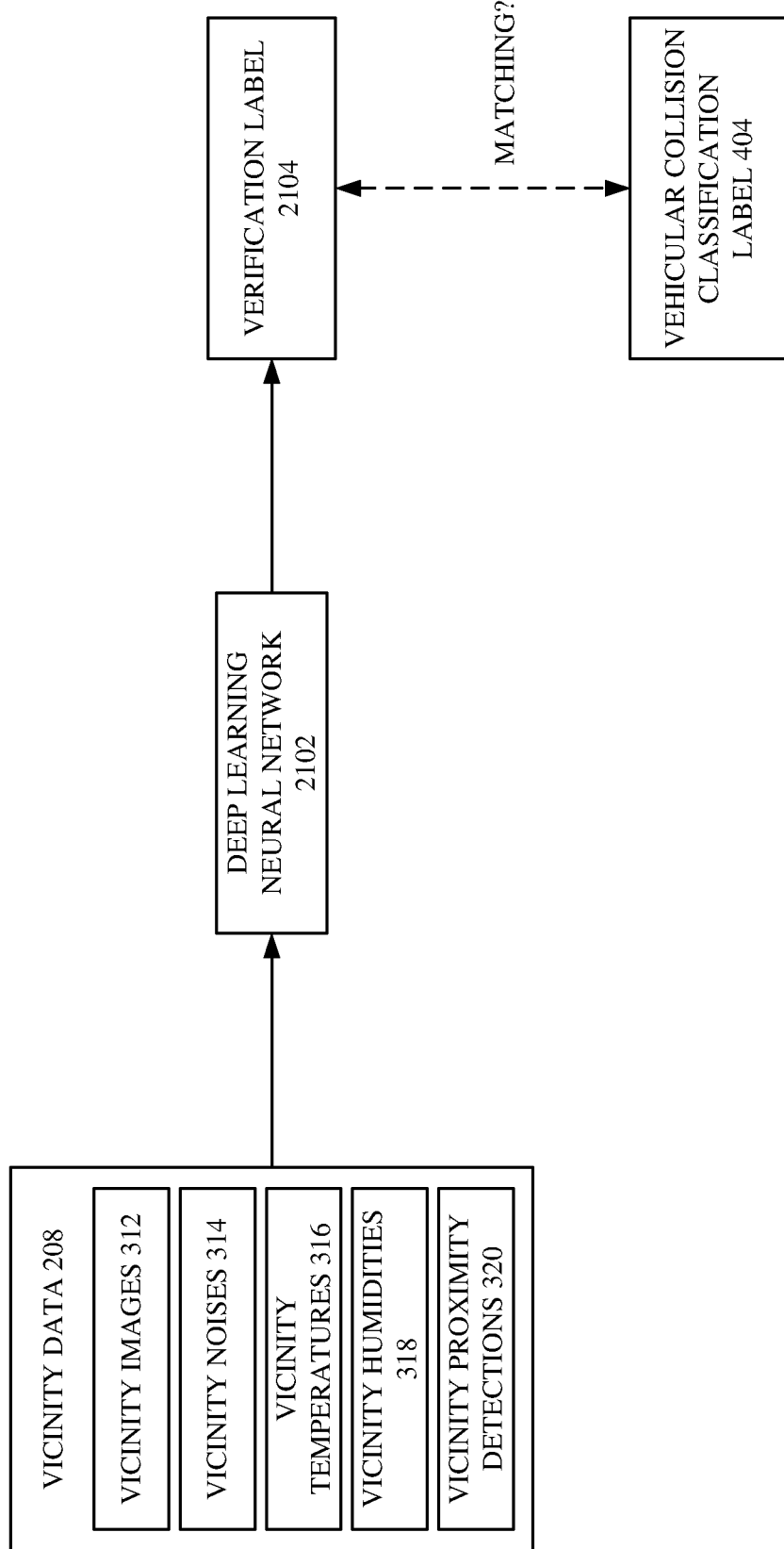
FIG. 22 illustrates an example, non-limiting block diagram showing how a deep learning neural network can generate a verification label in accordance with one or more embodiments described herein.

FIG. 22 illustrates an example, non-limiting block diagram 2200 showing how the deep learning neural network 2102 can generate the verification label 2104 in accordance with one or more embodiments described herein.

As shown, in response to the determination indicator 1402 being set to the active state, the execution component 1310 can, in various aspects, execute the deep learning neural network 2102 on the vicinity data 208, and such execution can cause the deep learning neural network 2102 to produce the verification label 2104. More specifically, the execution component 1310 can feed the vicinity data 208 (e.g., the set of vicinity images 312, the set of vicinity noises 314, the set of vicinity temperatures 316, the set of vicinity humidities 318, or the set of vicinity proximity detections 320) to an input layer of the deep learning neural network 2102. In various instances, the vicinity data 208 (e.g., the set of vicinity images 312, the set of vicinity noises 314, the set of vicinity temperatures 316, the set of vicinity humidities 318, or the set of vicinity proximity detections 320) can complete a forward pass through one or more hidden layers of the deep learning neural network 2102. In various instances, an output layer of the deep learning neural network 2102 can compute the verification label 2104, based on activation maps or intermediate features produced by the one or more hidden layers.

In various aspects, the verification label 2104 can have the same format, size, or dimensionality as the vehicular collision classification label 404. That is, the vehicular collision classification label 404 can indicate, specify, convey, or otherwise represent a presence or attributes of a vehicular collision that the deep learning neural network 402 believes has occurred or is occurring in the vicinity 106, whereas the verification label 2104 can indicate, specify, convey, or otherwise represent a presence or attributes of a vehicular collision that the deep learning neural network 2102 believes has occurred or is occurring in the vicinity 106.

In various aspects, the execution component 1310 can compare the verification label 2104 with the vehicular collision classification label 404. If the verification label 2104 matches (e.g., differs by not more than any suitable threshold margin from) the vehicular collision classification label 404, then the execution component 1310 can conclude that the deep learning neural network 402 correctly analyzed the vicinity data 208. In such case, the execution component 1310 can transmit, via the communication link 112 and to the collision evidence system 104, an electronic reply (not shown) indicating that the analysis results produced by the deep learning neural network 402 based on the vicinity data 208 have been successfully double-checked and that emergency services will thus be dispatched. In contrast, if the verification label 2104 does not match (e.g., differs by more than any suitable threshold margin from) the vehicular collision classification label 404, then the execution component 1310 can conclude that the deep learning neural network 402 incorrectly analyzed the vicinity data 208. In such case, the execution component 1310 can transmit, via the communication link 112 and to the collision evidence system 104, an electronic reply (not shown) indicating that the analysis results produced by the deep learning neural network 402 based on the vicinity data 208 have not been successfully double-checked. In such case, the electronic reply can further indicate that emergency services will not be dispatched, in response to the verification label 2104 indicating that no vehicular collision is occurring or has occurred in the vicinity 106. In contrast, the electronic reply can further indicate that emergency services will nevertheless be dispatched (e.g., notwithstanding the incorrect analysis of the deep learning neural network 402), in response to the verification label 2104 indicating that a different vehicular collision (e.g., having attributes different from those specified in the vehicular collision classification label 404) is occurring or has occurred in the vicinity 106.

Note that, in some cases where the verification label 2104 does not match the vehicular collision classification label 404, it can be possible for the vehicular collision classification label 404 to be correct and for the verification label 2104 to be incorrect (e.g., it can be possible for the deep learning neural network 402 to have correctly analyzed the vicinity data 208 and for the deep learning neural network 2102 to have incorrectly analyzed the vicinity data 208). To help deal with such situations, the execution component 1310 can, in some cases and in response to a determination that the verification label 2104 does not match the vehicular collision classification label 404, electronically replay or reproduce any portions of the vicinity data 208 for viewing, listening, or other inspection by a user of the emergency service system 110. For example, the execution component 1310 can electronically render the set of vicinity images 312 on any suitable computer screen that is visible to the user. As another example, the execution component 1310 can electronically play the set of vicinity noises 314 on any suitable computer speakers that are audible to the user. Accordingly, the execution component 1310 can electronically receive from the user any suitable input (e.g., via keyboard, keypad, computer mouse, touchscreen, or voice command), where such input can indicate whether or not the user believes that the vicinity data 208 represents a vehicular collision. In this way, the user can provide manual confirmation regarding whether the vicinity data 208 represents a vehicular collision.

Figure 23:
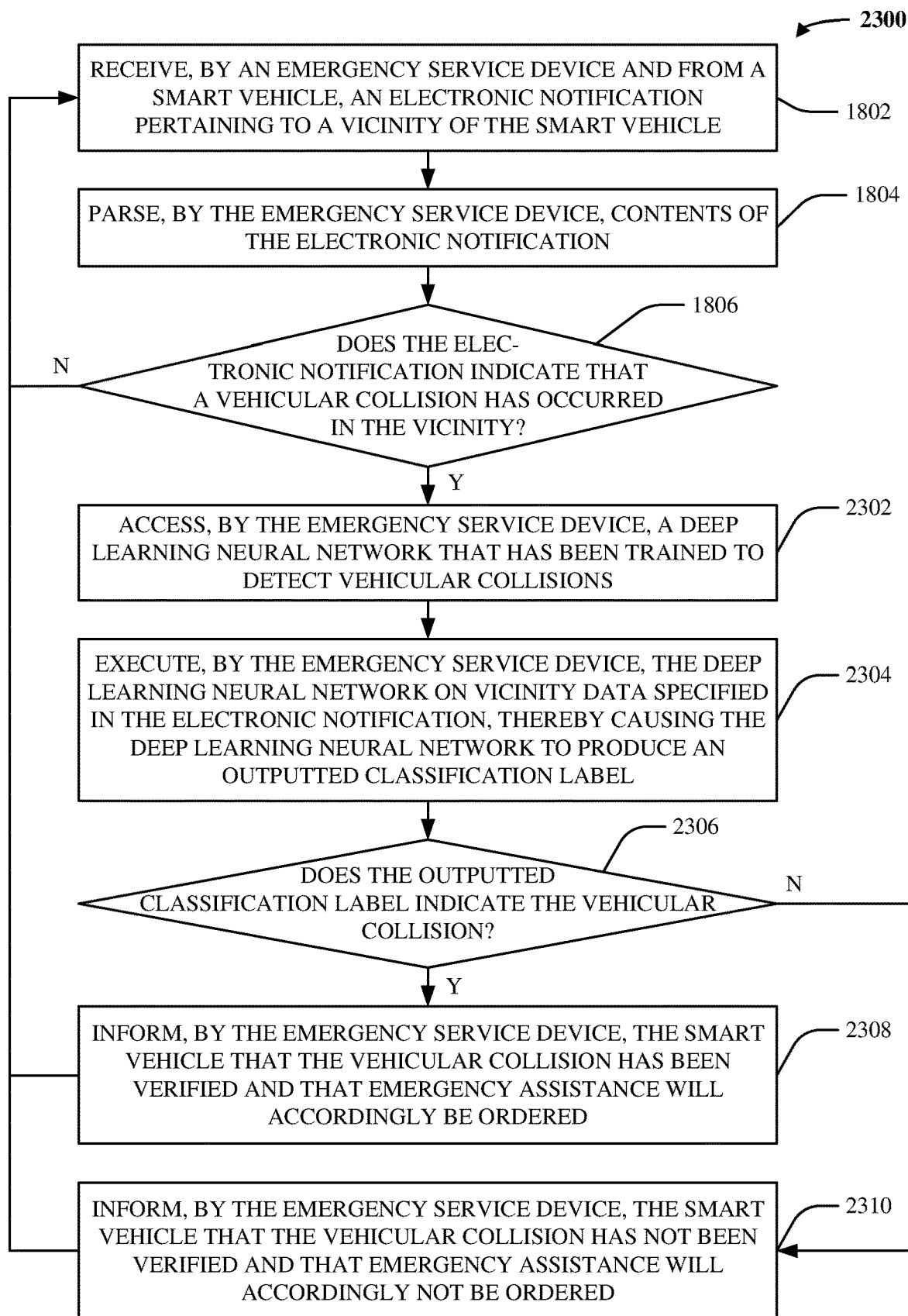
FIG. 23 illustrates a flow diagram of an example, non-limiting computer-implemented method that facilitates generation of a verification label in accordance with one or more embodiments described herein.

FIG. 23 illustrates a flow diagram of an example, non-limiting computer-implemented method 2300 that can facilitate generation of a verification label in accordance with one or more embodiments described herein. In various cases, the emergency service system 110 can facilitate the computer-implemented method 2300.

In various embodiments, the computer-implemented method 2300 can include acts 1802, 1804, and 1806, as described above. In various aspects, if it is determined at act 1806 that the electronic notification (e.g., 704) indicates that a vehicular collision (e.g., 108) has occurred or is occurring in the vicinity (e.g., 106) of the smart vehicle (e.g., 102), then the computer-implemented method 2300 can proceed to act 2302.

In various embodiments, act 2302 can include accessing, by the emergency service device (e.g., via 1310), a deep learning neural network (e.g., 2102) that has been trained to detect vehicular collisions.

In various aspects, act 2304 can include executing, by the emergency service device (e.g., via 1310), the deep learning neural network on vicinity data (e.g., 208) specified in the electronic notification. In various cases, this can cause the deep learning neural network to produce an outputted classification label (e.g., 2104).

In various instances, act 2306 can include determining, by the emergency service device (e.g., via 1310), whether the outputted classification label indicates the vehicular collision (e.g., determining whether 2104 matches 404). If so, the computer-implemented method 2300 can proceed to act 2308. If not, the computer-implemented method 2300 can instead proceed to act 2310.

In various cases, act 2308 can include informing, by the emergency service device (e.g., via 1310), the smart vehicle (e.g., 102) that the vehicular collision has been verified. In various aspects, this can further include informing, by the emergency service device (e.g., via 1310), the smart vehicle that emergency assistance will accordingly be ordered or dispatched. As shown, the computer-implemented method 2300 can proceed back to act 1802.

In various instances, act 2310 can include informing, by the emergency service device (e.g., via 1310), the smart vehicle (e.g., 102) that the vehicular collision has not been verified. In various cases, this can further include informing, by the emergency service device (e.g., via 1310), the smart vehicle that emergency assistance will accordingly not be ordered or dispatched. As shown, the computer-implemented method 2300 can proceed back to act 1802.

Thus far, various embodiments have been described in which the broadcast component 214 can transmit the electronic alert 704 to the emergency service system 110. However, in various embodiments, there can be a neighboring vehicle within the vicinity 106, and the broadcast component 214 can transmit a version of the electronic alert 704 to such neighboring vehicle. Various non-limiting aspects are described with respect to FIGS. 24-25.

Figure 24:
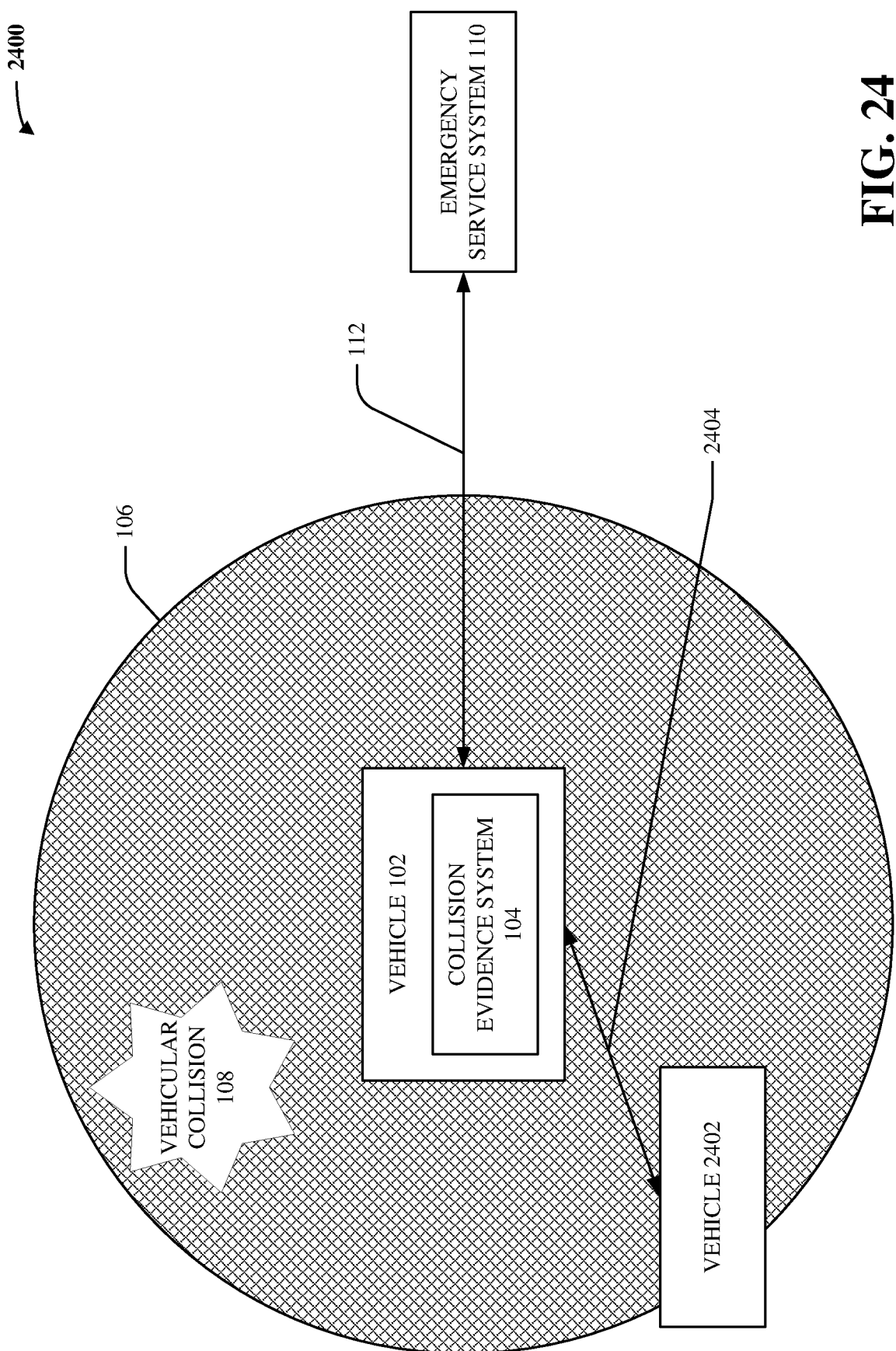
FIG. 24 illustrates an example, non-limiting block diagram showing a neighboring vehicle within a vicinity of a vehicle that has detected a vehicular collision, where such neighboring vehicle can facilitate artificially intelligent provision of post-vehicular-collision evidence in accordance with one or more embodiments described herein.

FIG. 24 illustrates an example, non-limiting block diagram 2400 showing a neighboring vehicle within a vicinity of a vehicle that has detected a vehicular collision, where such neighboring vehicle can facilitate artificially intelligent provision of post-vehicular-collision evidence in accordance with one or more embodiments described herein.

As shown, FIG. 24 depicts the vehicle 102, the collision evidence system 104, the vicinity 106, the vehicular collision 108, the emergency service system 110, and the communication link 112.

As further shown, there can be a vehicle 2402. In various aspects, the vehicle 2402 can be any suitable vehicle that is within the vicinity 106 and that is not involved in the vehicular collision 108. In other words, the vehicle 2402 can be considered as a neighboring vehicle that is near the vehicle 102 and that, like the vehicle 102, is spectating or witnessing the vehicular collision 108 or the aftermath of the vehicular collision 108. Although not explicitly shown in FIG. 24 for purposes of visual clarity, the vehicle 2402 can be considered as having its own vicinity (e.g., like the vicinity 106). Because the vehicular collision 108 and the vehicle 2402 can both be within the vicinity 106, it can be presumed that the vehicular collision 108 is also within the vicinity of the vehicle 2402.

Furthermore, as shown, the vehicle 2402 can be communicatively coupled to the vehicle 102 via a communication link 2404. In various aspects, the communication link 2404 can be like the communication link 112. That is, the communication link 2404 can, in some cases, be any suitable wireless Internet connection that utilizes intermediate access points or intermediate routers, or the communication link 2404 can, in other cases, be any suitable P2P connection that can operate in the absence of intermediate access points or intermediate routers (e.g., BLUETOOTH® P2P or Wi-Fi P2P).

In various aspects, in response to the vehicular collision classification label 404 indicating that a vehicular collision (e.g., 108) is occurring or has occurred in the vicinity 106, the broadcast component 214 of the collision evidence system 104 can electronically generate the electronic alert 704 as described above, and the broadcast component 214 can electronically transmit, via the communication link 2404, an anonymized version of the electronic alert 704 to the vehicle 2402. Like the electronic alert 704, the anonymized version of the electronic alert 704 can, in various instances, comprise the recorded post-collision evidence 702, the vehicular collision classification label 404, the vicinity data 208, the geolocation stamp 814, or the timestamp 816. However, unlike the electronic alert 704, the anonymized version of the electronic alert 704 can, in various cases, lack the vehicle identifier 818, hence the name "anonymized." In other words, the vehicle 102 can inform the vehicle 2402 (can inform any suitable computing device of the vehicle 2402) of the vehicular collision classification label 404, of the vicinity data 208, of the geolocation stamp 814, or of the timestamp 816, but the vehicle 102 can refrain from informing the vehicle 2402 of identifying information corresponding to the vehicle 102. In this way, a privacy of the vehicle 102 can be preserved or maintained.

Moreover, in various aspects, the anonymized version of the electronic alert 704 can lack the assistance request 820. Instead, the anonymized version of the electronic alert 704 can, in various instances, comprise an evidence recordation request. Indeed, the vehicle 2402 can be considered as having its own vicinity, and the vehicular collision 108 can be considered as being within that vicinity of the vehicle 2402. Furthermore, like the vehicle 102, the vehicle 2402 can be outfitted or otherwise equipped with any suitable road-facing sensors that can monitor, scan, or otherwise capture what transpires in the vicinity of the vehicle 2402. As some non-limiting examples, the vehicle 2402 can have any suitable vehicle cameras (e.g., like the set of vehicle cameras 302), can have any suitable vehicle microphones (e.g., like the set of vehicle microphones 304), can have any suitable vehicle thermometers (e.g., like the set of vehicle thermometers 306), can have any suitable vehicle hygrometers (e.g., like the set of vehicle hygrometers 308), or can have any suitable vehicle proximity sensors (e.g., like the set of vehicle proximity sensors 310). Accordingly, in various cases, the evidence recordation request of the anonymized version of the electronic alert 704 can be any suitable electronic data that instructs, commands, prompts, or otherwise asks the vehicle 2402 to utilize its various sensors to begin recording the vehicular collision 108 (e.g., to begin recording the vicinity of the vehicle 2402, which can encompass the vehicular collision 108). In other words, the evidence recordation request of the anonymized version of the electronic alert 704 can instruct the vehicle 2402 to generate its own version of recorded post-collision evidence concerning the vehicular collision 108. In various aspects, the vehicle 2402 can obey the evidence recordation request, thereby recording the vehicular collision 108 or its aftermath. In various instances, although not explicitly shown in the figures, the vehicle 2402 can transmit any of such recorded evidence to the emergency service system 110, to the collision evidence system 104, or to any other suitable computing device.

Figure 25:
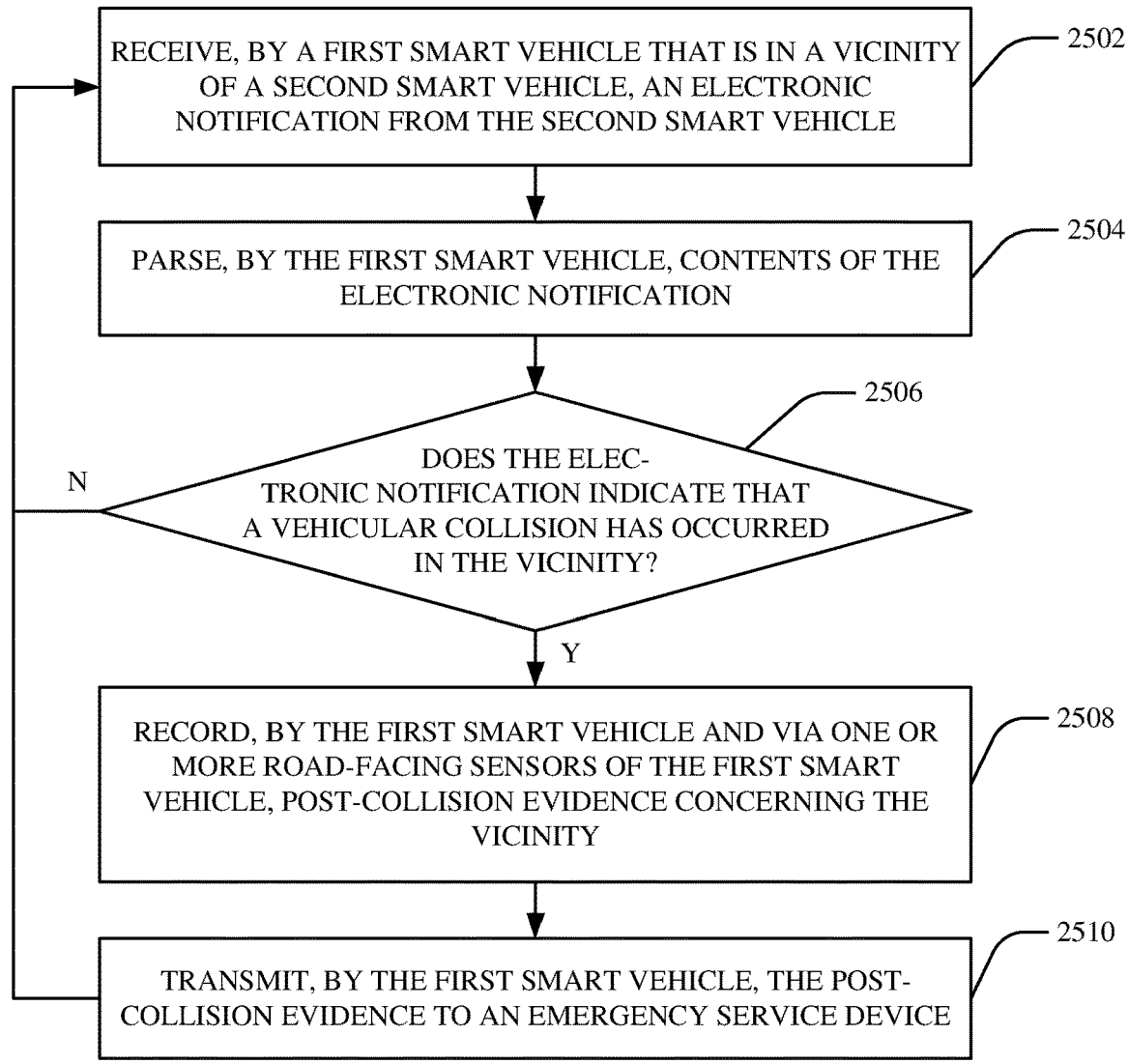
FIG. 25 illustrates a flow diagram of an example, non-limiting computer-implemented method that facilitates a neighboring vehicle aspect of artificially intelligent provision of post-vehicular-collision evidence in accordance with one or more embodiments described herein.

FIG. 25 illustrates a flow diagram of an example, non-limiting computer-implemented method 2500 that can facilitate a neighboring vehicle aspect of artificially intelligent provision of post-vehicular-collision evidence in accordance with one or more embodiments described herein. In various cases, any suitable computing device of the vehicle 2402 can facilitate the computer-implemented method 2500.

In various embodiments, act 2502 can include receiving, by a first smart vehicle (e.g., 2402) that is in a vicinity (e.g., 106) of a second smart vehicle (e.g., 102), an electronic notification (e.g., anonymized version of 704) from the second smart vehicle.

In various aspects, act 2504 can include parsing, by the first smart vehicle (e.g., 2402), contents of the electronic notification.

In various instances, act 2506 can include determining, by the first smart vehicle (e.g., 2402), whether the electronic notification indicates that a vehicular collision (e.g., 108) has occurred or is occurring in the vicinity. If not, the computer-implemented method 2500 can proceed back to act 2502. If so, the computer-implemented method 2500 can proceed to act 2508.

In various cases, act 2508 can include recording, by the first smart vehicle (e.g., 2402) and via one or more road-facing sensors of the first smart vehicle (e.g., cameras, microphones, thermometers, hygrometers, or proximity sensors of 2402), post-collision evidence (e.g., like 702) concerning the vicinity.

In various aspects, act 2510 can include transmitting, by the first smart vehicle (e.g., 2402), the post-collision evidence to an emergency service device (e.g., 110). As shown, the computer-implemented method 2500 can proceed back to act 2502.

Thus far, various embodiments have been described in which the evidence component 212 can generate the recorded post-collision evidence 702 and the broadcast component 214 can transmit the electronic alert 704 (which can include the recorded post-collision evidence 702) to the emergency service system 110. However, in various aspects, the evidence component 212 can be omitted or can otherwise refrain from generating the recorded post-collision evidence 702. In such cases, rather than transmitting the electronic alert 704, the broadcast component 214 can instead broadcast a live stream of the vicinity 106 to the emergency service system 110. Various non-limiting aspects are described with respect to FIGS. 26-34.

Figure 26:
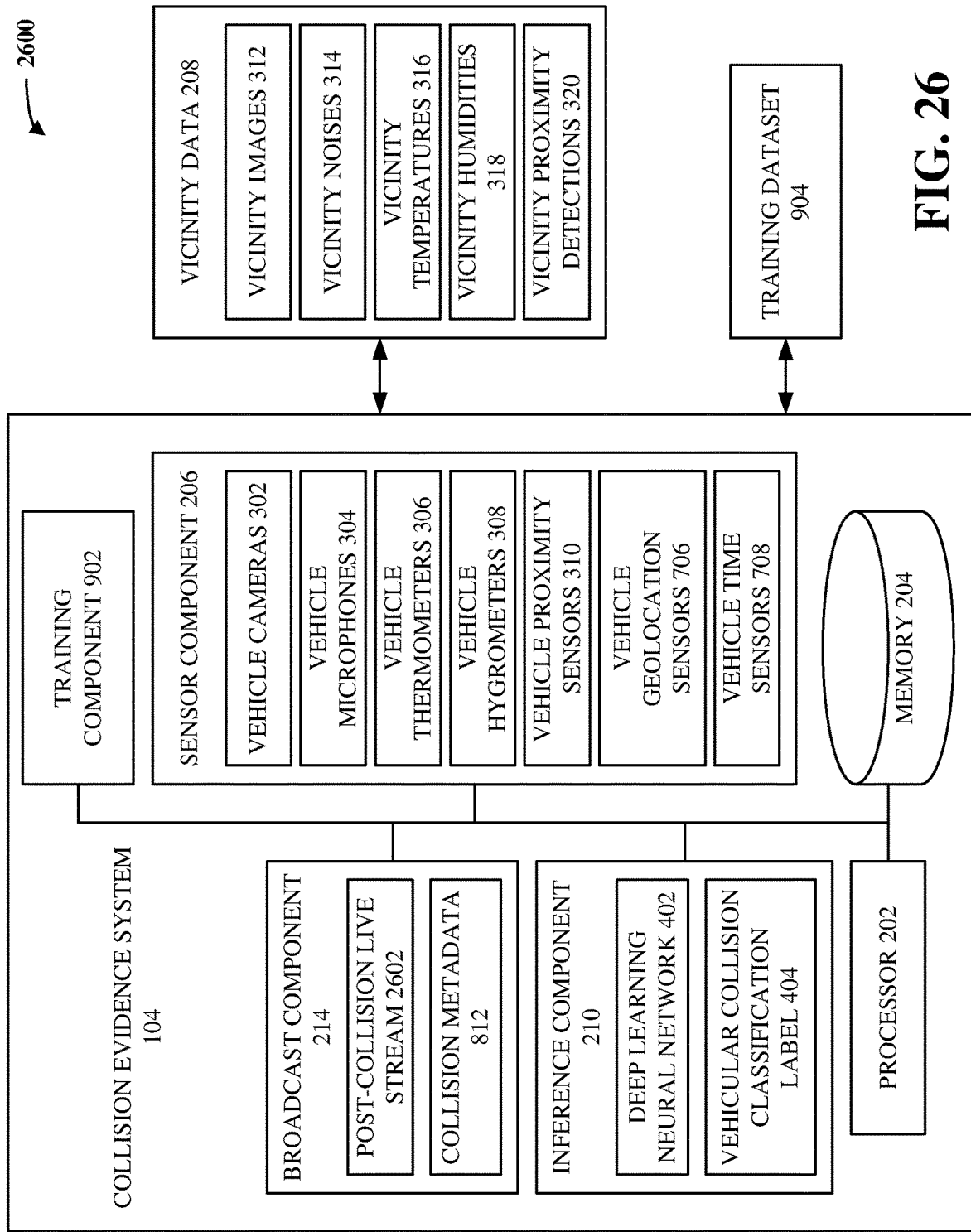
FIG. 26 illustrates a block diagram of an example, non-limiting system including a post-collision live stream that facilitates a broadcast-side of artificially intelligent provision of post-vehicular-collision evidence in accordance with one or more embodiments described herein.

FIG. 26 illustrates a block diagram of an example, non-limiting system 2600 including a post-collision live stream that can facilitate a broadcast-side of artificially intelligent provision of post-vehicular-collision evidence in accordance with one or more embodiments described herein. As shown, the system 2600 can, in some cases, omit or otherwise deactivate the evidence component 212, and can instead comprise a post-collision live stream 2602.

In various embodiments, in response to the vehicular collision classification label 404 indicating that a vehicular collision (e.g., 108) is occurring or has occurred in the vicinity 106, the broadcast component 214 can electronically transmit or otherwise electronically broadcast, via the communication link 112 and via the various sensors of the sensor component 206, the post-collision live stream 2602 to the receiver component 1306 of the emergency service system 110. In some cases, the broadcast component 214 can electronically transmit the collision metadata 812 (e.g., the vehicular collision classification label 404, the vicinity data 208, the geolocation stamp 814, the timestamp 816, or the vehicle identifier 818) to the receiver component 1306 in parallel with the post-collision live stream 2602. In otherwise, the post-collision live stream 2602 can be considered as being tagged with the collision metadata 812.

In any case, the post-collision live stream 2602 can be considered as any suitable electronic data that is captured by the various sensors of the sensor component 206 in the moments following detection of the vehicular collision (e.g., 108) by the deep learning neural network 402 and that is broadcasted/transmitted in real-time over the communication link 112. In other words, the post-collision live stream 2602 can be considered as showing whatever is transpiring in real-time within the vicinity 106 after detection of the vehicular collision. Various non-limiting aspects are discussed with respect to FIG. 27.

Figure 27:
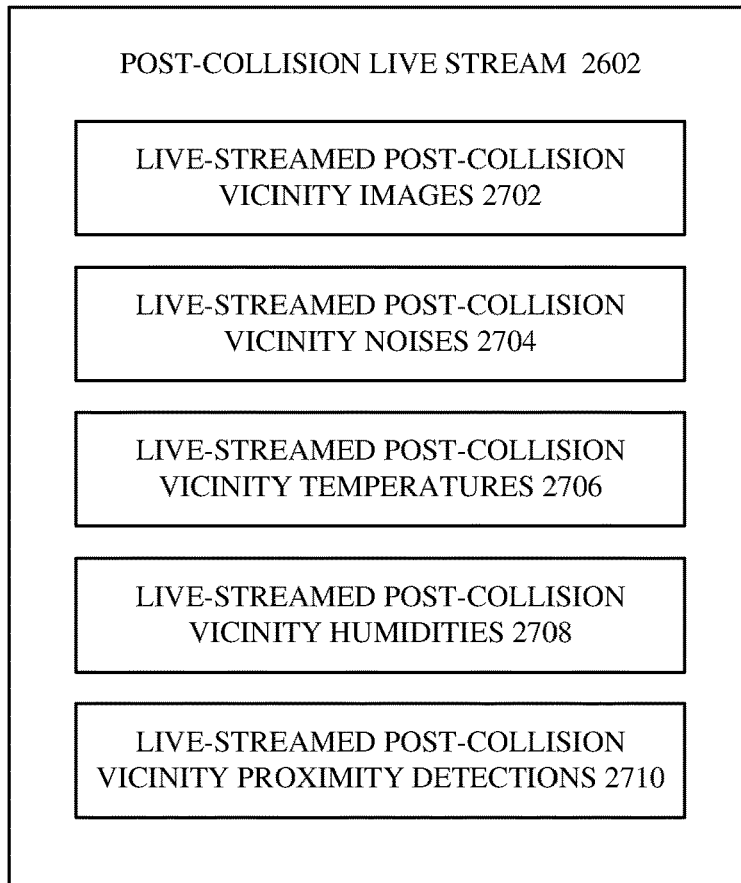
FIG. 27 illustrates an example, non-limiting block diagram of a post-collision live stream in accordance with one or more embodiments described herein.

FIG. 27 illustrates an example, non-limiting block diagram 2700 of a post-collision live stream in accordance with one or more embodiments described herein. In other words, FIG. 27 depicts a non-limiting example embodiment of the post-collision live stream 2602.

In various embodiments, as shown, the post-collision live stream 2602 can comprise a set of live-streamed post-collision vicinity images 2702. In various aspects, the broadcast component 214 can, in response to the vehicular collision classification label 404 indicating that a vehicular collision (e.g., 108) is occurring or has occurred in the vicinity 106, cause the set of vehicle cameras 302 to capture or otherwise record any suitable number of images or video frames (e.g., any suitable number of two-dimensional pixel arrays) that can depict portions of the vicinity 106 (e.g., portions of the vicinity 106 that lie in front of, behind, or beside the vehicle 102) in the moments after the vehicular collision. However, rather than being merely recorded or stored, such images or video frames can be transmitted or otherwise broadcasted, by the broadcast component 214 via the communication link 112, immediately or substantially immediately upon being captured by the set of vehicle cameras 302. In other words, such images or video frames can be captured and transmitted in real-time during the moments after the vehicular collision occurs or is detected. In still other words, such images or video frames can be live-streamed by the broadcast component 214 to the receiver component 1306. Accordingly, such images or video frames can be considered as the set of live-streamed post-collision vicinity images 2702.

In various embodiments, as shown, the post-collision live stream 2602 can comprise a set of live-streamed post-collision vicinity noises 2704. In various aspects, the broadcast component 214 can, in response to the vehicular collision classification label 404 indicating that a vehicular collision (e.g., 108) is occurring or has occurred in the vicinity 106, cause the set of vehicle microphones 304 to capture or otherwise record any suitable number of sound bites that can represent noises occurring in portions of the vicinity 106 (e.g., portions of the vicinity 106 that lie in front of, behind, or beside the vehicle 102) in the moments after the vehicular collision. However, rather than being merely recorded or stored, such sound bites can be transmitted or otherwise broadcasted, by the broadcast component 214 via the communication link 112, immediately or substantially immediately upon being captured by the set of vehicle microphones 304. In other words, such sound bites can be captured and transmitted in real-time during the moments after the vehicular collision occurs or is detected. In still other words, such sound bites can be live-streamed by the broadcast component 214 to the receiver component 1306. Accordingly, such sound bites can be considered as the set of live-streamed post-collision vicinity noises 2704.

In various embodiments, as shown, the post-collision live stream 2602 can comprise a set of live-streamed post-collision vicinity temperatures 2706. In various aspects, the broadcast component 214 can, in response to the vehicular collision classification label 404 indicating that a vehicular collision (e.g., 108) is occurring or has occurred in the vicinity 106, cause the set of vehicle thermometers 306 to capture or otherwise record any suitable number of temperature measurements that can represent air temperatures or road surface temperatures associated with portions of the vicinity 106 (e.g., portions of the vicinity 106 that lie in front of, behind, or beside the vehicle 102) in the moments after the vehicular collision. However, rather than being merely recorded or stored, such temperature measurements can be transmitted or otherwise broadcasted, by the broadcast component 214 via the communication link 112, immediately or substantially immediately upon being captured by the set of vehicle thermometers 306. In other words, such temperature measurements can be captured and transmitted in real-time during the moments after the vehicular collision occurs or is detected. In still other words, such temperature measurements can be live-streamed by the broadcast component 214 to the receiver component 1306. Accordingly, such temperature measurements can be considered as the set of live-streamed post-collision vicinity temperatures 2706.

In various embodiments, as shown, the post-collision live stream 2602 can comprise a set of live-streamed post-collision vicinity humidities 2708. In various aspects, the broadcast component 214 can, in response to the vehicular collision classification label 404 indicating that a vehicular collision (e.g., 108) is occurring or has occurred in the vicinity 106, cause the set of vehicle hygrometers 308 to capture or otherwise record any suitable number of humidity measurements that can represent air moisture contents or road surface moisture levels associated with portions of the vicinity 106 (e.g., portions of the vicinity 106 that lie in front of, behind, or beside the vehicle 102) in the moments after the vehicular collision. However, rather than being merely recorded or stored, such humidity measurements can be transmitted or otherwise broadcasted, by the broadcast component 214 via the communication link 112, immediately or substantially immediately upon being captured by the set of vehicle hygrometers 308. In other words, such humidity measurements can be captured and transmitted in real-time during the moments after the vehicular collision occurs or is detected. In still other words, such humidity measurements can be live-streamed by the broadcast component 214 to the receiver component 1306. Accordingly, such humidity measurements can be considered as the set of live-streamed post-collision vicinity humidities 2708.

In various embodiments, as shown, the post-collision live stream 2602 can comprise a set of live-streamed post-collision vicinity proximity detections 2710. In various aspects, the broadcast component 214 can, in response to the vehicular collision classification label 404 indicating that a vehicular collision (e.g., 108) is occurring or has occurred in the vicinity 106, cause the set of vehicle proximity sensors 310 to capture or otherwise record any suitable number of radar, sonar, or lidar proximity measurements that can represent distances between the vehicle 102 and nearby objects located in portions of the vicinity 106 (e.g., portions of the vicinity 106 that lie in front of, behind, or beside the vehicle 102) in the moments after the vehicular collision. However, rather than being merely recorded or stored, such radar, sonar, or lidar proximity measurements can be transmitted or otherwise broadcasted, by the broadcast component 214 via the communication link 112, immediately or substantially immediately upon being captured by the set of vehicle proximity sensors 310. In other words, such radar, sonar, or lidar proximity measurements can be captured and transmitted in real-time during the moments after the vehicular collision occurs or is detected. In still other words, such radar, sonar, or lidar proximity measurements can be live-streamed by the broadcast component 214 to the receiver component 1306. Accordingly, such radar, sonar, or lidar proximity measurements can be considered as the set of live-streamed post-collision vicinity proximity detections 2710.

In any case, the post-collision live stream 2602 can be considered as allowing the emergency service system 110 (e.g., as allowing a user or operator of the emergency service system 110) to observe in real-time the aftermath of a vehicular collision (e.g., 108) that occurs in the vicinity 106, even if no emergency service vehicle has physically arrived yet at the vehicular collision. For example, the live-streamed post-collision vicinity images 2702 can allow a user or operator of the emergency service system 110 to "see" the aftermath of the vehicular collision in real-time, notwithstanding that emergency services might not yet actually be at the scene of the vehicular collision. As another example, the live-streamed post-collision vicinity noises 2704 can allow a user or operator of the emergency service system 110 to "hear" the aftermath of the vehicular collision in real-time, notwithstanding that emergency services might not yet actually be at the scene of the vehicular collision.

Because the collision metadata 812 can be transmitted in parallel with the post-collision live stream 2602, the execution component 1310 of the emergency service system 110 can perform any suitable actions based on the collision metadata 812, as described above (e.g., can render graphical representations of the vehicular collision on the electronic navigation display 1502, can compute an electronic navigation route leading to the vehicular collision, can double-check the vehicular collision classification label 404 via the deep learning neural network 2102).

Figure 28:
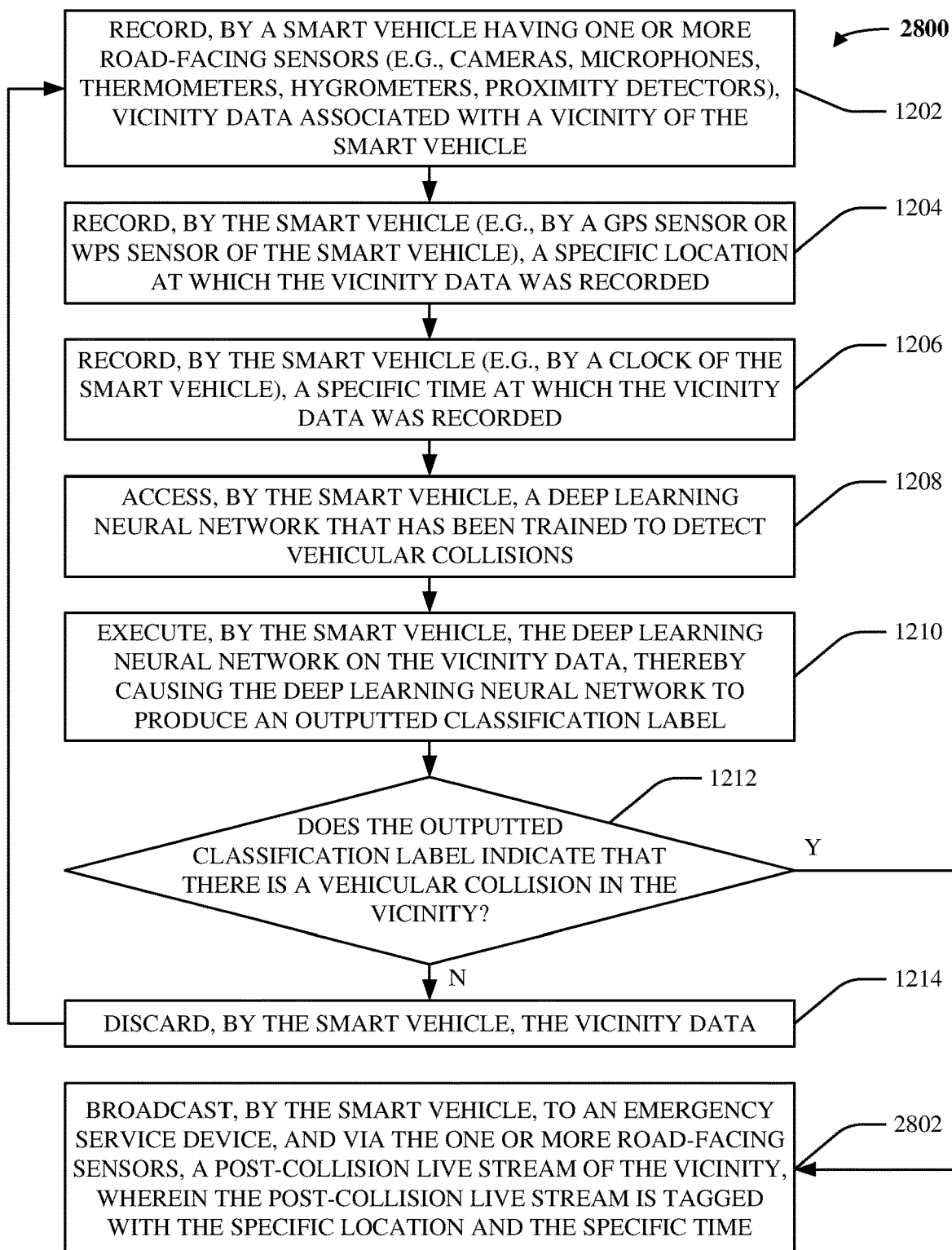
FIG. 28 illustrates a flow diagram of an example, non-limiting computer-implemented method that facilitates provision of a post-collision live stream in accordance with one or more embodiments described herein.

FIG. 28 illustrates a flow diagram of an example, non-limiting computer-implemented method 2800 that can facilitate provision of a post-collision live stream in accordance with one or more embodiments described herein. In various cases, the collision evidence system 104 can facilitate the computer-implemented method 2800.

In various embodiments, the computer-implemented method 2800 can include acts 1202, 1204, 1206, 1208, 1210, 1212, and 1214, as described above. In various aspects, if it is determined at act 1212 that the outputted classification label (e.g., 404) indicates that a vehicular collision (e.g., 108) has occurred or is occurring in the vicinity (e.g., 106) of the smart vehicle (e.g., 102), then the computer-implemented method 2800 can proceed to act 2802.

In various embodiments, act 2802 can include broadcasting, by the smart vehicle (e.g., via 214), to an emergency service device (e.g., 110), and via the one or more road-facing sensors (e.g., 302, 304, 306, 308, or 310), a post-collision live stream (e.g., 2602) of the vicinity. In various cases, the post-collision live stream can be tagged with the specific location (e.g., 814, specified in 812) and the specific time (e.g., 816, specified in 812).

Figure 29:
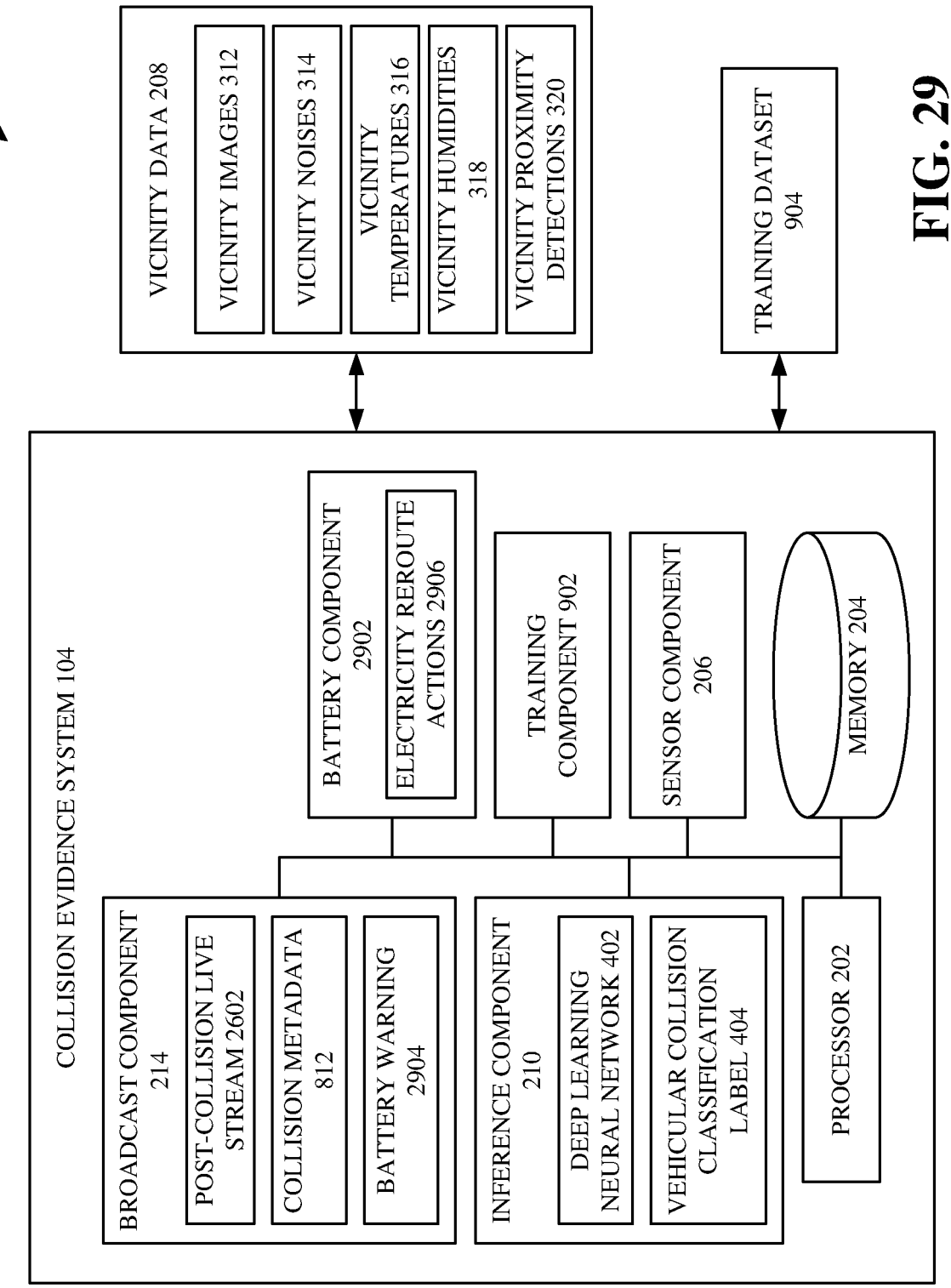
FIG. 29 illustrates a block diagram of an example, non-limiting system including a battery component that facilitates provision of a post-collision live stream in accordance with one or more embodiments described herein.

FIG. 29 illustrates a block diagram of an example, non-limiting system 2900 including a battery component that can facilitate provision of a post-collision live stream in accordance with one or more embodiments described herein. As shown, the system 2900 can, in some cases, comprise the same components as the system 2600, and can further comprise a battery component 2902, a battery warning 2904, or a set of electricity reroute actions 2906. Note that FIG. 29 does not depict the various sensors of the sensor component 206 for sake of visual clarity/space.

In various embodiments, as shown, the collision evidence system 104 can comprise the battery component 2902. In various aspects, the vehicle 102 can have any suitable electric battery (e.g., one or more lithium-ion car batteries, one or more solid-state car batteries) that can provide electric power to the various sensors of the sensor component 206 (e.g., to the set of vehicle cameras 302, to the set of vehicle microphones 304, to the set of vehicle thermometers 306, to the set of vehicle hygrometers 308, to the set of vehicle proximity sensors 310). Accordingly, if the battery of the vehicle 102 loses its charge, the various sensors of the sensor component 206 can be unable to provide the post-collision live stream 2602. In other words, if the battery of the vehicle 102 loses its charge during the post-collision live stream 2602, the post-collision live stream 2602 can be terminated, meaning that the emergency service system 110 would no longer be able to observe the aftermath of the vehicular collision (e.g., 108) in real-time (e.g., without having an actual emergency service presence at the scene of the vehicular collision).

Therefore, in various aspects, the battery component 2902 can electronically monitor, during the post-collision live stream 2602 and via any suitable voltage-meters or amperage-meters, a remaining life of the battery of the vehicle 102. Moreover, the battery component 2902 can compare such remaining life to any suitable threshold value. If the remaining battery life is above the threshold value, the battery component 2902 can re-measure the remaining battery life of the vehicle 102 and can compare that re-measurement to the threshold value. However, if the remaining battery life is below the threshold value, the broadcast component 214 can electronically generate the battery warning 2904.

In various aspects, the battery warning 2904 can be any suitable electronic message or notification that indicates that the post-collision live stream 2602 is nearing termination (e.g., is likely to be terminated within any suitable threshold amount of time) due to insufficient electric power. In various instances, the broadcast component 214 can electronically transmit the battery warning 2904 to the receiver component 1306 of the emergency service system 110, via the communication link 112.

In various other aspects, if the remaining battery life is below the threshold value, the battery component 2902 can implement, perform, or otherwise cause the set of electricity reroute actions 2906. In various instances, as mentioned above, the various sensors of the vehicle 102 (e.g., the set of vehicle cameras 302, the set of vehicle microphones 304, the set of vehicle thermometers 306, the set of vehicle hygrometers 308, the set of vehicle proximity sensors 310) can receive electric power from the battery of the vehicle 102. However, there can be any other suitable features of the vehicle 102 that are unrelated from such sensors (e.g., that are not necessary to provide the post-collision live stream 2602) but that consume electric power from the battery of the vehicle 102. As some non-limiting examples, such features can include an air conditioner of the vehicle 102, a seat heater of the vehicle 102, a seat cooler of the vehicle 102, a radio of the vehicle 102, or cabin lighting or exterior lighting of the vehicle 102.

In various aspects, the set of electricity reroute actions 2906 can include any suitable number of electricity reroute actions, and an electricity reroute action can include powering-down or otherwise shutting-off an electricity-consuming feature of the vehicle 102 that is unrelated from the various sensors of the sensor component 206 (e.g., that does not contribute to the post-collision live stream 2602). For example, if an air conditioner of the vehicle 102 is running during the post-collision live stream 2602, then an electricity reroute action can include partially or fully shutting-off the air conditioner (e.g., battery life consumption by the air conditioner can be reduced, so as to increase an amount of battery life that is available to sustain the post-collision live stream 2602). As another example, if a seat heater of the vehicle 102 is running during the post-collision live stream 2602, then an electricity reroute action can include partially or fully shutting-off the seat heater (e.g., battery life consumption by the seat heater can be reduced, so as to increase an amount of battery life that is available to sustain the post-collision live stream 2602). As yet another example, if undercarriage lighting of the vehicle 102 is running during the post-collision live stream 2602, then an electricity reroute action can include partially or fully shutting-off the undercarriage lighting (e.g., battery life consumption by the undercarriage lighting can be reduced, so as to increase an amount of battery life that is available to sustain the post-collision live stream 2602). In this way, the set of electricity reroute actions 2906 help to prolong the post-collision live stream 2602, when the battery component 2902 determines that the remaining battery life of the vehicle 102 is below any suitable threshold.

Figure 30:
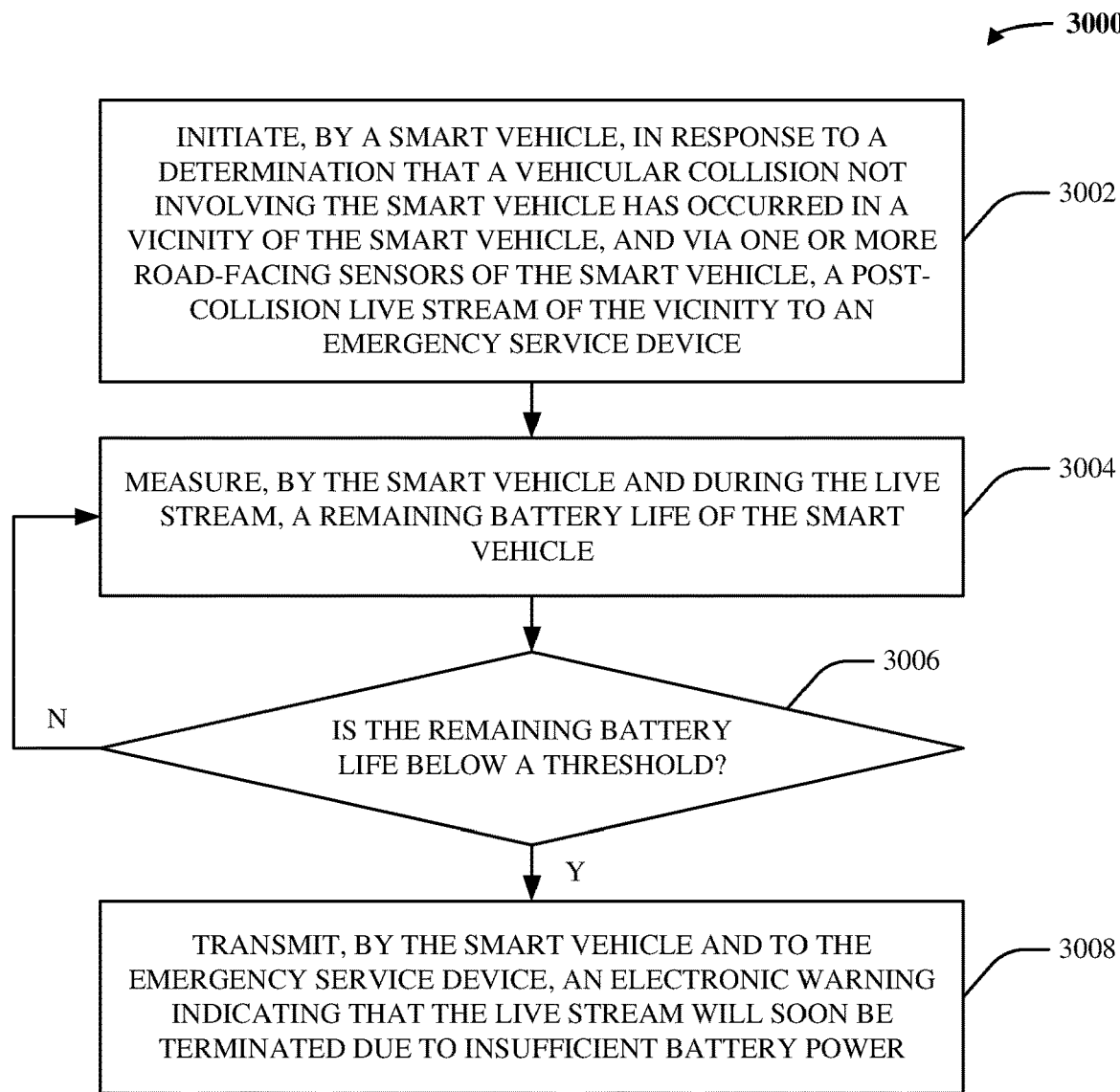
FIGS. 30-31 illustrate flow diagrams of example, non-limiting computer-implemented methods that facilitate provision of a post-collision live stream in accordance with one or more embodiments described herein.
Figure 31:
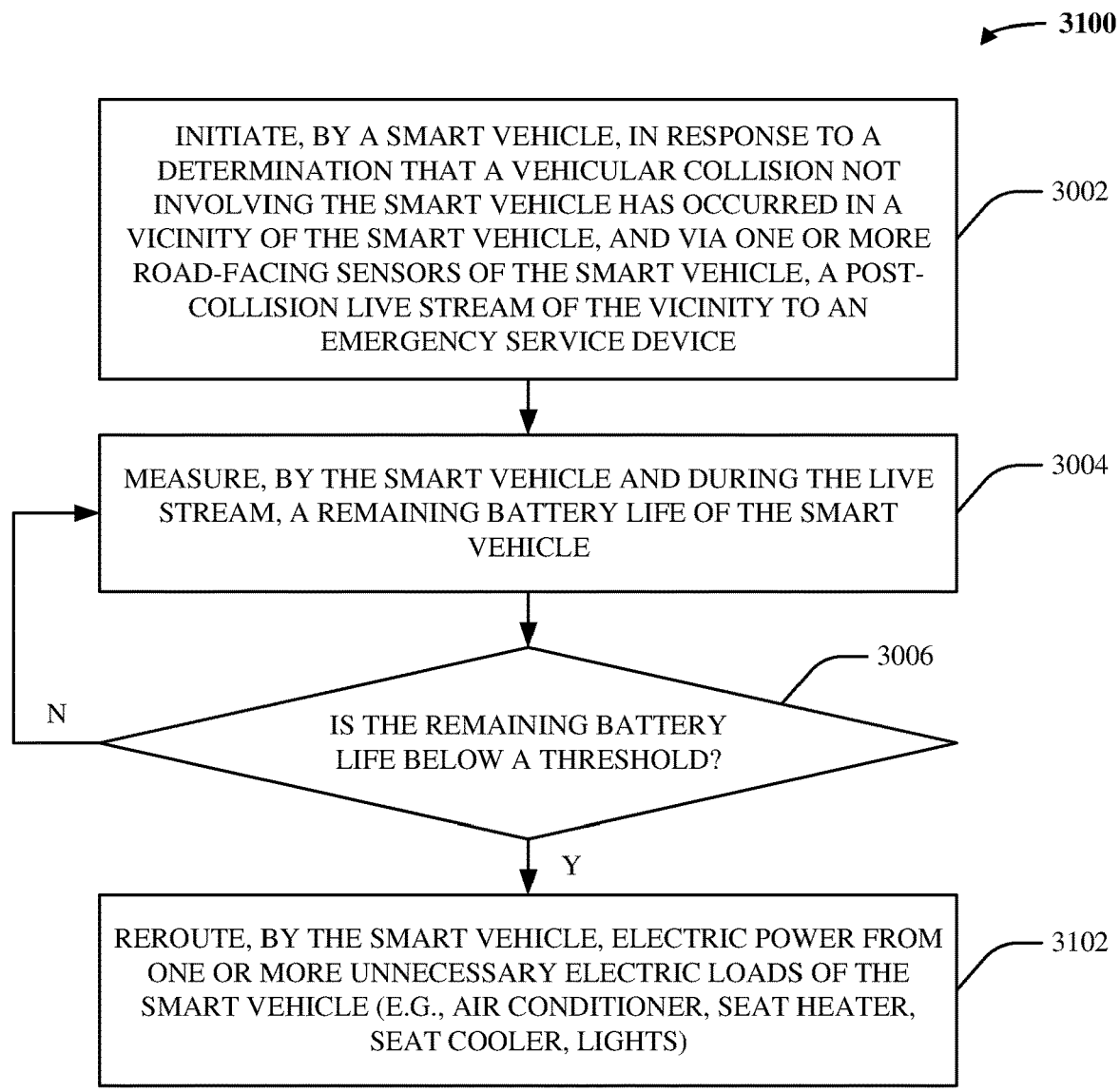

FIGS. 30-31 illustrate flow diagrams of example, non-limiting computer-implemented methods 3000 and 3100 that can facilitate provision of a post-collision live stream in accordance with one or more embodiments described herein. In various cases, the collision evidence system 104 can facilitate the computer-implemented methods 3000 or 3100.

First, consider FIG. 30. In various embodiments, act 3002 can include initiating, by a smart vehicle (e.g., via 214 of 102), in response to a determination that a vehicular collision (e.g., 108) not involving the smart vehicle has occurred or is occurring in a vicinity (e.g., 106) of the smart vehicle, and via one or more road-facing sensors (e.g., 302, 304, 306, 308, or 310) of the smart vehicle, a post-collision live stream (e.g., 2602) of the vicinity to an emergency service device (e.g., 110).

In various aspects, act 3004 can include measuring, by the smart vehicle (e.g., via 2902) and during the live stream, a remaining battery life of the smart vehicle.

In various instances, act 3006 can include determining, by the smart vehicle (e.g., via 2902), whether the remaining battery life is below (or otherwise fails to satisfy) a threshold. If not (e.g., if the remaining battery life is not below or otherwise does not fail to satisfy the threshold), the computer-implemented method 3000 can proceed back to act 3004. If so (e.g., if the remaining battery life is below or otherwise fails to satisfy the threshold), the computer-implemented method 3000 can proceed to act 3008.

In various cases, act 3008 can include transmitting, by the smart vehicle (e.g., via 214) and to the emergency service device, an electronic warning (e.g., 2904) indicating that the live stream will soon be terminated due to insufficient battery power.

Now, consider FIG. 31. In various embodiments, the computer-implemented method 3100 can include acts 3002, 3004, and 3006, as described above. However, in response to a determination at act 3006 that the remaining battery life of the smart vehicle (e.g., 102) is below or otherwise fails to satisfy the threshold, the computer-implemented method 3100 can proceed to act 3102.

In various aspects, act 3102 can include rerouting, by the smart vehicle (e.g., via 2902), electric power from one or more unnecessary electric loads of the smart vehicle. As some non-limiting examples, an unnecessary electric load can be any feature of the smart vehicle that consumes electricity but that does not contribute to the post-collision live stream, such as an air conditioner, a seat heater, or a light of the smart vehicle.

Figure 32:
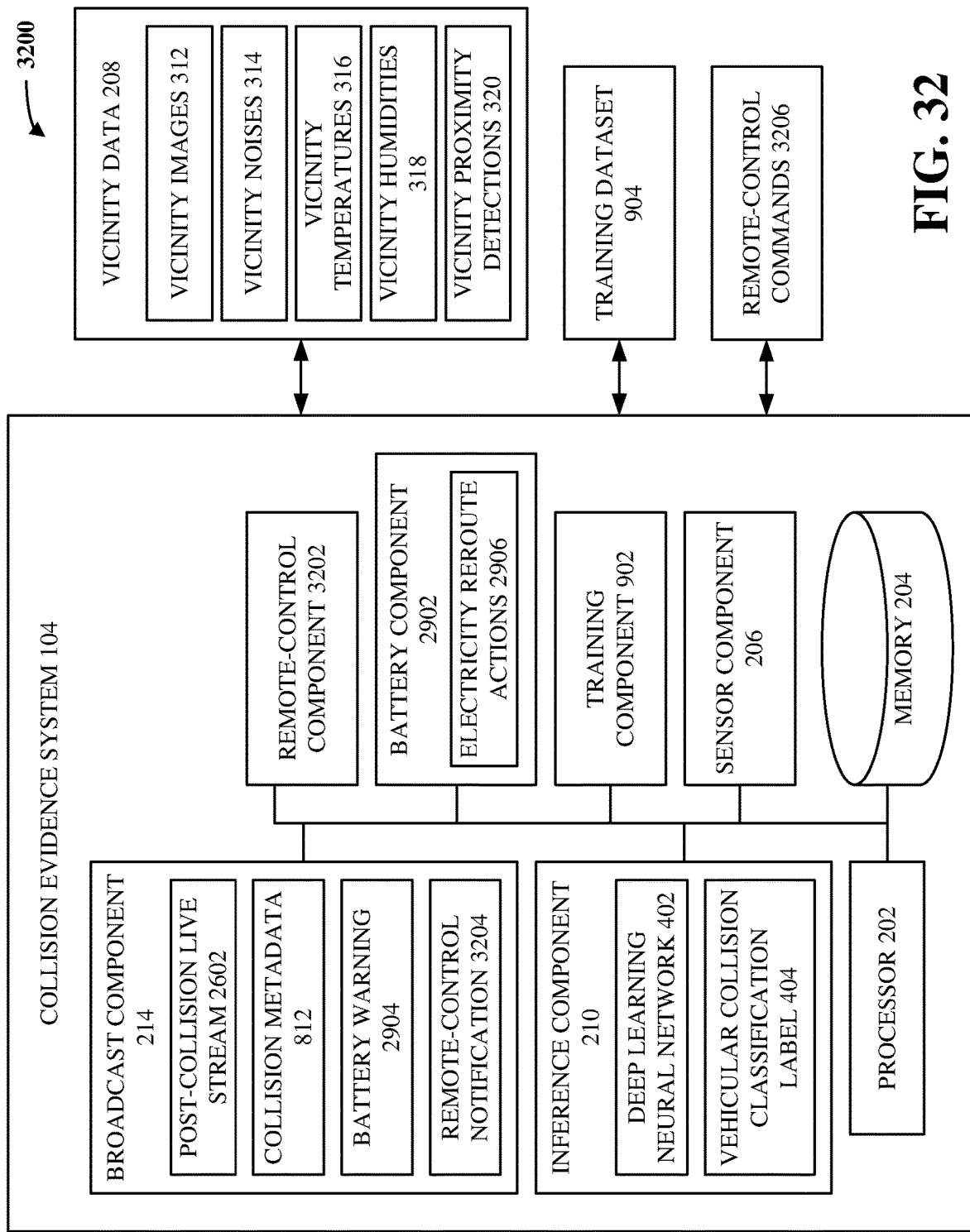
FIG. 32 illustrates a block diagram of an example, non-limiting system including a remote-control component that facilitates provision of a post-collision live stream in accordance with one or more embodiments described herein.

FIG. 32 illustrates a block diagram of an example, non-limiting system 3200 including a remote-control component that can facilitate provision of a post-collision live stream in accordance with one or more embodiments described herein. As shown, the system 3200 can, in some cases, comprise the same components as the system 2900, and can further comprise a remote-control component 3202, a remote-control notification 3204, or a set of remote-control commands 3206.

In various embodiments, as shown, the collision evidence system 104 can comprise a remote-control component 3202.

In various aspects, the vehicle 102 can be outfitted or otherwise equipped with any suitable autonomous or electronically-controllable features, such as autonomous or electronically-controllable cameras, autonomous or electronically-controllable speakers, autonomous or electronically-controllable lighting, autonomous or electronically-controllable steering, autonomous or electronically-controllable throttle, or autonomous or electronically-controllable braking. In various instances, such autonomous or electronically-controllable features can be governed or otherwise orchestrated by the remote-control component 3202. In various aspects, during or in parallel with the post-collision live stream 2602, the broadcast component 214 can transmit, to the receiver component 1306 via the communication link 112, the remote-control notification 3204, where the remote-control notification 3204 can be any suitable electronic message indicating or identifying the autonomous or electronically-controllable features of the vehicle 102. In various cases, the execution component 1310 can, in response to the remote-control notification 3204 and via the communication link 112, electronically transmit the set of remote-control commands 3206, where the set of remote-control commands 3206 can be any suitable electronic instructions to controllably adjust or manipulate the autonomous or electronically-controllable features of the vehicle 102. In various cases, the remote-control component 3202 can implement or otherwise obey the set of remote-control commands 3206. Various non-limiting aspects are described with respect to FIG. 33.

Figure 33:
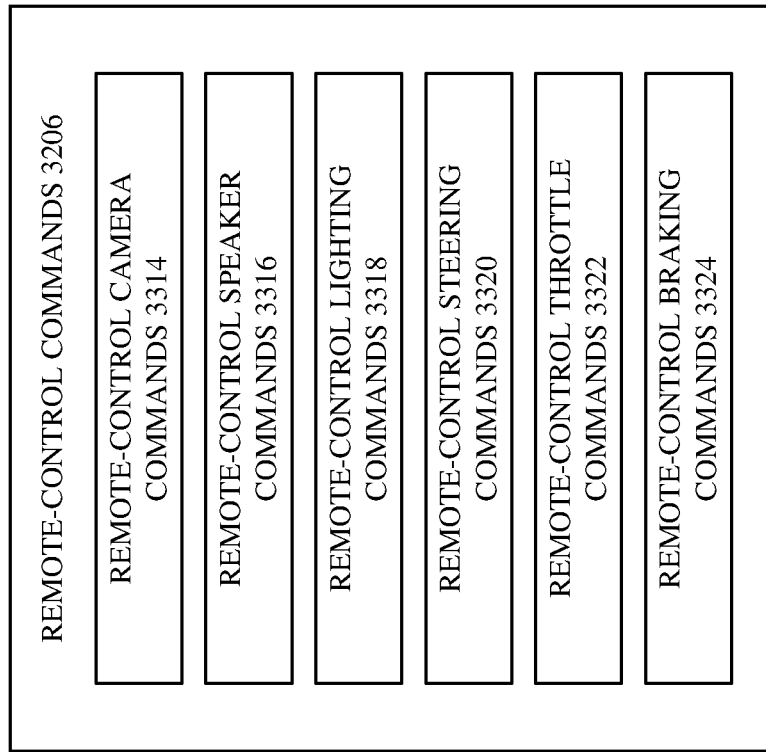
FIG. 33 illustrates an example, non-limiting block diagram of a remote-control notification and remote-control commands in accordance with one or more embodiments described herein.
Figure 33:
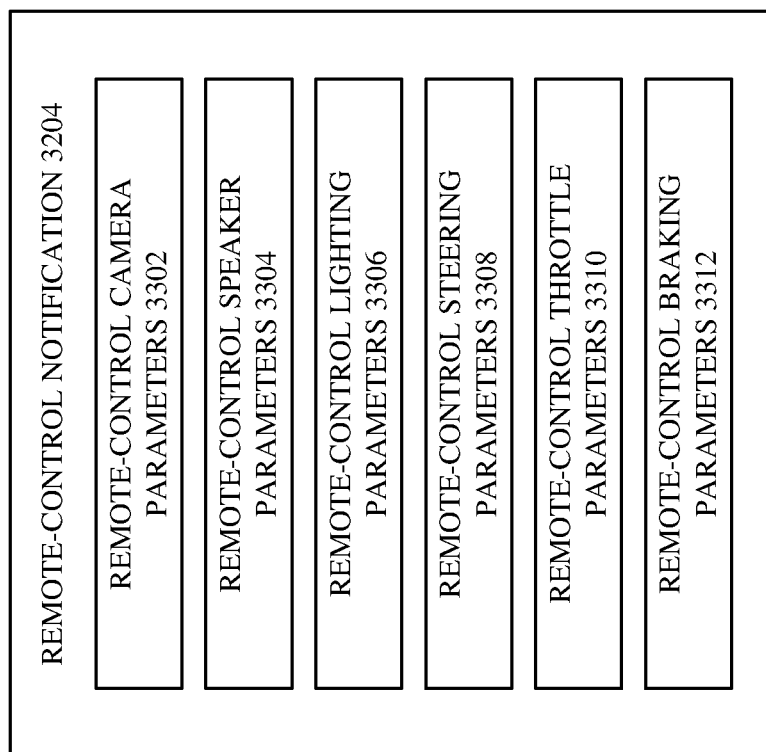

FIG. 33 illustrates an example, non-limiting block diagram 3300 of the remote-control notification 3204 and the set of remote-control commands 3206 in accordance with one or more embodiments described herein.

In various embodiments, as shown, the remote-control notification 3204 can comprise a set of remote-control camera parameters 3302. In various aspects, the set of remote-control camera parameters 3302 can include any suitable number of remote-control camera parameters. In various instances, a remote-control camera parameter can be any suitable electronic data (e.g., can be one or more scalars, one or more vectors, one or more matrices, one or more tensors, or one or more character strings) that can indicate an electronically-controllable or electronically-adjustable setting of a camera of the vehicle 102. As a non-limiting example, a remote-control camera parameter can identify a particular camera of the vehicle 102, the remote-control camera parameter can further identify a principal axis of the particular camera, and the remote-control parameter can even further identify a range of motion (e.g., an angular range) through which the particular camera can controllably swivel or rotate about the principal axis. As another non-limiting example, a remote-control camera parameter can identify a given camera of the vehicle 102, and the remote-control camera parameter can further identify a zoom range (e.g., a minimum zoom level to a maximum zoom level) that can be controllably swept by the given camera. As yet another non-limiting example, a remote-control camera parameter can identify a specific camera of the vehicle 102, and the remote-control camera parameter can further identify visual settings (e.g., daylight setting, night-vision setting, thermal-vision setting) that can be controllably implemented by the specific camera.

In various aspects, as shown, the remote-control notification 3204 can comprise a set of remote-control speaker parameters 3304. In various aspects, the set of remote-control speaker parameters 3304 can include any suitable number of remote-control speaker parameters. In various instances, a remote-control speaker parameter can be any suitable electronic data (e.g., can be one or more scalars, one or more vectors, one or more matrices, one or more tensors, or one or more character strings) that can indicate an electronically-controllable or electronically-adjustable setting of an audio speaker of the vehicle 102. As a non-limiting example, a remote-control speaker parameter can identify a particular speaker of the vehicle 102, the remote-control speaker parameter can further identify a principal axis of the particular speaker, and the remote-control parameter can even further identify a range of motion (e.g., an angular range) through which the particular speaker can controllably swivel or rotate about the principal axis. As another non-limiting example, a remote-control speaker parameter can identify a given speaker of the vehicle 102, and the remote-control speaker parameter can further identify a volume range (e.g., a minimum loudness level to a maximum loudness level) that can be controllably swept by the given speaker. As yet another non-limiting example, a remote-control speaker parameter can identify a specific speaker of the vehicle 102, and the remote-control speaker parameter can further identify that the specific speaker can be instructed to playback or otherwise audibly reproduce any suitable sound data (e.g., voice data) that is provided to the specific speaker.

In various embodiments, as shown, the remote-control notification 3204 can comprise a set of remote-control lighting parameters 3306. In various aspects, the set of remote-control lighting parameters 3306 can include any suitable number of remote-control lighting parameters. In various instances, a remote-control lighting parameter can be any suitable electronic data (e.g., can be one or more scalars, one or more vectors, one or more matrices, one or more tensors, or one or more character strings) that can indicate an electronically-controllable or electronically-adjustable setting of a light of the vehicle 102. As a non-limiting example, a remote-control lighting parameter can identify a particular headlight of the vehicle 102, the remote-control lighting parameter can further identify a principal axis of the particular headlight, and the remote-control lighting parameter can even further identify a range of motion (e.g., an angular range) through which the particular headlight can controllably swivel or rotate about the principal axis. As another non-limiting example, a remote-control lighting parameter can identify a given taillight of the vehicle 102, and the remote-control lighting parameter can further identify a set of colors that can be controllably implemented by the given taillight.

In various embodiments, as shown, the remote-control notification 3204 can comprise a set of remote-control steering parameters 3308. In various aspects, the set of remote-control steering parameters 3308 can include any suitable number of remote-control steering parameters. In various instances, a remote-control steering parameter can be any suitable electronic data (e.g., can be one or more scalars, one or more vectors, one or more matrices, one or more tensors, or one or more character strings) that can indicate an electronically-controllable or electronically-adjustable steering-related setting of the vehicle 102. As a non-limiting example, a remote-control steering parameter can identify a particular wheel of the vehicle 102, the remote-control steering parameter can further identify a principal axis of the particular wheel, and the remote-control parameter can even further identify a range of motion (e.g., an angular range) through which the particular wheel can controllably swivel or rotate about the principal axis for purposes of steering.

In various embodiments, as shown, the remote-control notification 3204 can comprise a set of remote-control throttle parameters 3310. In various aspects, the set of remote-control throttle parameters 3310 can include any suitable number of remote-control throttle parameters. In various instances, a remote-control throttle parameter can be any suitable electronic data (e.g., can be one or more scalars, one or more vectors, one or more matrices, one or more tensors, or one or more character strings) that can indicate an electronically-controllable or electronically-adjustable throttle-related setting of the vehicle 102. As a non-limiting example, a remote-control throttle parameter can identify a particular wheel of the vehicle 102, and the remote-control throttle parameter can further identify a speed range (e.g., from a maximum speed in one direction to a maximum speed in an opposite direction) at which the particular wheel can be controllably driven or rotated.

In various embodiments, as shown, the remote-control notification 3204 can comprise a set of remote-control braking parameters 3312. In various aspects, the set of remote-control braking parameters 3312 can include any suitable number of remote-control braking parameters. In various instances, a remote-control braking parameter can be any suitable electronic data (e.g., can be one or more scalars, one or more vectors, one or more matrices, one or more tensors, or one or more character strings) that can indicate an electronically-controllable or electronically-adjustable braking-related setting of the vehicle 102. As a non-limiting example, a remote-control braking parameter can identify a particular wheel of the vehicle 102, and the remote-control braking parameter can further identify a braking intensity range (e.g., from a minimum amount of brake application or compression force to a maximum amount of brake application or compression) which can be controllably imparted to the particular wheel.

In any case, the remote-control notification 3204 can thus be considered as informing the emergency service system 110 of what electronically-controllable, and thus remotely-controllable, features the vehicle 102 has at its disposal.

In various embodiments, as mentioned above, the execution component 1310 of the emergency service system 110 can, in response to receiving the remote-control notification 3204 or otherwise at any point during the post-collision live stream 2602, electronically transmit the set of remote-control commands 3206 to the collision evidence system 104.

In various aspects, as shown, the set of remote-control commands 3206 can comprise a set of remote-control camera commands 3314. In various instances, the set of remote-control camera commands 3314 can include any suitable number of remote-control camera commands. In various cases, a remote-control camera command can be any suitable electronic data (e.g., can be one or more scalars, one or more vectors, one or more matrices, one or more tensors, or one or more character strings) that can serve as an instruction to controllably adjust a respective one of the set of remote-control camera parameters 3302. As a non-limiting example, a remote-control camera command can be an electronic instruction to swivel or rotate a particular camera of the vehicle 102 to a particular angular orientation. As another non-limiting example, a remote-control camera command can be an electronic instruction to increase (or decrease) a zoom level of a specific camera of the vehicle 102 by a specified percentage or amount. As yet another non-limiting example, a remote-control camera command can be an electronic instruction for a given camera of the vehicle 102 to switch from a daylight setting to a night-vision setting.

In various aspects, as shown, the set of remote-control commands 3206 can comprise a set of remote-control speaker commands 3316. In various instances, the set of remote-control speaker commands 3316 can include any suitable number of remote-control speaker commands. In various cases, a remote-control speaker command can be any suitable electronic data (e.g., can be one or more scalars, one or more vectors, one or more matrices, one or more tensors, or one or more character strings) that can serve as an instruction to controllably adjust a respective one of the set of remote-control speaker parameters 3304. As a non-limiting example, a remote-control speaker command can be an electronic instruction to swivel or rotate a particular speaker of the vehicle 102 to a particular angular orientation. As another non-limiting example, a remote-control speaker command can be an electronic instruction to increase (or decrease) a volume level of a specific speaker of the vehicle 102 by a specified percentage or amount. As yet another non-limiting example, a remote-control speaker command can be an electronic instruction for a given speaker of the vehicle 102 to play or otherwise audibly reproduce specified sound data (e.g., to play or audibly reproduce vocal instructions provided by a user or operator of the emergency service system 110).

In various aspects, as shown, the set of remote-control commands 3206 can comprise a set of remote-control lighting commands 3318. In various instances, the set of remote-control lighting commands 3318 can include any suitable number of remote-control lighting commands. In various cases, a remote-control lighting command can be any suitable electronic data (e.g., can be one or more scalars, one or more vectors, one or more matrices, one or more tensors, or one or more character strings) that can serve as an instruction to controllably adjust a respective one of the set of remote-control lighting parameters 3306. As a non-limiting example, a remote-control lighting command can be an electronic instruction to swivel or rotate a particular light of the vehicle 102 to a particular angular orientation. As another non-limiting example, a remote-control lighting command can be an electronic instruction to increase (or decrease) a brightness level of a specific light of the vehicle 102 by a specified percentage or amount. As yet another non-limiting example, a remote-control lighting command can be an electronic instruction for a given light of the vehicle 102 to switch from one color to another.

In various aspects, as shown, the set of remote-control commands 3206 can comprise a set of remote-control steering commands 3320. In various instances, the set of remote-control steering commands 3320 can include any suitable number of remote-control steering commands. In various cases, a remote-control steering command can be any suitable electronic data (e.g., can be one or more scalars, one or more vectors, one or more matrices, one or more tensors, or one or more character strings) that can serve as an instruction to controllably adjust a respective one of the set of remote-control steering parameters 3308. As a non-limiting example, a remote-control steering command can be an electronic instruction to swivel or rotate a particular wheel of the vehicle 102 to a particular steering position or angular orientation.

In various aspects, as shown, the set of remote-control commands 3206 can comprise a set of remote-control throttle commands 3322. In various instances, the set of remote-control throttle commands 3322 can include any suitable number of remote-control throttle commands. In various cases, a remote-control throttle command can be any suitable electronic data (e.g., can be one or more scalars, one or more vectors, one or more matrices, one or more tensors, or one or more character strings) that can serve as an instruction to controllably adjust a respective one of the set of remote-control throttle parameters 3310. As a non-limiting example, a remote-control throttle command can be an electronic instruction to drive or otherwise rotate a particular wheel of the vehicle 102 at a particular speed.

In various aspects, as shown, the set of remote-control commands 3206 can comprise a set of remote-control braking commands 3324. In various instances, the set of remote-control braking commands 3324 can include any suitable number of remote-control braking commands. In various cases, a remote-control braking command can be any suitable electronic data (e.g., can be one or more scalars, one or more vectors, one or more matrices, one or more tensors, or one or more character strings) that can serve as an instruction to controllably adjust a respective one of the set of remote-control braking parameters 3312. As a non-limiting example, a remote-control braking command can be an electronic instruction to apply a specified amount of braking force to a specified wheel of the vehicle 102.

In some cases, the execution component 1310 can generate the set of remote-control commands 3206 based on user-provided input from a user or operator of the emergency service system 110.

In some cases, the remote-control notification 3204 can be considered as a request or a prompt for the remote-control commands 3206.

In any case, upon receipt of the set of remote-control commands 3206, the remote-control component 3202 can implement, perform, or otherwise obey the set of remote-control commands 3206. In other words, the remote-control component 3202 can controllably adjust any of the autonomous or electronically-controllable features of the vehicle 102 in accordance with or otherwise as specified by the set of remote-control commands 3206. In this way, the emergency service system 110 (e.g., the user or operator of the emergency service system 110) can be considered as vicariously interacting, through the vehicle 102, with the scene of the vehicular collision (e.g., 108), notwithstanding that emergency services might not yet actually be present at the scene of the vehicular collision. Thus, the remote-control component 3202 can, in some cases, be considered as effectively reducing an emergency service response time.

As a non-limiting example, suppose that the vehicular collision (e.g., 108) involves an injured pedestrian. Furthermore, suppose that emergency services have not yet physically arrived at the scene of the vehicular collision. In such case, a user or operator of the emergency service system 110 can nevertheless see the injured pedestrian in real-time via the post-collision live stream 2602. Moreover, in such case, the user or operator of the emergency service system 110 can, by virtue of the remote-control commands 3206, provide verbal medical advice for the injured pedestrian (or for by-standers near the injured pedestrian) through an audio speaker of the vehicle 102. In other words, the user or operator of the emergency service system 110 can effectively provide some medical care at the scene of the vehicular collision, notwithstanding that emergency services have actually not yet arrived at the scene.

As another non-limiting example, suppose that the vehicular collision (e.g., 108) involves multiple vehicles. Furthermore, suppose that emergency services have not yet physically arrived at the scene of the vehicular collision. In such case, a user or operator of the emergency service system 110 might be able to see fewer than all of the involved vehicles via the post-collision live stream 2602. To address this, the user or operator of the emergency service system 110 can, by virtue of the remote-control commands 3206, remotely and controllably cause the vehicle 102 to move to a different location near the vehicular collision, so that the post-collision live stream 2602 now depicts the vehicular collision from a different vantage point. In this way, the user or operator of the emergency service system 110 can be able to survey or surveil in real-time the scene of the vehicular collision (e.g., to see in real-time other, previously hidden vehicles involved in the vehicular collision), notwithstanding that emergency services have actually not yet arrived at the scene.

As still another non-limiting example, suppose that the vehicular collision (e.g., 108) occurs at night. Furthermore, suppose that emergency services have not yet physically arrived at the scene of the vehicular collision. Because the vehicular collision has occurred at night, it is possible that the vehicular collision is not easily visually noticeable to oncoming traffic. In such case, a user or operator of the emergency service system 110 can, by virtue of the remote-control commands 3206, remotely cause the vehicle 102 to shine lights on the vehicular collision, so as to draw attention from oncoming traffic (e.g., so as to reduce a likelihood that the vehicular collision will cause follow-on accidents in oncoming traffic). In other words, the user or operator of the emergency service system 110 can effectively engage or otherwise interact with the scene of the vehicular collision, notwithstanding that emergency services have actually not yet arrived at the scene.

Note that, in various aspects, the remote-control notification 3204 can include any other suitable remote-control parameters of the vehicle 102, such as a remote-control direction of travel parameter (e.g., the vehicle 102 can be able to move forward, backward, or sideways in some embodiments) or a remote-control suspension parameter (e.g., a suspension system of the vehicle 102 can be able to increase or decrease a ride height of the vehicle 102). Accordingly, the set of remote-control commands 3206 can include any suitable remote-control commands corresponding to such other remote-control parameters (e.g., can include a set of direction of travel commands, or can include a set of suspension/ride-height commands).

Figure 34:
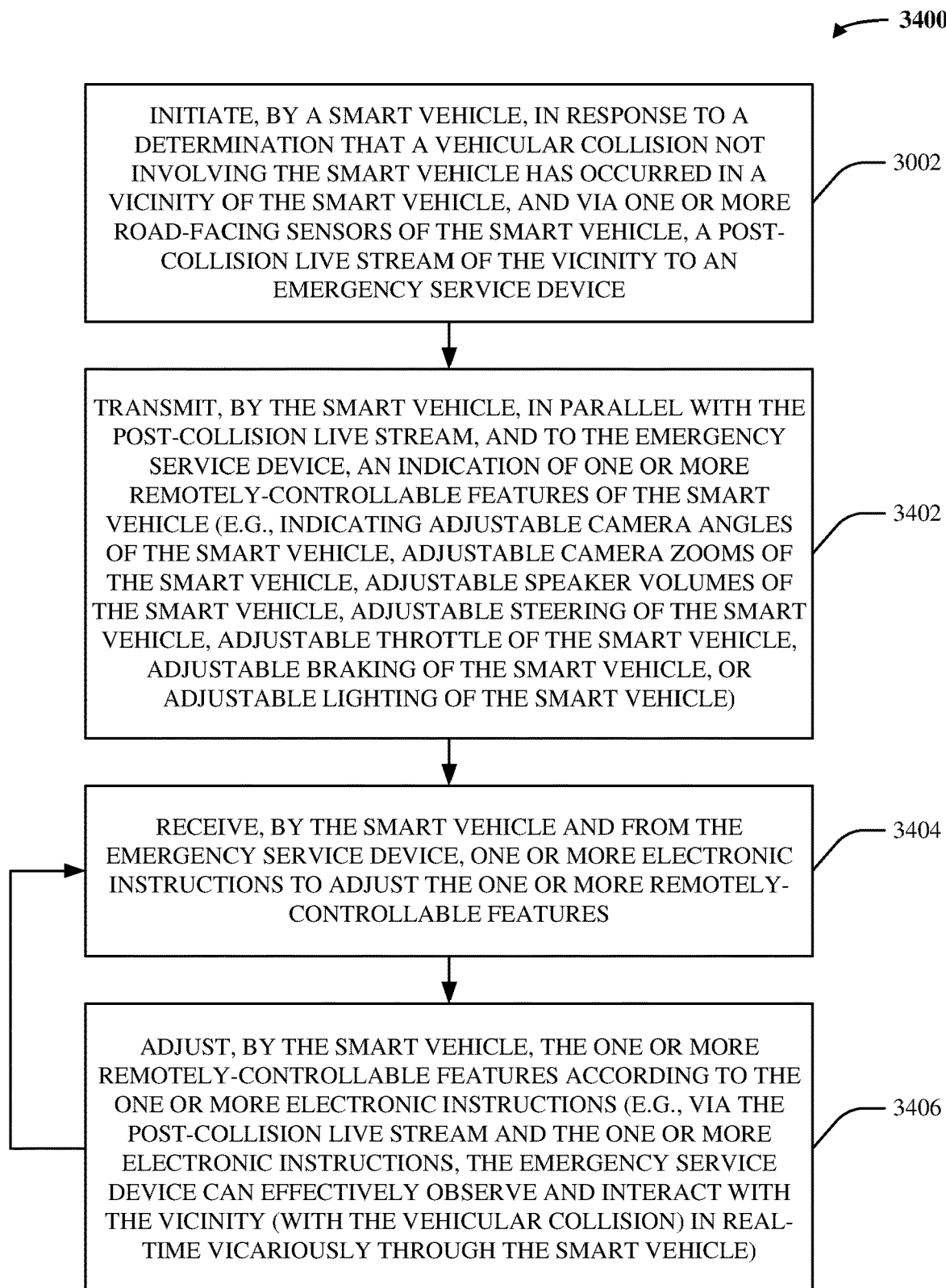
FIG. 34 illustrates a flow diagram of an example, non-limiting computer-implemented method that facilitates provision of a post-collision live stream in accordance with one or more embodiments described herein.

FIG. 34 illustrates a flow diagram of an example, non-limiting computer-implemented method 3400 that can facilitate provision of a post-collision live stream in accordance with one or more embodiments described herein. In various cases, the collision evidence system 104 can facilitate the computer-implemented method 3400.

In various embodiments, the computer-implemented method 3400 can include act 3002, as described above. After act 3002, the computer-implemented method 3400 can proceed to act 3402.

In various aspects, act 3402 can include transmitting, by the smart vehicle (e.g., via 214 of 102), in parallel with the post-collision live stream (e.g., 2602), and to the emergency service device (e.g., 110), an indication (e.g., 3204) of one or more remotely-controllable features of the smart vehicle. In various cases, such features can include adjustable camera angles of the smart vehicle, adjustable camera zooms of the smart vehicle, adjustable speaker volumes of the smart vehicle, adjustable steering of the smart vehicle, adjustable throttle of the smart vehicle, adjustable braking of the smart vehicle, or adjustable lighting of the smart vehicle.

In various instances, act 3404 can include receiving, by the smart vehicle (e.g., via 3202) and from the emergency service device, one or more electronic instructions (e.g., 3206) to adjust the one or more remotely-controllable features.

In various cases, act 3406 can include adjusting, by the smart vehicle (e.g., via 3202), the one or more remotely-controllable features according to the one or more electronic instructions. In various aspects, the post-collision live stream and the one or more electronic instructions can allow the emergency service device to effectively observe or interact with the vicinity (e.g., with the vehicular collision) in real-time, vicariously through the smart vehicle.

FIGS. 35-39 illustrate flow diagrams of example, non-limiting computer-implemented methods 3500, 3600, 3700, 3800, and 3900 that can facilitate artificially intelligent provision of post-vehicular-collision evidence in accordance with one or more embodiments described herein. In various cases, the collision evidence system 104 or the emergency service system 110 can facilitate the computer-implemented methods 3500, 3600, 3700, 3800, or 3900.

Figure 35:
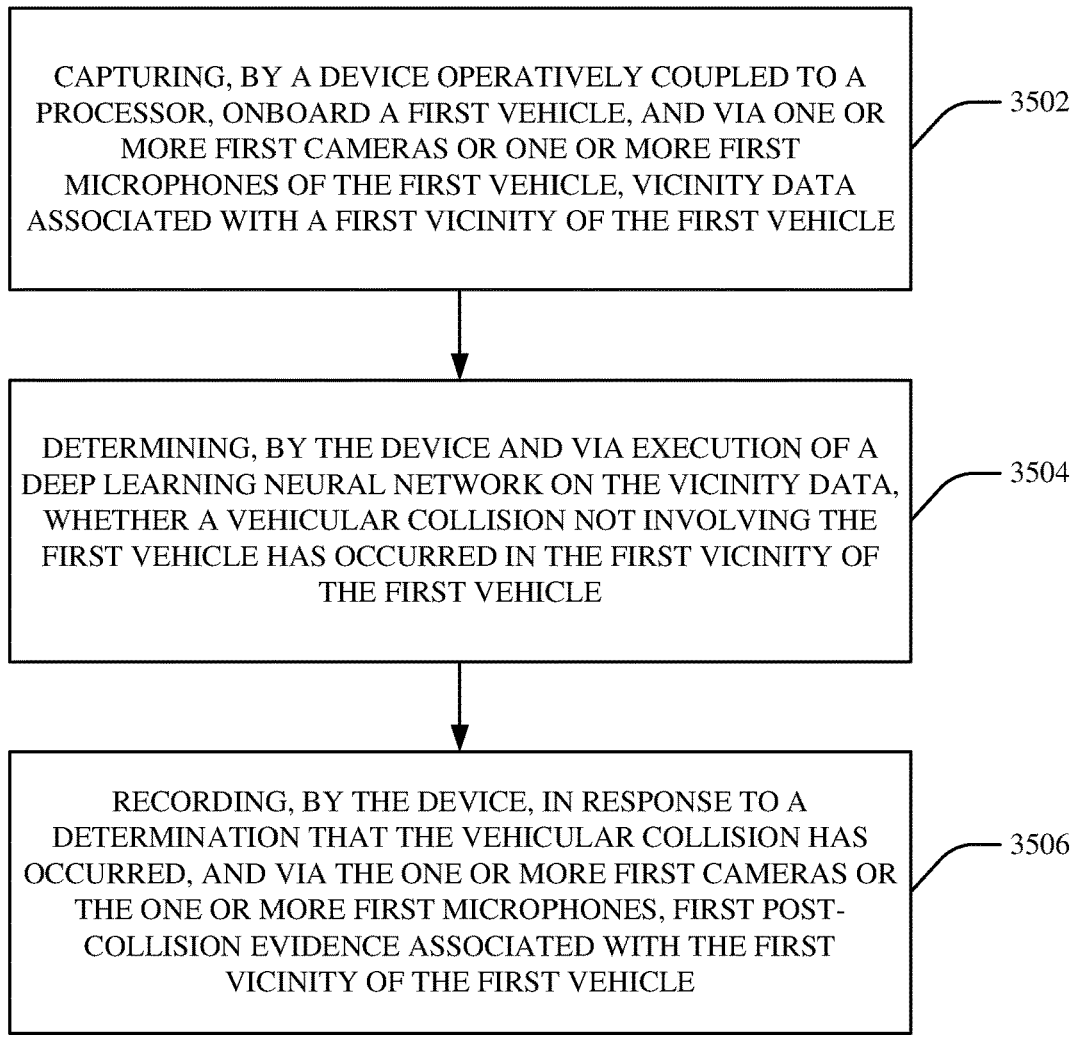
FIGS. 35-39 illustrate flow diagrams of example, non-limiting computer-implemented methods that facilitate artificially intelligent provision of post-vehicular-collision evidence in accordance with one or more embodiments described herein.

First, consider FIG. 35. In various embodiments, act 3502 can include capturing, by a device (e.g., via 206) operatively coupled to a processor (e.g., 202), onboard a first vehicle (e.g., 102), and via one or more first cameras (e.g., 302) or one or more first microphones (e.g., 304) of the first vehicle, vicinity data (e.g., 208) associated with a first vicinity (e.g., 106) of the first vehicle.

In various aspects, act 3504 can include determining, by the device (e.g., via 210) and via execution of a deep learning neural network (e.g., 402) on the vicinity data, whether a vehicular collision (e.g., 108) not involving the first vehicle has occurred in the first vicinity of the first vehicle.

In various instances, act 3506 can include recording, by the device (e.g., via 212), in response to a determination that the vehicular collision has occurred, and via the one or more first cameras or the one or more first microphones, first post-collision evidence (e.g., 702) associated with the first vicinity of the first vehicle.

Although not explicitly shown in FIG. 35, the recording the first post-collision evidence can comprise preserving, by the device (e.g., via 212), the vicinity data.

Although not explicitly shown in FIG. 35, the computer-implemented method 3500 can further comprise: refraining, by the device (e.g., via 212) and in response to a determination that the vehicular collision has not occurred, from recording the first post-collision evidence. In various cases, the refraining from recording the first post-collision evidence can comprise discarding, by the device (e.g., via 212), the vicinity data.

Although not explicitly shown in FIG. 35, the computer-implemented method 3500 can further comprise: broadcasting, by the device (e.g., via 214) and to an emergency service computing device (e.g., 110), a deanonymized electronic alert (e.g., 704) based on the vehicular collision. In various cases, the deanonymized electronic alert can comprise the first post-collision evidence.

Although not explicitly shown in FIG. 35, the computer-implemented method 3500 can further comprise: broadcasting, by the device (e.g., via 214) and to a second vehicle (e.g., 2402) in the first vicinity of the first vehicle, an anonymized electronic alert (e.g., anonymized version of 704) based on the vehicular collision. In various cases, the anonymized electronic alert can request that the second vehicle record, via one or more second cameras or one or more second microphones of the second vehicle, second post-collision evidence associated with a second vicinity of the second vehicle (e.g., as described with respect to FIG. 24).

Figure 36:
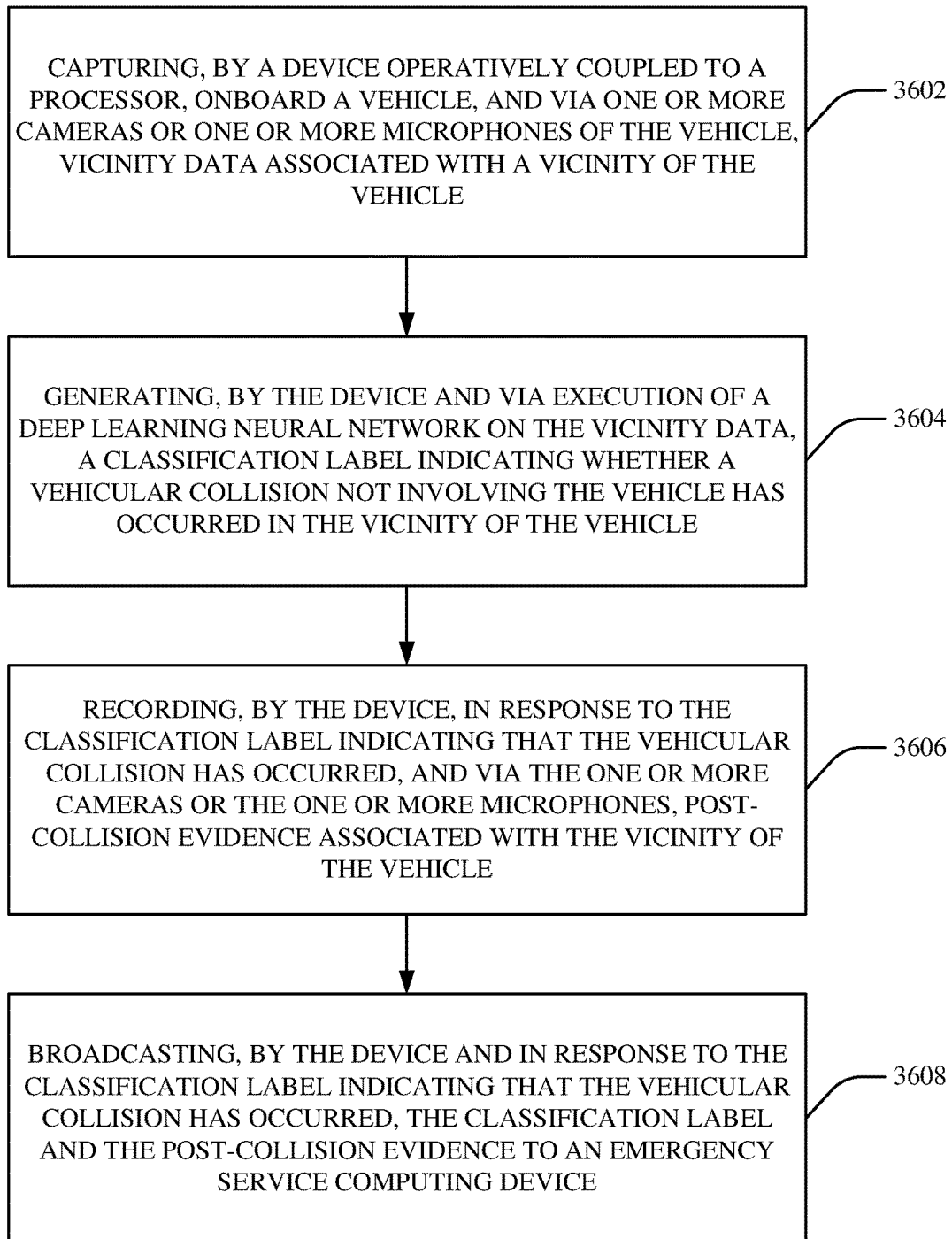

Now, consider FIG. 36. In various embodiments, act 3602 can include capturing, by a device (e.g., 206) operatively coupled to a processor (e.g., 202), onboard a vehicle (e.g., 102), and via one or more cameras (e.g., 302) or one or more microphones (e.g., 304) of the vehicle, vicinity data (e.g., 208) associated with a vicinity (e.g., 106) of the vehicle.

In various aspects, act 3604 can include generating, by the device (e.g., via 210) and via execution of a deep learning neural network (e.g., 402) on the vicinity data, a classification label (e.g., 404) indicating whether a vehicular collision (e.g., 108) not involving the vehicle has occurred in the vicinity of the vehicle.

In various instances, act 3606 can include recording, by the device (e.g., via 212), in response to the classification label indicating that the vehicular collision has occurred, and via the one or more cameras or the one or more microphones, post-collision evidence (e.g., 702) associated with the vicinity of the vehicle.

In various cases, act 3608 can include broadcasting, by the device (e.g., via 214) and in response to the classification label indicating that the vehicular collision has occurred, the classification label and the post-collision evidence to an emergency service computing device (e.g., 110).

Although not explicitly shown in FIG. 36, the deep learning neural network can receive the vicinity data as input and can produce the classification label as output, and the classification label can binomially indicate (e.g., via 602) a presence or an absence of the vehicular collision. In various aspects, the deep learning neural network can receive the vicinity data as input and can produce the classification label as output, and the classification label can indicate (e.g., via 604) how many vehicles are involved in the vehicular collision. In various instances, the deep learning neural network can receive the vicinity data as input and can produce the classification label as output, and the classification label can indicate (e.g., via 608) an impact type of the vehicular collision, wherein the impact type of the vehicular collision can be one from the group consisting of a rear-end collision, a head-on collision, a side-impact collision, and a side-swipe collision. In various cases, the deep learning neural network can receive the vicinity data as input and can produce the classification label as output, and the classification label can indicate (e.g., via 610) whether the vehicular collision involves a roll-over. In various aspects, the deep learning neural network can receive the vicinity data as input and can produce the classification label as output, and the classification label can indicate (e.g., via 612) whether the vehicular collision involves flames. In various instances, the deep learning neural network can receive the vicinity data as input and can produce the classification label as output, and the classification label can indicate (e.g., via 614) a severity of the vehicular collision.

Figure 37:
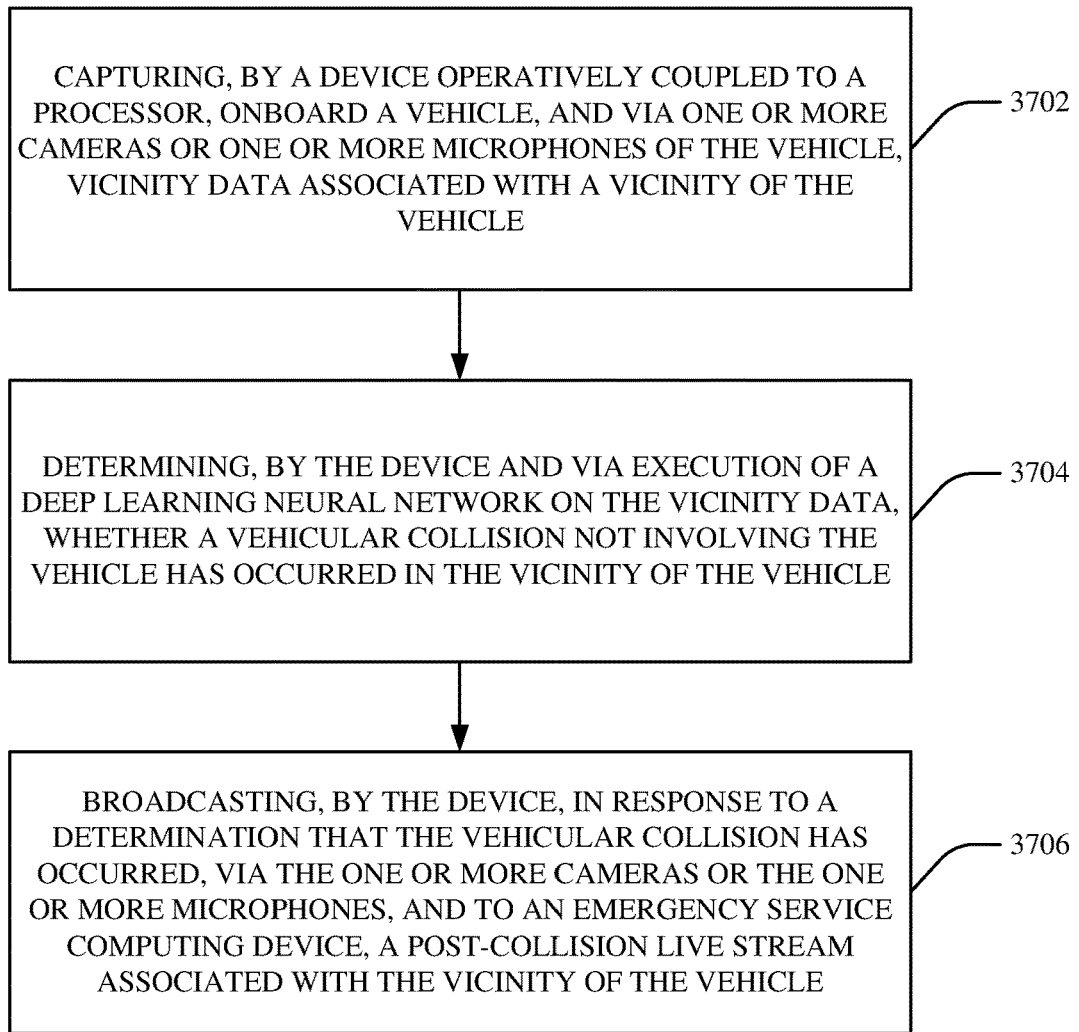

Now, consider FIG. 37. In various embodiments, act 3702 can include capturing, by a device (e.g., via 206) operatively coupled to a processor (e.g., 202), onboard a vehicle (e.g., 102), and via one or more cameras (e.g., 302) or one or more microphones (e.g., 304) of the vehicle, vicinity data (e.g., 208) associated with a vicinity (e.g., 106) of the vehicle.

In various aspects, act 3704 can include determining, by the device (e.g., via 210) and via execution of a deep learning neural network (e.g., 402) on the vicinity data, whether a vehicular collision (e.g., 108) not involving the vehicle has occurred in the vicinity of the vehicle.

In various instances, act 3706 can include broadcasting, by the device (e.g., via 214), in response to a determination that the vehicular collision has occurred, via the one or more cameras or the one or more microphones, and to an emergency service computing device (e.g., 110), a post-collision live stream (e.g., 2602) associated with the vicinity of the vehicle.

Although not explicitly shown in FIG. 37, the computer-implemented method 3700 can comprise: refraining, by the device (e.g., via 214) and in response to a determination that the vehicular collision has not occurred, from broadcasting the post-collision live stream.

Although not explicitly shown in FIG. 37, the computer-implemented method 3700 can comprise: monitoring, by the device (e.g., via 2902), a remaining battery life of the vehicle during the post-collision live stream. In various aspects, the computer-implemented method 3700 can comprise: transmitting, by the device (e.g., via 214), in response to a determination that the remaining battery life of the vehicle is below a threshold, an electronic warning (e.g., 2904) to the emergency service computing device, wherein the electronic warning indicates that the post-collision live stream is nearing termination. In various instances, the computer-implemented method 3700 can comprise: shutting off, by the device (e.g., via 2902) and in response to a determination that the remaining battery life of the vehicle is below a threshold, an electric load of the vehicle (e.g., 2906), wherein the electric load is unrelated to the post-collision live stream. In various cases, the electric load can be one from the group consisting of a seat heater of the vehicle, a seat cooler of the vehicle, an air conditioner of the vehicle, a radio of the vehicle, and a light of the vehicle.

Although not explicitly shown in FIG. 37, the computer-implemented method 3700 can comprise: transmitting, by the device (e.g., via 214), during the post-collision live stream, and to the emergency service computing device, an electronic request (e.g., 3204) for remote-control input (e.g., 3206) associated with the vehicle. In various cases, the remote-control input can be one from the group consisting of a camera angle input, a camera zoom input, a speaker volume input, a speaker content input, a lighting input, a steering input, a throttle input, and a braking input.

Figure 38:
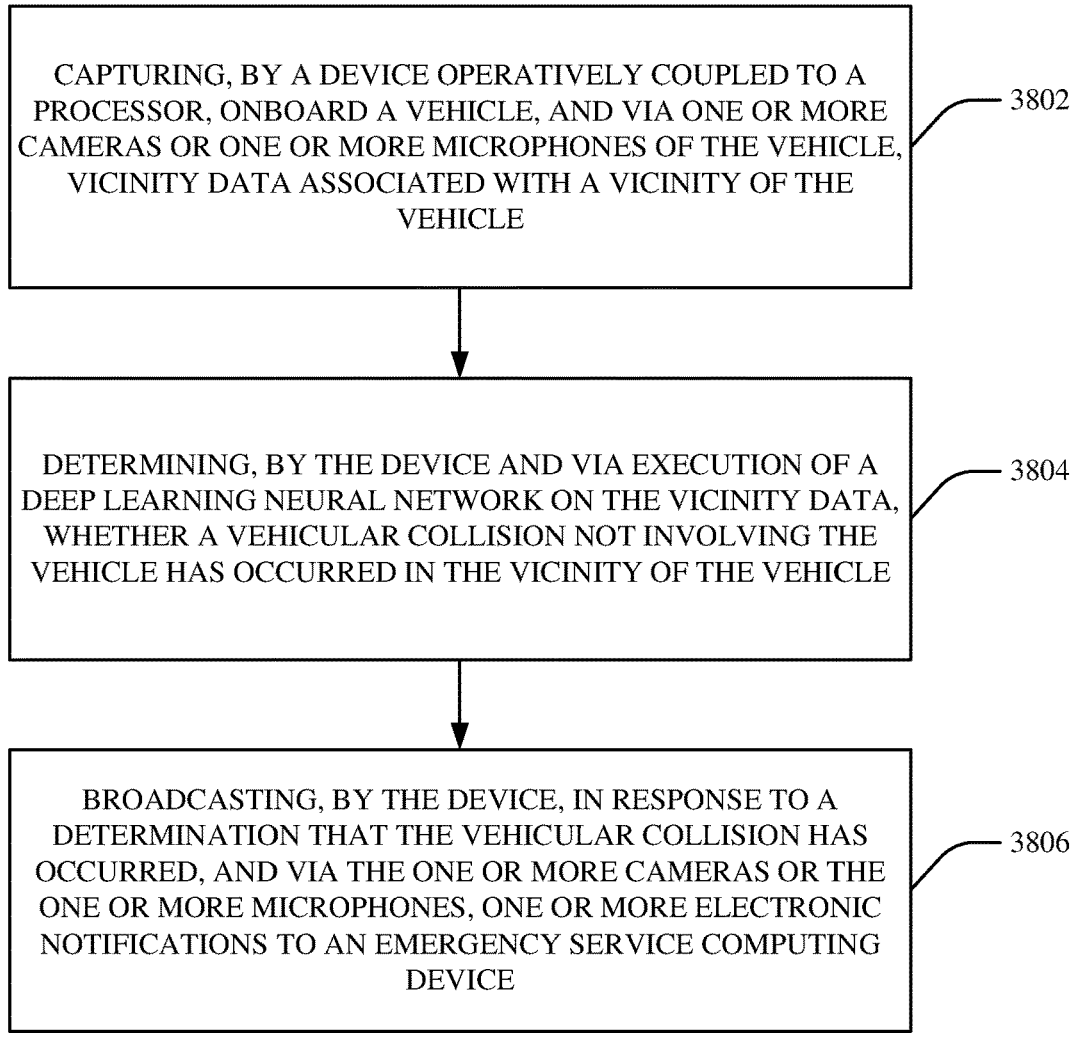

Now, consider FIG. 38. In various embodiments, act 3802 can include capturing, by a device (e.g., via 206) operatively coupled to a processor (e.g., 202), onboard a vehicle (e.g., 102), and via one or more cameras (e.g., 302) or one or more microphones (e.g., 304) of the vehicle, vicinity data (e.g., 208) associated with a vicinity (e.g., 106) of the vehicle.

In various aspects, act 3804 can include determining, by the device (e.g., via 210) and via execution of a deep learning neural network (e.g., 402) on the vicinity data, whether a vehicular collision (e.g., 108) not involving the vehicle has occurred in the vicinity of the vehicle.

In various instances, act 3806 can include broadcasting, by the device (e.g., via 214), in response to a determination that the vehicular collision has occurred, and via the one or more cameras or the one or more microphones, one or more electronic notifications (e.g., 704, 2602, 812, 2904, 3204) to an emergency service computing device (e.g., 110).

Although not explicitly shown in FIG. 38, the deep learning neural network can receive as input the vicinity data and can produce as output a classification label (e.g., 404) indicating the vehicular collision, and the one or more electronic notifications can comprise the vicinity data and the classification label (e.g., 704 can comprise 208 and 404).

Although not explicitly shown in FIG. 38, the one or more electronic notifications can comprise a geolocation stamp (e.g., 814) recorded by a global positioning sensor or a wi-fi positioning sensor (e.g., 706) of the vehicle, and the geolocation stamp can indicate where the vehicular collision occurred.

Although not explicitly shown in FIG. 38, the one or more electronic notifications can comprise a timestamp (e.g., 816) recorded by a clock (e.g., 708) of the vehicle, and the timestamp can indicate when the vehicular collision occurred.

Although not explicitly shown in FIG. 38, the one or more electronic notifications can comprise an identifier (e.g., 818) associated with the vehicle, wherein the identifier comprises at least one from the group consisting of a vehicle identification number (VIN) of the vehicle, a license plate of the vehicle, a first name of an owner of the vehicle, a first address of the owner of the vehicle, a second name of a current driver of the vehicle, and a second address of the current driver of the vehicle.

Although not explicitly shown in FIG. 38, the one or more electronic notifications can comprise post-collision recorded evidence (e.g., 702) or a post-collision live stream (e.g., 2602) captured by the one or more cameras or the one or more microphones of the vehicle.

Although not explicitly shown in FIG. 38, the one or more electronic notifications can indicate what remote-control parameters (e.g., 3204) of the vehicle are available to the emergency service computing device. In various cases, the remote-control parameters include a camera angle parameter, a camera zoom parameter, a speaker content parameter, a speaker volume parameter, a lighting parameter, a steering parameter, a throttle parameter, or a braking parameter.

Figure 39:
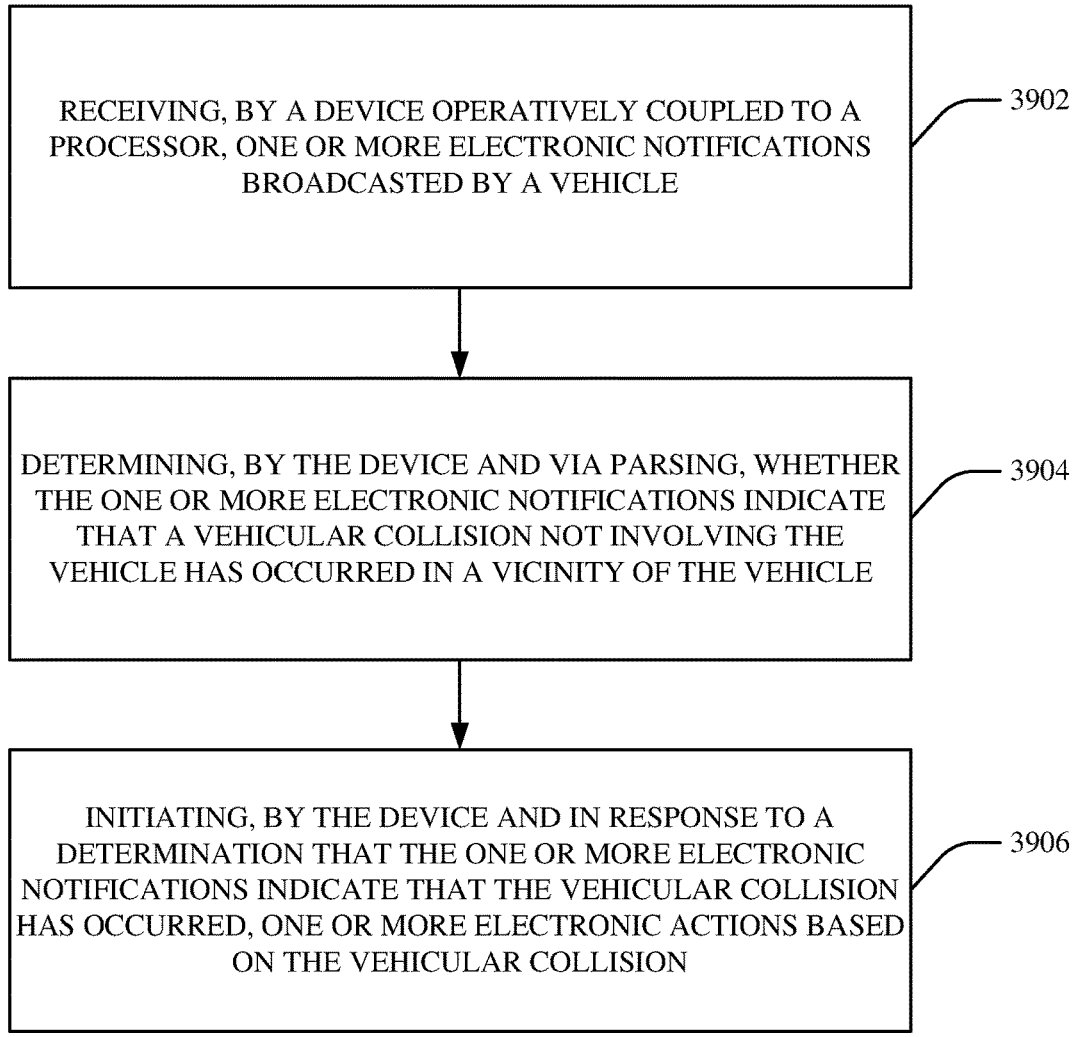

Now, consider FIG. 39. In various embodiments, act 3902 can include receiving, by a device (e.g., via 1306) operatively coupled to a processor (e.g., 1302), one or more electronic notifications (e.g., 704, 2602, 812, 2904, 3204) broadcasted by a vehicle (e.g., 102).

In various aspects, act 3904 can include determining, by the device (e.g., via 1308) and via parsing, whether the one or more electronic notifications indicate that a vehicular collision (e.g., 108) not involving the vehicle has occurred in a vicinity (e.g., 106) of the vehicle.

In various instances, act 3906 can include initiating, by the device (e.g., via 1310) and in response to a determination that the one or more electronic notifications indicate that the vehicular collision has occurred, one or more electronic actions.

Although not explicitly shown in FIG. 39, the one or more electronic notifications can include vicinity data (e.g., 208) captured by one or more cameras (e.g., 302) or one or more microphones (e.g., 304) of the vehicle, the one or more electronic notifications can indicate that the vehicle detected the vehicular collision by executing a first deep learning neural network (e.g., 402) on the vicinity data, and the computer-implemented method 3900 can further comprise: verifying, by the device (e.g., 1310), such detection by executing a second deep learning neural network (e.g., 2102) on the vicinity data. In various aspects, the computer-implemented method 3900 can further comprise: transmitting, by the device (e.g., via 1310) and in response to the second deep learning neural network detecting the vehicular collision based on the vicinity data, an electronic reply to the vehicle, wherein the electronic reply indicates that the vehicular collision has been successfully verified (e.g., as shown in FIG. 23). In various instances, the computer-implemented method 3900 can further comprise: transmitting, by the device (e.g., via 1310) and in response to the second deep learning neural network failing to detect the vehicular collision based on the vicinity data, an electronic reply to the vehicle, wherein the electronic reply indicates that the vehicular collision has not been successfully verified (e.g., as shown in FIG. 23).

Although not explicitly shown in FIG. 39, the one or more electronic notifications can indicate where (e.g., via 814) the vehicular collision occurred, the device can be onboard an emergency service vehicle, and the computer-implemented method 3900 can further comprise: generating, by the device (e.g., via 1310), an electronic navigation route leading from a current location of the emergency service vehicle to the vehicular collision (e.g., as shown in FIGS. 19-20).

Although not explicitly shown in FIG. 39, the one or more electronic notifications can indicate (e.g., via 3204) that the vehicle has a remotely-controllable camera (e.g., one of 3302), and the computer-implemented method 3900 can further comprise: transmitting, by the device (e.g., via 1310) and to the vehicle, an electronic instruction (e.g., one of 3314) to adjust an angle or a zoom level of the remotely-controllable camera.

Although not explicitly shown in FIG. 39, the one or more electronic notifications can indicate (e.g., via 3204) that the vehicle has a remotely-controllable speaker (e.g., one of 3304), and the computer-implemented method 3900 can further comprise: transmitting, by the device (e.g., via 1310) and to the vehicle, an electronic instruction (e.g., one of 3316) to reproduce defined sound data via the remotely-controllable speaker or to adjust a volume level of the remotely-controllable speaker.

Although not explicitly shown in FIG. 39, the one or more electronic notifications can indicate (e.g., via 3204) that the vehicle has remotely-controllable steering (e.g., 3308), remotely-controllable throttle (e.g., 3310), remotely-controllable braking (e.g., 3312), or remotely-controllable lighting (e.g., 3306), and the computer-implemented method 3900 can further comprise: transmitting, by the device (e.g., via 1310) and to the vehicle, an electronic instruction (e.g., one of 3320, 3322, 3324, or 3318) to adjust the remotely-controllable steering, the remotely-controllable throttle, the remotely-controllable braking, or the remotely-controllable lighting.

Although the herein disclosure mainly describes various embodiments as generating a classification label (e.g., 404, 2104) indicating whether a vehicular collision has occurred or indicating characteristics, properties, or attributes of the vehicular collision, this is a mere non-limiting example. In various aspects, the herein-described deep learning neural networks (e.g., 402, 2102) can be configured to generate any suitable format or dimensionality of output (e.g., can be configured to produce bonding boxes or pixel-wise segmentation masks; are not limited only to producing classification labels).

Although the herein disclosure mainly describes various embodiments as implementing deep learning neural networks (e.g., 402, 2102), this is a mere non-limiting example. In various aspects, the herein-described teachings can be implemented via any suitable machine learning models exhibiting any suitable artificial intelligence architectures (e.g., support vector machines, naïve Bayes, linear regression, logistic regression, decision trees, random forest).

Although the herein disclosure mainly describes various embodiments as detecting whether or not a vehicular collision occurs within the vicinity of a smart vehicle, this is a mere non-limiting example. In various aspects, the herein-described teachings can be extrapolated to detecting whether or not any event of interest occurs within the vicinity of a smart vehicle (e.g., whether a vehicular collision occurs in the vicinity; whether a medical emergency, such as a heart attack, occurs within the vicinity; whether a crime, such as a burglary or an assault, occurs within the vicinity).

In various instances, machine learning algorithms or models can be implemented in any suitable way to facilitate any suitable aspects described herein. To facilitate some of the above-described machine learning aspects of various embodiments, consider the following discussion of artificial intelligence (AI). Various embodiments described herein can employ artificial intelligence to facilitate automating one or more features or functionalities. The components can employ various AI-based schemes for carrying out various embodiments/examples disclosed herein. In order to provide for or aid in the numerous determinations (e.g., determine, ascertain, infer, calculate, predict, prognose, estimate, derive, forecast, detect, compute) described herein, components described herein can examine the entirety or a subset of the data to which it is granted access and can provide for reasoning about or determine states of the system or environment from a set of observations as captured via events or data. Determinations can be employed to identify a specific context or action, or can generate a probability distribution over states, for example. The determinations can be probabilistic; that is, the computation of a probability distribution over states of interest based on a consideration of data and events. Determinations can also refer to techniques employed for composing higher-level events from a set of events or data.

Such determinations can result in the construction of new events or actions from a set of observed events or stored event data, whether or not the events are correlated in close temporal proximity, and whether the events and data come from one or several event and data sources. Components disclosed herein can employ various classification (explicitly trained (e.g., via training data) as well as implicitly trained (e.g., via observing behavior, preferences, historical information, receiving extrinsic information, and so on)) schemes or systems (e.g., support vector machines, neural networks, expert systems, Bayesian belief networks, fuzzy logic, data fusion engines, and so on) in connection with performing automatic or determined action in connection with the claimed subject matter. Thus, classification schemes or systems can be used to automatically learn and perform a number of functions, actions, or determinations.

A classifier can map an input attribute vector, $z=(z_1, z_2, z_3, z_4, z_n)$, to a confidence that the input belongs to a class, as by $f(z)=confidence(class)$. Such classification can employ a probabilistic or statistical-based analysis (e.g., factoring into the analysis utilities and costs) to determinate an action to be automatically performed. A support vector machine (SVM) can be an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, or probabilistic classification models providing different patterns of independence, any of which can be employed. Classification as used herein also is inclusive of statistical regression that is utilized to develop models of priority.

The herein disclosure describes non-limiting examples. For ease of description or explanation, various portions of the herein disclosure utilize the term "each," "every," or "all" when discussing various examples. Such usages of the term "each," "every," or "all" are non-limiting. In other words, when the herein disclosure provides a description that is applied to "each," "every," or "all" of some particular object or component, it should be understood that this is a non-limiting example, and it should be further understood that, in various other examples, it can be the case that such description applies to fewer than "each," "every," or "all" of that particular object or component.

Figure 40:
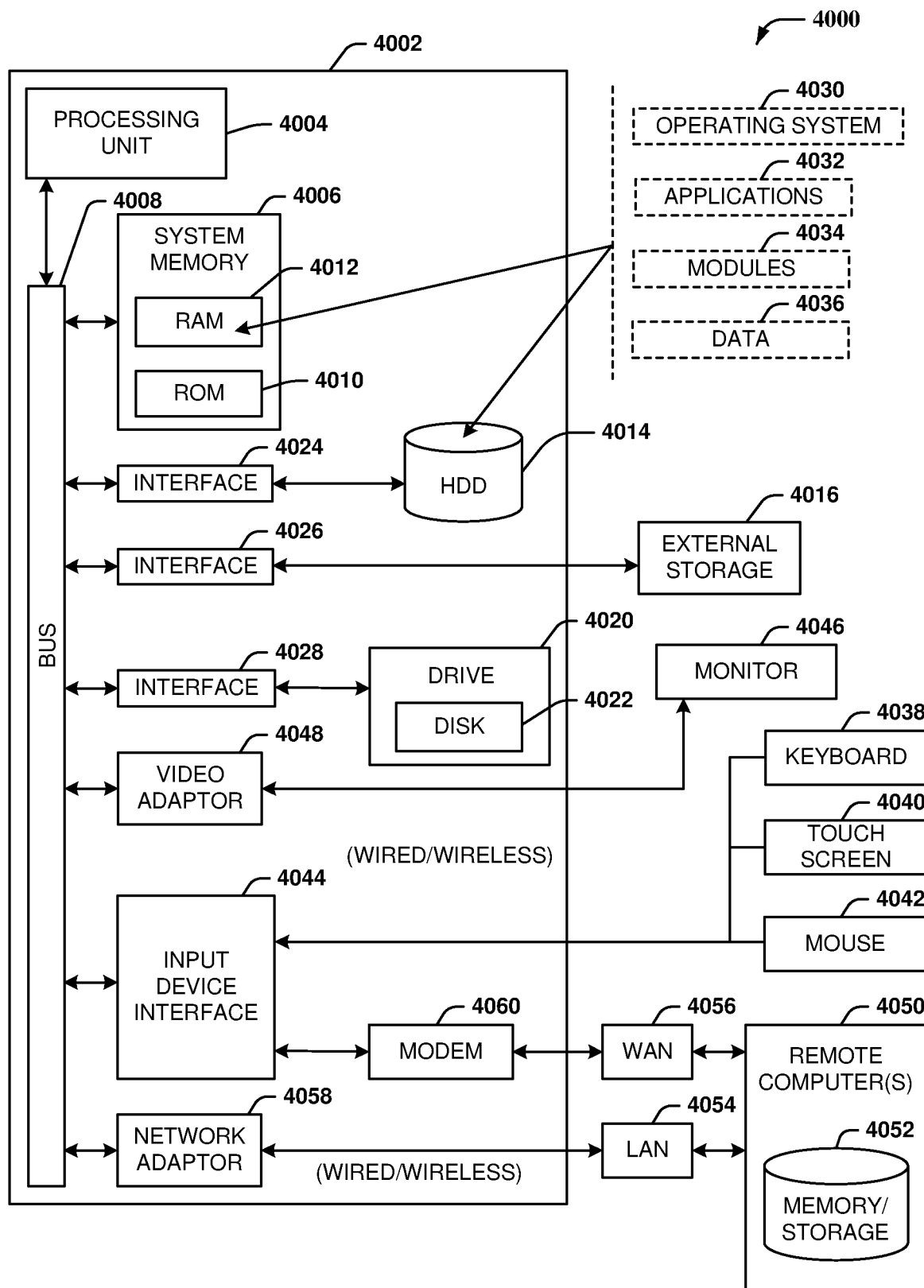
FIG. 40 illustrates a block diagram of an example, non-limiting operating environment in which one or more embodiments described herein can be facilitated.

In order to provide additional context for various embodiments described herein, FIG. 40 and the following discussion are intended to provide a brief, general description of a suitable computing environment 4000 in which the various embodiments of the embodiment described herein can be implemented. While the embodiments have been described above in the general context of computer-executable instructions that can run on one or more computers, those skilled in the art will recognize that the embodiments can be also implemented in combination with other program modules or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multi-processor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 40, the example environment 4000 for implementing various embodiments of the aspects described herein includes a computer 4002, the computer 4002 including a processing unit 4004, a system memory 4006 and a system bus 4008. The system bus 4008 couples system components including, but not limited to, the system memory 4006 to the processing unit 4004. The processing unit 4004 can be any of various commercially available processors. Dual microprocessors and other multi-processor architectures can also be employed as the processing unit 4004.

The system bus 4008 can be any of several types of bus structure that can further interconnect to a memory bus (with or without a memory controller), a peripheral bus, and a local bus using any of a variety of commercially available bus architectures. The system memory 4006 includes ROM 4010 and RAM 4012. A basic input/output system (BIOS) can be stored in a non-volatile memory such as ROM, erasable programmable read only memory (EPROM), EEPROM, which BIOS contains the basic routines that help to transfer information between elements within the computer 4002, such as during startup. The RAM 4012 can also include a high-speed RAM such as static RAM for caching data.

The computer 4002 further includes an internal hard disk drive (MD) 4014 (e.g., EIDE, SATA), one or more external storage devices 4016 (e.g., a magnetic floppy disk drive (FDD) 4016, a memory stick or flash drive reader, a memory card reader, etc.) and a drive 4020, e.g., such as a solid state drive, an optical disk drive, which can read or write from a disk 4022, such as a CD-ROM disc, a DVD, a BD, etc. Alternatively, where a solid state drive is involved, disk 4022 would not be included, unless separate. While the internal HDD 4014 is illustrated as located within the computer 4002, the internal HDD 4014 can also be configured for external use in a suitable chassis (not shown). Additionally, while not shown in environment 4000, a solid state drive (SSD) could be used in addition to, or in place of, an HDD 4014. The HDD 4014, external storage device(s) 4016 and drive 4020 can be connected to the system bus 4008 by an HDD interface 4024, an external storage interface 4026 and a drive interface 4028, respectively. The interface 4024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 4002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 4012, including an operating system 4030, one or more application programs 4032, other program modules 4034 and program data 4036. All or portions of the operating system, applications, modules, or data can also be cached in the RAM 4012. The systems and methods described herein can be implemented utilizing various commercially available operating systems or combinations of operating systems.

Computer 4002 can optionally comprise emulation technologies. For example, a hypervisor (not shown) or other intermediary can emulate a hardware environment for operating system 4030, and the emulated hardware can optionally be different from the hardware illustrated in FIG. 40. In such an embodiment, operating system 4030 can comprise one virtual machine (VM) of multiple VMs hosted at computer 4002. Furthermore, operating system 4030 can provide runtime environments, such as the Java runtime environment or the .NET framework, for applications 4032. Runtime environments are consistent execution environments that allow applications 4032 to run on any operating system that includes the runtime environment. Similarly, operating system 4030 can support containers, and applications 4032 can be in the form of containers, which are lightweight, standalone, executable packages of software that include, e.g., code, runtime, system tools, system libraries and settings for an application.

Further, computer 4002 can be enable with a security module, such as a trusted processing module (TPM). For instance with a TPM, boot components hash next in time boot components, and wait for a match of results to secured values, before loading a next boot component. This process can take place at any layer in the code execution stack of computer 4002, e.g., applied at the application execution level or at the operating system (OS) kernel level, thereby enabling security at any level of code execution.

A user can enter commands and information into the computer 4002 through one or more wired/wireless input devices, e.g., a keyboard 4038, a touch screen 4040, and a pointing device, such as a mouse 4042. Other input devices (not shown) can include a microphone, an infrared (IR) remote control, a radio frequency (RF) remote control, or other remote control, a joystick, a virtual reality controller or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 4004 through an input device interface 4044 that can be coupled to the system bus 4008, but can be connected by other interfaces, such as a parallel port, an IEEE 1394 serial port, a game port, a USB port, an IR interface, a BLUETOOTH® interface, etc.

A monitor 4046 or other type of display device can be also connected to the system bus 4008 via an interface, such as a video adapter 4048. In addition to the monitor 4046, a computer typically includes other peripheral output devices (not shown), such as speakers, printers, etc.

The computer 4002 can operate in a networked environment using logical connections via wired or wireless communications to one or more remote computers, such as a remote computer(s) 4050. The remote computer(s) 4050 can be a workstation, a server computer, a router, a personal computer, portable computer, microprocessor-based entertainment appliance, a peer device or other common network node, and typically includes many or all of the elements described relative to the computer 4002, although, for purposes of brevity, only a memory/storage device 4052 is illustrated. The logical connections depicted include wired/wireless connectivity to a local area network (LAN) 4054 or larger networks, e.g., a wide area network (WAN) 4056. Such LAN and WAN networking environments are commonplace in offices and companies, and facilitate enterprise-wide computer networks, such as intranets, all of which can connect to a global communications network, e.g., the Internet.

When used in a LAN networking environment, the computer 4002 can be connected to the local network 4054 through a wired or wireless communication network interface or adapter 4058. The adapter 4058 can facilitate wired or wireless communication to the LAN 4054, which can also include a wireless access point (AP) disposed thereon for communicating with the adapter 4058 in a wireless mode.

When used in a WAN networking environment, the computer 4002 can include a modem 4060 or can be connected to a communications server on the WAN 4056 via other means for establishing communications over the WAN 4056, such as by way of the Internet. The modem 4060, which can be internal or external and a wired or wireless device, can be connected to the system bus 4008 via the input device interface 4044. In a networked environment, program modules depicted relative to the computer 4002 or portions thereof, can be stored in the remote memory/storage device 4052. It will be appreciated that the network connections shown are example and other means of establishing a communications link between the computers can be used.

When used in either a LAN or WAN networking environment, the computer 4002 can access cloud storage systems or other network-based storage systems in addition to, or in place of, external storage devices 4016 as described above, such as but not limited to a network virtual machine providing one or more aspects of storage or processing of information. Generally, a connection between the computer 4002 and a cloud storage system can be established over a LAN 4054 or WAN 4056 e.g., by the adapter 4058 or modem 4060, respectively. Upon connecting the computer 4002 to an associated cloud storage system, the external storage interface 4026 can, with the aid of the adapter 4058 or modem 4060, manage storage provided by the cloud storage system as it would other types of external storage. For instance, the external storage interface 4026 can be configured to provide access to cloud storage sources as if those sources were physically connected to the computer 4002.

The computer 4002 can be operable to communicate with any wireless devices or entities operatively disposed in wireless communication, e.g., a printer, scanner, desktop or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 41:
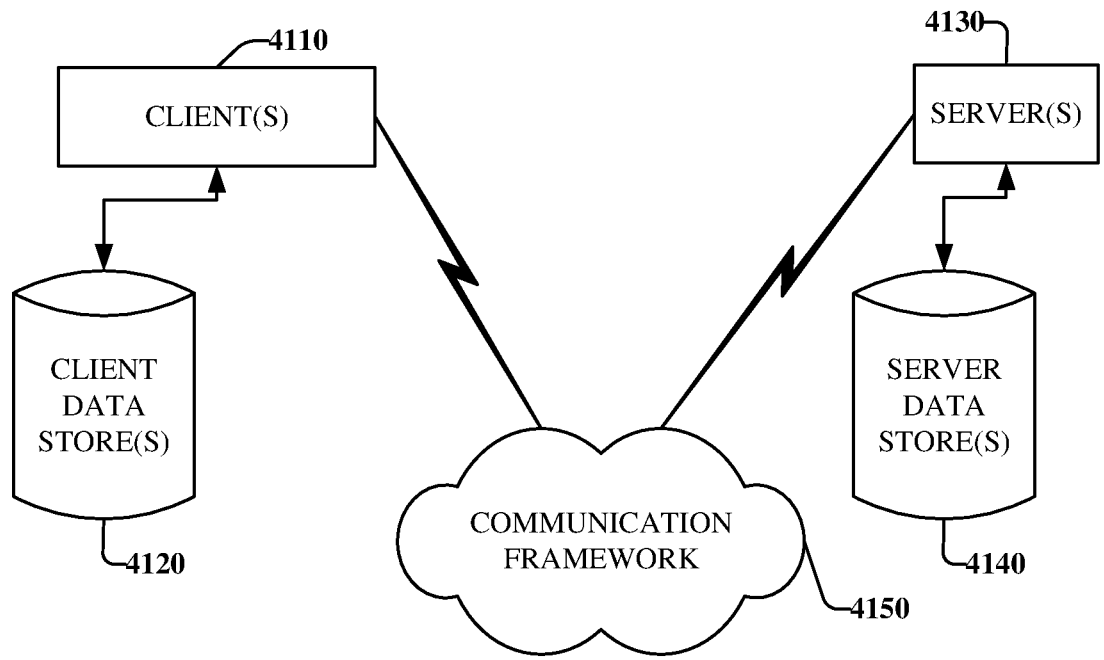
FIG. 41 illustrates an example networking environment operable to execute various implementations described herein.

FIG. 41 is a schematic block diagram of a sample computing environment 4100 with which the disclosed subject matter can interact. The sample computing environment 4100 includes one or more client(s) 4110. The client(s) 4110 can be hardware or software (e.g., threads, processes, computing devices). The sample computing environment 4100 also includes one or more server(s) 4130. The server(s) 4130 can also be hardware or software (e.g., threads, processes, computing devices). The servers 4130 can house threads to perform transformations by employing one or more embodiments as described herein, for example. One possible communication between a client 4110 and a server 4130 can be in the form of a data packet adapted to be transmitted between two or more computer processes. The sample computing environment 4100 includes a communication framework 4150 that can be employed to facilitate communications between the client(s) 4110 and the server(s) 4130. The client(s) 4110 are operably connected to one or more client data store(s) 4120 that can be employed to store information local to the client(s) 4110. Similarly, the server(s) 4130 are operably connected to one or more server data store(s) 4140 that can be employed to store information local to the servers 4130.

The present invention may be a system, a method, an apparatus or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network or a wireless network. The network can comprise copper transmission cables, optical transmission fibers, wireless transmission, routers, firewalls, switches, gateway computers or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations or block diagrams of methods, apparatus (systems), and computer program products according to embodiments of the invention. It will be understood that each block of the flowchart illustrations or block diagrams, and combinations of blocks in the flowchart illustrations or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart or block diagram block or blocks. These computer readable program instructions can also be stored in a computer readable storage medium that can direct a computer, a programmable data processing apparatus, or other devices to function in a particular manner, such that the computer readable storage medium having instructions stored therein comprises an article of manufacture including instructions which implement aspects of the function/act specified in the flowchart or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer or computers, those skilled in the art will recognize that this disclosure also can or can be implemented in combination with other program modules. Generally, program modules include routines, programs, components, data structures, etc. that perform particular tasks or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, or a computer. By way of illustration, both an application running on a server and the server can be a component. One or more components can reside within a process or thread of execution and a component can be localized on one computer or distributed between two or more computers. In another example, respective components can execute from various computer readable media having various data structures stored thereon. The components can communicate via local or remote processes such as in accordance with a signal having one or more data packets (e.g., data from one component interacting with another component in a local system, distributed system, or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. As used herein, the term "and/or" is intended to have the same meaning as "or." Moreover, articles "a" and "an" as used in the subject specification and annexed drawings should generally be construed to mean "one or more" unless specified otherwise or clear from context to be directed to a singular form. As used herein, the terms "example" or "exemplary" are utilized to mean serving as an example, instance, or illustration. For the avoidance of doubt, the subject matter disclosed herein is not limited by such examples. In addition, any aspect or design described herein as an "example" or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Various non-limiting aspects of various embodiments described herein are presented in the following clauses.

Clause 1: A system onboard a first vehicle, the system comprising: a processor that executes computer-executable components stored in a non-transitory computer-readable memory, the computer-executable components comprising: a sensor component that captures, via one or more first cameras or one or more first microphones of the first vehicle, vicinity data associated with a first vicinity of the first vehicle; an inference component that determines, via execution of a deep learning neural network on the vicinity data, whether a vehicular collision not involving the first vehicle has occurred in the first vicinity of the first vehicle; and an evidence component that, in response to a determination that the vehicular collision has occurred, records, via the one or more first cameras or the one or more first microphones, first post-collision evidence associated with the first vicinity of the first vehicle.

Clause 2: The system of any preceding clause, wherein the recording the first post-collision evidence comprises preserving the vicinity data.

Clause 3: The system of any preceding clause, wherein the evidence component, in response to a determination that the vehicular collision has not occurred, refrains from recording the first post-collision evidence.

Clause 4: The system of any preceding clause, wherein the refraining from recording the first post-collision evidence comprises discarding the vicinity data.

Clause 5: The system of any preceding clause, wherein the computer-executable components further comprise: a broadcast component that broadcasts, to an emergency service computing device, a deanonymized electronic alert based on the vehicular collision.

Clause 6: The system of any preceding clause, wherein the deanonymized electronic alert comprises the first post-collision evidence.

Clause 7: The system of any preceding clause, wherein the computer-executable components further comprise: a broadcast component that broadcasts, to a second vehicle in the first vicinity of the first vehicle, an anonymized electronic alert based on the vehicular collision.

Clause 8: The system of any preceding clause, wherein the anonymized electronic alert requests that the second vehicle record, via one or more second cameras or one or more second microphones of the second vehicle, second post-collision evidence associated with a second vicinity of the second vehicle.

In various cases, any suitable combination or combinations of clauses 1-8 can be implemented.

Clause 9: A computer-implemented method, comprising: capturing, by a device operatively coupled to a processor, onboard a first vehicle, and via one or more first cameras or one or more first microphones of the first vehicle, vicinity data associated with a first vicinity of the first vehicle; determining, by the device and via execution of a deep learning neural network on the vicinity data, whether a vehicular collision not involving the first vehicle has occurred in the first vicinity of the first vehicle; and recording, by the device, in response to a determination that the vehicular collision has occurred, and via the one or more first cameras or the one or more first microphones, first post-collision evidence associated with the first vicinity of the first vehicle.

Clause 10: The computer-implemented method of any preceding clause, wherein the recording the first post-collision evidence comprises preserving, by the device, the vicinity data.

Clause 11: The computer-implemented method of any preceding clause, further comprising: refraining, by the device and in response to a determination that the vehicular collision has not occurred, from recording the first post-collision evidence.

Clause 12: The computer-implemented method of any preceding clause, wherein the refraining from recording the first post-collision evidence comprises discarding, by the device, the vicinity data.

Clause 13: The computer-implemented method of any preceding clause, further comprising: broadcasting, by the device and to an emergency service computing device, a deanonymized electronic alert based on the vehicular collision.

Clause 14: The computer-implemented method of any preceding clause, wherein the deanonymized electronic alert comprises the first post-collision evidence.

Clause 15: The computer-implemented method of any preceding clause, further comprising: broadcasting, by the device and to a second vehicle in the first vicinity of the first vehicle, an anonymized electronic alert based on the vehicular collision.

Clause 16: The computer-implemented method of any preceding clause, wherein the anonymized electronic alert requests that the second vehicle record, via one or more second cameras or one or more second microphones of the second vehicle, second post-collision evidence associated with a second vicinity of the second vehicle.

In various cases, any suitable combination or combinations of clauses 9-16 can be implemented.

Clause 17: A computer program product for facilitating artificially intelligent provision of post-vehicular-collision evidence, the computer program product comprising a non-transitory computer-readable memory having program instructions embodied therewith, the program instructions executable by a processor onboard a first vehicle to cause the processor to: capture, via one or more first cameras or one or more first microphones of the first vehicle, vicinity data associated with a first vicinity of the first vehicle; determine, via execution of a deep learning neural network on the vicinity data, whether a vehicular collision not involving the first vehicle has occurred in the first vicinity of the first vehicle; and record, in response to a determination that the vehicular collision has occurred and via the one or more first cameras or the one or more first microphones, first post-collision evidence associated with the first vicinity of the first vehicle.

Clause 18: The computer program product of any preceding clause, wherein the recording the first post-collision evidence comprises preserving, by the processor, the vicinity data.

Clause 19: The computer program product of any preceding clause, wherein the program instructions are further executable to cause the processor to: refrain, in response to a determination that the vehicular collision has not occurred, from recording the first post-collision evidence.

Clause 20: The computer program product of any preceding clause, wherein the refraining from recording the first post-collision evidence comprises discarding, by the processor, the vicinity data.

In various cases, any suitable combination or combinations of clauses 17-20 can be implemented.

Clause 21: A system onboard a vehicle, the system comprising: a processor that executes computer-executable components stored in a non-transitory computer-readable memory, the computer-executable components comprising: a sensor component that captures, via one or more cameras or one or more microphones of the vehicle, vicinity data associated with a vicinity of the vehicle; an inference component that generates, via execution of a deep learning neural network on the vicinity data, a classification label indicating whether a vehicular collision not involving the vehicle has occurred in the vicinity of the vehicle; an evidence component that records, in response to the classification label indicating that the vehicular collision has occurred and via the one or more cameras or the one or more microphones, post-collision evidence associated with the vicinity of the vehicle; and a broadcast component that broadcasts, in response to the classification label indicating that the vehicular collision has occurred, the classification label and the post-collision evidence to an emergency service computing device.

Clause 22: The system of any preceding clause, wherein the deep learning neural network receives the vicinity data as input and produces the classification label as output, and wherein the classification label binomially indicates a presence or an absence of the vehicular collision.

Clause 23: The system of any preceding clause, wherein the deep learning neural network receives the vicinity data as input and produces the classification label as output, and wherein the classification label indicates how many vehicles are involved in the vehicular collision.

Clause 24: The system of any preceding clause, wherein the deep learning neural network receives the vicinity data as input and produces the classification label as output, and wherein the classification label indicates an impact type of the vehicular collision, wherein the impact type of the vehicular collision is one from the group consisting of a rear-end collision, a head-on collision, a side-impact collision, and a side-swipe collision.

Clause 25: The system of any preceding clause, wherein the deep learning neural network receives the vicinity data as input and produces the classification label as output, and wherein the classification label indicates whether the vehicular collision involves a roll-over.

Clause 26: The system of any preceding clause, wherein the deep learning neural network receives the vicinity data as input and produces the classification label as output, and wherein the classification label indicates whether the vehicular collision involves flames or smoke.

Clause 27: The system of any preceding clause, wherein the deep learning neural network receives the vicinity data as input and produces the classification label as output, and wherein the classification label indicates a severity of the vehicular collision.

In various cases, any suitable combination or combinations of clauses 21-27 can be implemented.

Clause 28: A computer-implemented method, comprising: capturing, by a device operatively coupled to a processor, onboard a vehicle, and via one or more cameras or one or more microphones of the vehicle, vicinity data associated with a vicinity of the vehicle; generating, by the device and via execution of a deep learning neural network on the vicinity data, a classification label indicating whether a vehicular collision not involving the vehicle has occurred in the vicinity of the vehicle; recording, by the device, in response to the classification label indicating that the vehicular collision has occurred, and via the one or more cameras or the one or more microphones, post-collision evidence associated with the vicinity of the vehicle; and broadcasting, by the device and in response to the classification label indicating that the vehicular collision has occurred, the classification label and the post-collision evidence to an emergency service computing device.

Clause 29: The computer-implemented method of any preceding clause, wherein the deep learning neural network receives the vicinity data as input and produces the classification label as output, and wherein the classification label binomially indicates a presence or an absence of the vehicular collision.

Clause 30: The computer-implemented method of any preceding clause, wherein the deep learning neural network receives the vicinity data as input and produces the classification label as output, and wherein the classification label indicates how many vehicles are involved in the vehicular collision.

Clause 31: The computer-implemented method of any preceding clause, wherein the deep learning neural network receives the vicinity data as input and produces the classification label as output, and wherein the classification label indicates an impact type of the vehicular collision, wherein the impact type of the vehicular collision is one from the group consisting of a rear-end collision, a head-on collision, a side-impact collision, and a side-swipe collision.

Clause 32: The computer-implemented method of any preceding clause, wherein the deep learning neural network receives the vicinity data as input and produces the classification label as output, and wherein the classification label indicates whether the vehicular collision involves a roll-over.

Clause 33: The computer-implemented method of any preceding clause, wherein the deep learning neural network receives the vicinity data as input and produces the classification label as output, and wherein the classification label indicates whether the vehicular collision involves flames or smoke.

Clause 34: The computer-implemented method of any preceding clause, wherein the deep learning neural network receives the vicinity data as input and produces the classification label as output, and wherein the classification label indicates a severity of the vehicular collision.

In various cases, any suitable combination or combinations of clauses 28-34 can be implemented.

Clause 35: A computer program product for facilitating artificially intelligent provision of post-vehicular-collision evidence, the computer program product comprising a non-transitory computer-readable memory having program instructions embodied therewith, the program instructions executable by a processor onboard a vehicle to cause the processor to: capture, via one or more cameras or one or more microphones of the vehicle, vicinity data associated with a vicinity of the vehicle; generate, via execution of a deep learning neural network on the vicinity data, a classification label indicating whether a vehicular collision not involving the vehicle has occurred in the vicinity of the vehicle; record, in response to the classification label indicating that the vehicular collision has occurred and via the one or more cameras or the one or more microphones, post-collision evidence associated with the vicinity of the vehicle; and broadcast, in response to the classification label indicating that the vehicular collision has occurred, the classification label and the post-collision evidence to an emergency service computing device.

Clause 36: The computer program product of any preceding clause, wherein the deep learning neural network receives the vicinity data as input and produces the classification label as output, and wherein the classification label binomially indicates a presence or an absence of the vehicular collision.

Clause 37: The computer program product of any preceding clause, wherein the deep learning neural network receives the vicinity data as input and produces the classification label as output, and wherein the classification label indicates how many vehicles are involved in the vehicular collision.

Clause 38: The computer program product of any preceding clause, wherein the deep learning neural network receives the vicinity data as input and produces the classification label as output, and wherein the classification label indicates an impact type of the vehicular collision, wherein the impact type of the vehicular collision is one from the group consisting of a rear-end collision, a head-on collision, a side-impact collision, and a side-swipe collision.

Clause 39: The computer program product of any preceding clause, wherein the deep learning neural network receives the vicinity data as input and produces the classification label as output, and wherein the classification label indicates whether the vehicular collision involves a roll-over.

Clause 40: The computer program product of any preceding clause, wherein the deep learning neural network receives the vicinity data as input and produces the classification label as output, and wherein the classification label indicates whether the vehicular collision involves flames or smoke.

In various cases, any suitable combination or combinations of clauses 35-40 can be implemented.

Clause 41: A system onboard a vehicle, the system comprising: a processor that executes computer-executable components stored in a non-transitory computer-readable memory, the computer-executable components comprising: a sensor component that captures, via one or more cameras or one or more microphones of the vehicle, vicinity data associated with a vicinity of the vehicle; an inference component that determines, via execution of a deep learning neural network on the vicinity data, whether a vehicular collision not involving the vehicle has occurred in the vicinity of the vehicle; and a broadcast component that broadcasts, in response to a determination that the vehicular collision has occurred, via the one or more cameras or the one or more microphones, and to an emergency service computing device, a post-collision live stream associated with the vicinity of the vehicle.

Clause 42: The system of any preceding clause, wherein the broadcast component refrains, in response to a determination that the vehicular collision has not occurred, from broadcasting the post-collision live stream.

Clause 43: The system of any preceding clause, wherein the computer-executable components further comprise: a battery component that monitors a remaining battery life of the vehicle during the post-collision live stream.

Clause 44: The system of any preceding clause, wherein, in response to a determination that the remaining battery life of the vehicle is below a threshold, the broadcast component transmits to the emergency service computing device an electronic warning, wherein the electronic warning indicates that the post-collision live stream is nearing termination.

Clause 45: The system of any preceding clause, wherein, in response to a determination that the remaining battery life of the vehicle is below a threshold, the battery component shuts off an electric load of the vehicle, wherein the electric load is unrelated to the post-collision live stream.

Clause 46: The system of any preceding clause, wherein the electric load is one from the group consisting of a seat heater of the vehicle, a seat cooler of the vehicle, an air conditioner of the vehicle, a radio of the vehicle, and a light of the vehicle.

Clause 47: The system of any preceding clause, wherein, during the post-collision live stream, the broadcast component transmits to the emergency service computing device an electronic request for remote-control input associated with the vehicle.

Clause 48: The system of any preceding clause, wherein the remote-control input is one from the group consisting of a camera angle input, a camera zoom input, a speaker volume input, a speaker content input, a lighting input, a steering input, a throttle input, a braking input, and a direction of travel input.

In various cases, any suitable combination or combinations of clauses 41-48 can be implemented.

Clause 49: A computer-implemented method, comprising: capturing, by a device operatively coupled to a processor, onboard a vehicle, and via one or more cameras or one or more microphones of the vehicle, vicinity data associated with a vicinity of the vehicle; determining, by the device and via execution of a deep learning neural network on the vicinity data, whether a vehicular collision not involving the vehicle has occurred in the vicinity of the vehicle; and broadcasting, by the device, in response to a determination that the vehicular collision has occurred, via the one or more cameras or the one or more microphones, and to an emergency service computing device, a post-collision live stream associated with the vicinity of the vehicle.

Clause 50: The computer-implemented method of any preceding clause, further comprising: refraining, by the device and in response to a determination that the vehicular collision has not occurred, from broadcasting the post-collision live stream.

Clause 51: The computer-implemented method of any preceding clause, further comprising: monitoring, by the device, a remaining battery life of the vehicle during the post-collision live stream.

Clause 52: The computer-implemented method of any preceding clause, further comprising: transmitting, by the device, in response to a determination that the remaining battery life of the vehicle is below a threshold, an electronic warning to the emergency service computing device, wherein the electronic warning indicates that the post-collision live stream is nearing termination.

Clause 53: The computer-implemented method of any preceding clause, further comprising: shutting off, by the device and in response to a determination that the remaining battery life of the vehicle is below a threshold, an electric load of the vehicle, wherein the electric load is unrelated to the post-collision live stream.

Clause 54: The computer-implemented method of any preceding clause, wherein the electric load is one from the group consisting of a seat heater of the vehicle, a seat cooler of the vehicle, an air conditioner of the vehicle, a radio of the vehicle, and a light of the vehicle.

Clause 55: The computer-implemented method of any preceding clause, further comprising: transmitting, by the device, during the post-collision live stream, and to the emergency service computing device, an electronic request for remote-control input associated with the vehicle.

Clause 56: The computer-implemented method of any preceding clause, wherein the remote-control input is one from the group consisting of a camera angle input, a camera zoom input, a speaker volume input, a speaker content input, a lighting input, a steering input, a throttle input, a braking input, and a direction of travel input.

In various cases, any suitable combination or combinations of clauses 49-56 can be implemented.

Clause 57: A computer program product for facilitating artificially intelligent provision of post-vehicular-collision evidence, the computer program product comprising a non-transitory computer-readable memory having program instructions embodied therewith, the program instructions executable by a processor onboard a vehicle to cause the processor to: capture, via one or more cameras or one or more microphones of the vehicle, vicinity data associated with a vicinity of the vehicle; determine, via execution of a deep learning neural network on the vicinity data, whether a vehicular collision not involving the vehicle has occurred in the vicinity of the vehicle; and broadcast, in response to a determination that the vehicular collision has occurred, via the one or more cameras or the one or more microphones, and to an emergency service computing device, a post-collision live stream associated with the vicinity of the vehicle.

Clause 58: The computer program product of any preceding clause, wherein the program instructions are further executable to cause the processor to: refrain, in response to a determination that the vehicular collision has not occurred, from broadcasting the post-collision live stream.

Clause 59: The computer program product of any preceding clause, wherein the program instructions are further executable to cause the processor to: monitor a remaining battery life of the vehicle during the post-collision live stream.

Clause 60: The computer program product of any preceding clause, wherein the program instructions are further executable to cause the processor to: transmit, in response to a determination that the remaining battery life of the vehicle is below a threshold, an electronic warning to the emergency service computing device, wherein the electronic warning indicates that the post-collision live stream is nearing termination.

In various cases, any suitable combination or combinations of clauses 57-60 can be implemented.

Clause 61: A system onboard a vehicle, the system comprising: a processor that executes computer-executable components stored in a non-transitory computer-readable memory, the computer-executable components comprising: a sensor component that captures, via one or more cameras or one or more microphones of the vehicle, vicinity data associated with a vicinity of the vehicle; an inference component that determines, via execution of a deep learning neural network on the vicinity data, whether a vehicular collision not involving the vehicle has occurred in the vicinity of the vehicle; and a broadcast component that broadcasts, in response to a determination that the vehicular collision has occurred and via the one or more cameras or the one or more microphones, one or more electronic notifications.

Clause 62: The system of any preceding clause, wherein the deep learning neural network receives as input the vicinity data and produces as output a classification label indicating the vehicular collision, and wherein the one or more electronic notifications comprise the vicinity data and the classification label.

Clause 63: The system of any preceding clause, wherein the one or more electronic notifications comprise a geolocation stamp recorded by a global positioning sensor or a wi-fi positioning sensor of the vehicle, and wherein the geolocation stamp indicates where the vehicular collision occurred.

Clause 64: The system of any preceding clause, wherein the one or more electronic notifications comprise a timestamp recorded by a clock of the vehicle, and wherein the timestamp indicates when the vehicular collision occurred.

Clause 65: The system of any preceding clause, wherein the one or more electronic notifications comprise an identifier associated with the vehicle, wherein the identifier comprises at least one from the group consisting of a vehicle identification number of the vehicle, a license plate of the vehicle, a first name of an owner of the vehicle, a first address of the owner of the vehicle, a second name of a current driver of the vehicle, and a second address of the current driver of the vehicle.

Clause 66: The system of any preceding clause, wherein the one or more electronic notifications comprise post-collision recorded evidence or a post-collision live stream captured by the one or more cameras or the one or more microphones of the vehicle.

Clause 67: The system of any preceding clause, wherein the one or more electronic notifications indicate what remote-control parameters of the vehicle are available.

Clause 68: The system of any preceding clause, wherein the remote-control parameters include a camera angle parameter, a camera zoom parameter, a speaker content parameter, a speaker volume parameter, a lighting parameter, a steering parameter, a throttle parameter, a braking parameter, or a direction of travel parameter.

In various cases, any suitable combination or combinations of clauses 61-68 can be implemented.

Clause 69: A computer-implemented method, comprising: capturing, by a device operatively coupled to a processor, onboard a vehicle, and via one or more cameras or one or more microphones of the vehicle, vicinity data associated with a vicinity of the vehicle; determining, by the device and via execution of a deep learning neural network on the vicinity data, whether a vehicular collision not involving the vehicle has occurred in the vicinity of the vehicle; and broadcasting, by the device, in response to a determination that the vehicular collision has occurred, and via the one or more cameras or the one or more microphones, one or more electronic notifications.

Clause 70: The computer-implemented method of any preceding clause, wherein the deep learning neural network receives as input the vicinity data and produces as output a classification label indicating the vehicular collision, and wherein the one or more electronic notifications comprise the vicinity data and the classification label.

Clause 71: The computer-implemented method of any preceding clause, wherein the one or more electronic notifications comprise a geolocation stamp recorded by a global positioning sensor or a wi-fi positioning sensor of the vehicle, and wherein the geolocation stamp indicates where the vehicular collision occurred.

Clause 72: The computer-implemented method of any preceding clause, wherein the one or more electronic notifications comprise a timestamp recorded by a clock of the vehicle, and wherein the timestamp indicates when the vehicular collision occurred.

Clause 73: The computer-implemented method of any preceding clause, wherein the one or more electronic notifications comprise an identifier associated with the vehicle, wherein the identifier comprises at least one from the group consisting of a vehicle identification number of the vehicle, a license plate of the vehicle, a first name of an owner of the vehicle, a first address of the owner of the vehicle, a second name of a current driver of the vehicle, and a second address of the current driver of the vehicle.

Clause 74: The computer-implemented method of any preceding clause, wherein the one or more electronic notifications comprise post-collision recorded evidence or a post-collision live stream captured by the one or more cameras or the one or more microphones of the vehicle.

Clause 75: The computer-implemented method of any preceding clause, wherein the one or more electronic notifications indicate what remote-control parameters of the vehicle are available.

Clause 76: The computer-implemented method of any preceding clause, wherein the remote-control parameters include a camera angle parameter, a camera zoom parameter, a speaker content parameter, a speaker volume parameter, a lighting parameter, a steering parameter, a throttle parameter, a braking parameter, or a direction of travel parameter.

In various cases, any suitable combination or combinations of clauses 69-76 can be implemented.

Clause 77: A computer program product for facilitating artificially intelligent provision of post-vehicular-collision evidence, the computer program product comprising a non-transitory computer-readable memory having program instructions embodied therewith, the program instructions executable by a processor onboard a vehicle to cause the processor to: capture, via one or more cameras or one or more microphones of the vehicle, vicinity data associated with a vicinity of the vehicle; determine, via execution of a deep learning neural network on the vicinity data, whether a vehicular collision not involving the vehicle has occurred in the vicinity of the vehicle; and broadcast, in response to a determination that the vehicular collision has occurred and via the one or more cameras or the one or more microphones, one or more electronic notifications.

Clause 78: The computer program product of any preceding clause, wherein the deep learning neural network receives as input the vicinity data and produces as output a classification label indicating the vehicular collision, and wherein the one or more electronic notifications comprise the vicinity data and the classification label.

Clause 79: The computer program product of any preceding clause, wherein the one or more electronic notifications comprise a geolocation stamp recorded by a global positioning sensor or a wi-fi positioning sensor of the vehicle, and wherein the geolocation stamp indicates where the vehicular collision occurred.

Clause 80: The computer program product of any preceding clause, wherein the one or more electronic notifications comprise a timestamp recorded by a clock of the vehicle, and wherein the timestamp indicates when the vehicular collision occurred.

In various cases, any suitable combination or combinations of clauses 77-80 can be implemented.

Clause 81: A system, comprising: a processor that executes computer-executable components stored in a non-transitory computer-readable memory, the computer-executable components comprising: a receiver component that receives one or more electronic notifications broadcasted by a vehicle; a determination component that determines, via parsing, whether the one or more electronic notifications indicate that a vehicular collision not involving the vehicle has occurred in a vicinity of the vehicle; and an execution component that initiates, in response to a determination that the one or more electronic notifications indicate that the vehicular collision has occurred, one or more electronic actions based on the vehicular collision.

Clause 82: The system of any preceding clause, wherein the one or more electronic notifications include vicinity data captured by one or more cameras or one or more microphones of the vehicle, wherein the one or more electronic notifications indicate that the vehicle detected the vehicular collision by executing a first deep learning neural network on the vicinity data, and wherein the execution component verifies such detection by executing a second deep learning neural network on the vicinity data.

Clause 83: The system of any preceding clause, wherein the execution component transmits, in response to the second deep learning neural network detecting the vehicular collision based on the vicinity data, an electronic reply to the vehicle, wherein the electronic reply indicates that the vehicular collision has been successfully verified.

Clause 84: The system of any preceding clause, wherein the execution component transmits, in response to the second deep learning neural network failing to detect the vehicular collision based on the vicinity data, an electronic reply to the vehicle, wherein the electronic reply indicates that the vehicular collision has not been successfully verified.

Clause 85: The system of any preceding clause, wherein the one or more electronic notifications indicate where the vehicular collision occurred, wherein the system is onboard an emergency service vehicle, and wherein the execution component generates an electronic navigation route leading from a current location of the emergency service vehicle to the vehicular collision.

Clause 86: The system of any preceding clause, wherein the one or more electronic notifications indicate that the vehicle has a remotely-controllable camera, and wherein the execution component transmits, to the vehicle, an electronic instruction to adjust an angle or a zoom level of the remotely-controllable camera.

Clause 87: The system of any preceding clause, wherein the one or more electronic notifications indicate that the vehicle has a remotely-controllable speaker, and wherein the execution component transmits, to the vehicle, an electronic instruction to reproduce defined sound data via the remotely-controllable speaker or to adjust a volume level of the remotely-controllable speaker.

Clause 88: The system of any preceding clause, wherein the one or more electronic notifications indicate that the vehicle has remotely-controllable steering, remotely-controllable throttle, remotely-controllable braking, or remotely-controllable lighting, and wherein the execution component transmits, to the vehicle, an electronic instruction to adjust the remotely-controllable steering, the remotely-controllable throttle, the remotely-controllable braking, or the remotely-controllable lighting.

In various cases, any suitable combination or combinations of clauses 81-88 can be implemented.

Clause 89: A computer-implemented method, comprising: receiving, by a device operatively coupled to a processor, one or more electronic notifications broadcasted by a vehicle; determining, by the device and via parsing, whether the one or more electronic notifications indicate that a vehicular collision not involving the vehicle has occurred in a vicinity of the vehicle; and initiating, by the device and in response to a determination that the one or more electronic notifications indicate that the vehicular collision has occurred, one or more electronic actions based on the vehicular collision.

Clause 90: The computer-implemented method of any preceding clause, wherein the one or more electronic notifications include vicinity data captured by one or more cameras or one or more microphones of the vehicle, wherein the one or more electronic notifications indicate that the vehicle detected the vehicular collision by executing a first deep learning neural network on the vicinity data, and further comprising: verifying, by the device, such detection by executing a second deep learning neural network on the vicinity data.

Clause 91: The computer-implemented method of any preceding clause, further comprising: transmitting, by the device and in response to the second deep learning neural network detecting the vehicular collision based on the vicinity data, an electronic reply to the vehicle, wherein the electronic reply indicates that the vehicular collision has been successfully verified.

Clause 92: The computer-implemented method of any preceding clause, further comprising: transmitting, by the device and in response to the second deep learning neural network failing to detect the vehicular collision based on the vicinity data, an electronic reply to the vehicle, wherein the electronic reply indicates that the vehicular collision has not been successfully verified.

Clause 93: The computer-implemented method of any preceding clause, wherein the one or more electronic notifications indicate where the vehicular collision occurred, wherein the device is onboard an emergency service vehicle, and further comprising: generating, by the device, an electronic navigation route leading from a current location of the emergency service vehicle to the vehicular collision.

Clause 94: The computer-implemented method of any preceding clause, wherein the one or more electronic notifications indicate that the vehicle has a remotely-controllable camera, and further comprising: transmitting, by the device and to the vehicle, an electronic instruction to adjust an angle or a zoom level of the remotely-controllable camera.

Clause 95: The computer-implemented method of any preceding clause, wherein the one or more electronic notifications indicate that the vehicle has a remotely-controllable speaker, and further comprising: transmitting, by the device and to the vehicle, an electronic instruction to reproduce defined sound data via the remotely-controllable speaker or to adjust a volume level of the remotely-controllable speaker.

Clause 96: The computer-implemented method of any preceding clause, wherein the one or more electronic notifications indicate that the vehicle has remotely-controllable steering, remotely-controllable throttle, remotely-controllable braking, or remotely-controllable lighting, and further comprising: transmitting, by the device and to the vehicle, an electronic instruction to adjust the remotely-controllable steering, the remotely-controllable throttle, the remotely-controllable braking, or the remotely-controllable lighting.

In various cases, any suitable combination or combinations of clauses 89-96 can be implemented.

Clause 97: A computer program product for facilitating artificially intelligent provision of post-vehicular-collision evidence, the computer program product comprising a non-transitory computer-readable memory having program instructions embodied therewith, the program instructions executable by a processor to cause the processor to: receive one or more electronic notifications broadcasted by a vehicle; determine, via parsing, whether the one or more electronic notifications indicate that a vehicular collision not involving the vehicle has occurred in a vicinity of the vehicle; and initiate, in response to a determination that the one or more electronic notifications indicate that the vehicular collision has occurred, one or more electronic actions based on the vehicular collision.

Clause 98: The computer program product of any preceding clause, wherein the one or more electronic notifications include vicinity data captured by one or more cameras or one or more microphones of the vehicle, wherein the one or more electronic notifications indicate that the vehicle detected the vehicular collision by executing a first deep learning neural network on the vicinity data, and wherein the program instructions are further executable to cause the processor to: verify such detection by executing a second deep learning neural network on the vicinity data.

Clause 99: The computer program product of any preceding clause, wherein the program instructions are further executable to cause the processor to: transmit, in response to the second deep learning neural network detecting the vehicular collision based on the vicinity data, an electronic reply to the vehicle, wherein the electronic reply indicates that the vehicular collision has been successfully verified.

Clause 100: The computer program product of any preceding clause, wherein the program instructions are further executable to cause the processor to: transmit, in response to the second deep learning neural network failing to detect the vehicular collision based on the vicinity data, an electronic reply to the vehicle, wherein the electronic reply indicates that the vehicular collision has not been successfully verified.

In various cases, any suitable combination or combinations of clauses 97-100 can be implemented.

In various cases, any suitable combination or combinations of clauses 1-100 can be implemented.

What is claimed is:

1. A system of a first vehicle, the system comprising:
   a memory that stores computer-executable components; and
   a processor that executes at least one of the computer-executable components that:
   captures, via at least one sensor of the first vehicle, vicinity data associated with a vicinity comprising a defined physical area adjacent to the first vehicle, wherein the at least one sensor comprises at least one of an image sensor or a sound sensor, and wherein the vicinity data comprises at least one of first image data or first audio data;
   determines, via execution of a deep learning neural network on the vicinity data, whether a vehicular collision has occurred in the vicinity of the first vehicle, wherein the vehicular collision involves at least one second vehicle, and does not involve the first vehicle; and
   a broadcast component that broadcasts, in response to a determination that the vehicular collision has occurred, one or more electronic notifications comprising at least a portion of the vicinity data associated with the vehicular collision.

2. The system of claim 1, wherein the deep learning neural network receives as input the vicinity data and produces as output a classification label indicating the vehicular collision, and wherein the one or more electronic notifications further comprise the classification label.

3. The system of claim 1, wherein the one or more electronic notifications further comprise a geolocation stamp recorded by a global positioning sensor or a wi-fi positioning sensor of the at least one sensor, and wherein the geolocation stamp indicates geographic location where the vehicular collision occurred.

4. The system of claim 1, wherein the one or more electronic notifications further comprise a timestamp recorded by a clock of the first vehicle, and wherein the timestamp indicates a time when the vehicular collision occurred.

5. The system of claim 1, wherein the one or more electronic notifications further comprise an identifier associated with the at least one second vehicle, wherein the identifier comprises at least one of a vehicle identification number of the at least one second vehicle, a license plate of the at least one second vehicle, a first name of an owner of the at least one second vehicle, a first address of the owner of the at least one second vehicle, a second name of a current driver of the at least one second vehicle, or a second address of the current driver of the at least one second vehicle.

6. The system of claim 1, wherein the at least the portion of the vicinity data comprises post-collision recorded evidence or a post-collision live stream captured by the at least one sensor of the first vehicle.

7. The system of claim 1, wherein the one or more electronic notifications further indicate what remote-control parameters of the first vehicle are available.

8. The system of claim 7, wherein the remote-control parameters include at least one of a camera angle parameter, a camera zoom parameter, a speaker content parameter, a speaker volume parameter, a lighting parameter, a steering parameter, a throttle parameter, a braking parameter, or a direction of travel parameter.

9. A computer-implemented method, comprising:
- capturing, by a system of a first vehicle, via at least one sensor of the first vehicle, vicinity data associated with a vicinity comprising a defined physical area adjacent to the first vehicle, wherein the at least one sensor comprises at least one of an image sensor or a sound sensor, and wherein the vicinity data comprises at least one of first image data or first audio data;
- determining, by the system, via execution of a deep learning neural network on the vicinity data, whether a vehicular collision has occurred in the vicinity of the first vehicle, wherein the vehicular collision involves at least one second vehicle, and does not involve the first vehicle; and
- broadcasting, by the system, in response to a determination that the vehicular collision has occurred, one or more electronic notifications comprising at least a portion of the vicinity data associated with the vehicular collision.

10. The computer-implemented method of claim 9, wherein the deep learning neural network receives as input the vicinity data and produces as output a classification label indicating the vehicular collision, and wherein the one or more electronic notifications further comprise the classification label.

11. The computer-implemented method of claim 9, wherein the one or more electronic notifications further comprise a geolocation stamp recorded by a global positioning sensor or a wi-fi positioning sensor of the at least one sensor, and wherein the geolocation stamp indicates geographic location where the vehicular collision occurred.

12. The computer-implemented method of claim 9, wherein the one or more electronic notifications further comprise a timestamp recorded by a clock of the first vehicle, and wherein the timestamp indicates a time when the vehicular collision occurred.

13. The computer-implemented method of claim 9, wherein the one or more electronic notifications further comprise an identifier associated with the at least one second vehicle, wherein the identifier comprises at least one of a vehicle identification number of the at least one second vehicle, a license plate of the at least one second vehicle, a first name of an owner of the at least one second vehicle, a first address of the owner of the at least one second vehicle, a second name of a current driver of the at least one second vehicle, or a second address of the current driver of the at least one second vehicle.

14. The computer-implemented method of claim 9, wherein the at least the portion of the vicinity data comprises post-collision recorded evidence or a post-collision live stream captured by the at least one sensor of the first vehicle.

15. The computer-implemented method of claim 9, wherein the one or more electronic notifications further indicate what remote-control parameters of the first vehicle are available.

16. The computer-implemented method of claim 15, wherein the remote-control parameters include at least one of a camera angle parameter, a camera zoom parameter, a speaker content parameter, a speaker volume parameter, a lighting parameter, a steering parameter, a throttle parameter, a braking parameter, or a direction of travel parameter.

17. A computer program product for facilitating artificially intelligent provision of post-vehicular-collision evidence, the computer program product comprising a non-transitory computer-readable memory having program instructions embodied therewith, the program instructions executable by a processor onboard a first vehicle to cause the processor to:
- capture, via at least one sensor of the first vehicle, vicinity data associated with a vicinity comprising a defined physical area adjacent to the first vehicle, wherein the at least one sensor comprises at least one of an image sensor or a sound sensor, and wherein the vicinity data comprises at least one of first image data or first audio data;
- determine, via execution of a deep learning neural network on the vicinity data, whether a vehicular collision has occurred in the vicinity of the first vehicle, wherein the vehicular collision involves at least one second vehicle, and does not involve the first vehicle; and
- broadcast, in response to a determination that the vehicular collision has occurred, one or more electronic notifications comprising at least a portion of the vicinity data associated with the vehicular collision.

18. The computer program product of claim 17, wherein the deep learning neural network receives as input the vicinity data and produces as output a classification label indicating the vehicular collision, and wherein the one or more electronic notifications further comprise the classification label.

19. The computer program product of claim 17, wherein the one or more electronic notifications further comprise a geolocation stamp recorded by a global positioning sensor or a wi-fi positioning sensor of the at least one sensor, and wherein the geolocation stamp indicates geographic location where the vehicular collision occurred.

20. The computer program product of claim 17, wherein the one or more electronic notifications further comprise a timestamp recorded by a clock of the first vehicle, and wherein the timestamp indicates a time when the vehicular collision occurred.

* * * * *